US012730889B2

(12) United States Patent
Hung

(10) Patent No.: US 12,730,889 B2
(45) Date of Patent: Sep. 8, 2026

(54) SYSTEMS AND METHODS FOR MACHINE LEARNING-BASED EVENT SIMILARITY DETECTION, EVENT SIMILARITY EXPLAINABILITY, AND EVENT HANDLING

(71) Applicant: Expel, Inc., Herndon, VA (US)

(72) Inventor: Jane Hung, Raleigh, NC (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 19/235,089

(22) Filed: Jun. 11, 2025

(65) Prior Publication Data

US 2026/0170128 A1 Jun. 18, 2026

Related U.S. Application Data

(60) Provisional application No. 63/778,589, filed on Mar. 27, 2025, provisional application No. 63/758,454, filed on Feb. 14, 2025, provisional application No. 63/659,562, filed on Jun. 13, 2024.

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC ........................ G06F 21/554; G06F 2221/033
USPC .......................................................... 726/23
See application file for complete search history.

(56) References Cited

U.S. PATENT DOCUMENTS 10,438,000 B1 * 10/2019 Gu ........................ G06F 21/554
11,693,959 B2 * 7/2023 Silberman ............ G06F 21/554 726/22
2020/0272963 A1 * 8/2020 Chait ................. G06Q 10/0635
2021/0182874 A1 * 6/2021 Gurnov .................... G06N 3/08
2021/0226863 A1 * 7/2021 Nucci ..................... H04L 43/50
2023/0224325 A1 * 7/2023 Mautone ................. G06F 21/31 726/22
2025/0165599 A1 * 5/2025 Bhatt .................... G06F 21/562
2025/0247401 A1 * 7/2025 Singla ................. H04L 63/1416

FOREIGN PATENT DOCUMENTS

CN 113785318 A * 12/2021 ......... G06Q 10/0635

* cited by examiner

*Primary Examiner* — David P Zarka
(74) *Attorney, Agent, or Firm* — Padowithz Alce; Chandler Scheitlin; Alce PLLC

(57) ABSTRACT

A system, method, and computer-program product includes obtaining a security event, retrieving a set of historical security events related to the security event in response to searching an embeddings space, automatically generating a plurality of metadata similarity assessment prompts and a plurality of proposed event handling prompts after retrieving the set of historical security events, automatically providing the plurality of metadata similarity assessment prompts and the plurality of proposed event handling prompts to one or more language models, obtaining, from the one or more language models, a plurality of metadata similarity findings and a plurality of proposed event handling actions based on the one or more language models processing the plurality of metadata similarity assessment prompts and the plurality of proposed event handling prompts, and displaying, on a user interface, the security event in association with the plurality of metadata similarity findings and the plurality of proposed event handling actions.

20 Claims, 28 Drawing Sheets

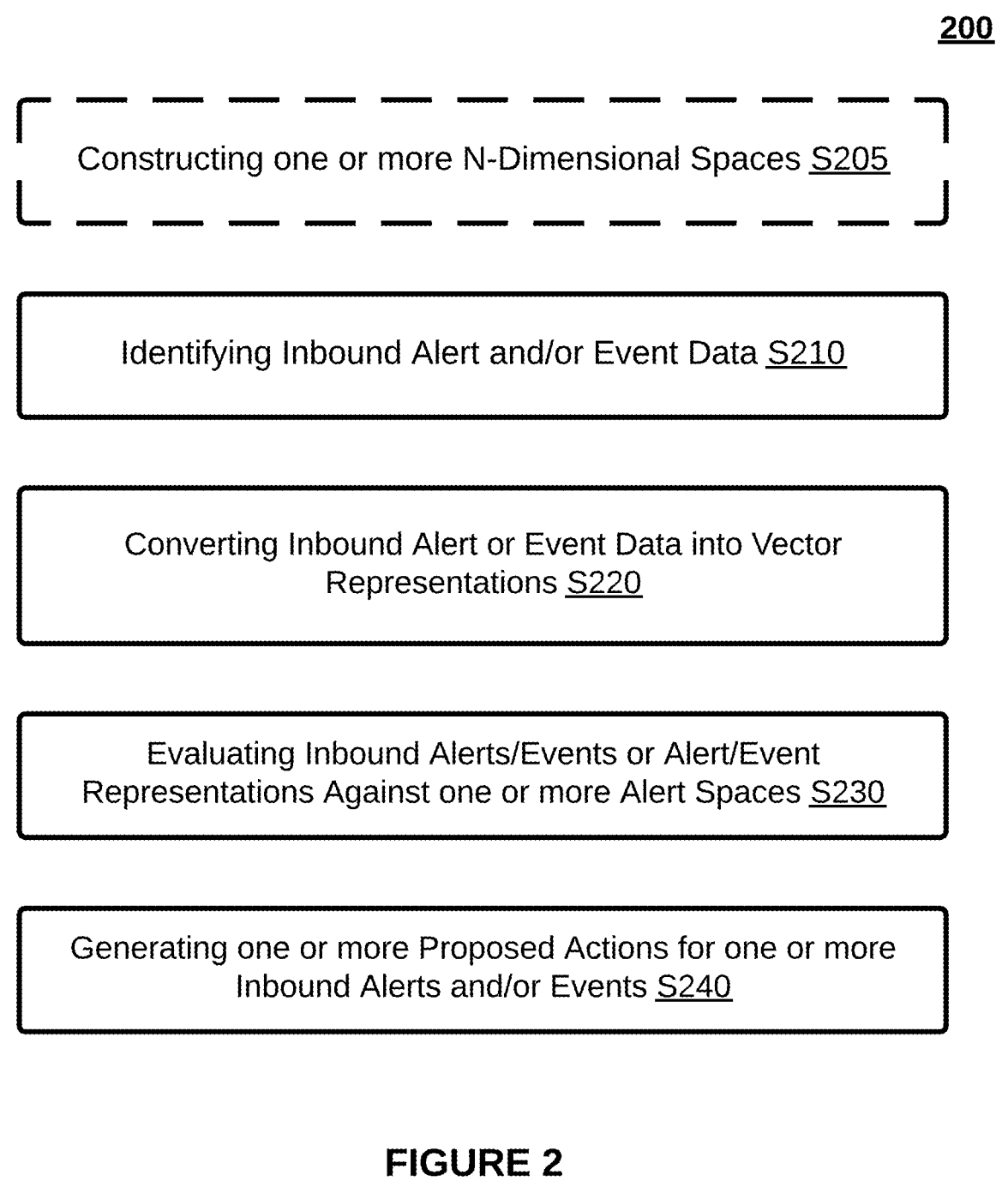

200

Constructing one or more N-Dimensional Spaces S205

Identifying Inbound Alert and/or Event Data S210

Converting Inbound Alert or Event Data into Vector Representations S220

Evaluating Inbound Alerts/Events or Alert/Event Representations Against one or more Alert Spaces S230

Generating one or more Proposed Actions for one or more Inbound Alerts and/or Events S240

FIGURE 2

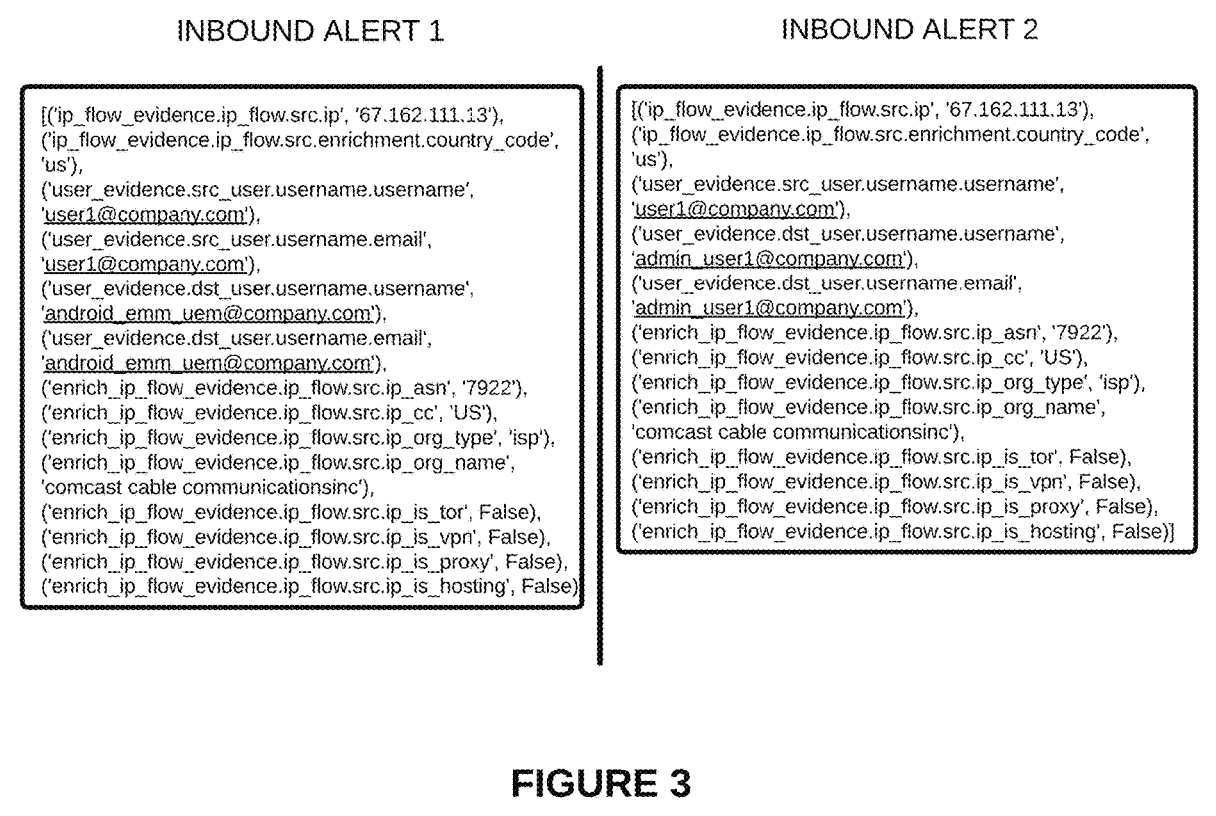

INBOUND ALERT 1

[('ip_flow_evidence.ip_flow.src.ip', '67.162.111.13'),
('ip_flow_evidence.ip_flow.src.enrichment.country_code',
'us'),
('user_evidence.src_user.username.username',
'user1@company.com'),
('user_evidence.src_user.username.email',
'user1@company.com'),
('user_evidence.dst_user.username.username',
'android_emm_uem@company.com'),
('user_evidence.dst_user.username.email',
'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name',
'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)

INBOUND ALERT 2

[('ip_flow_evidence.ip_flow.src.ip', '67.162.111.13'),
('ip_flow_evidence.ip_flow.src.enrichment.country_code',
'us'),
('user_evidence.src_user.username.username',
'user1@company.com'),
('user_evidence.dst_user.username.username',
'admin_user1@company.com'),
('user_evidence.dst_user.username.email',
'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name',
'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

FIGURE 3

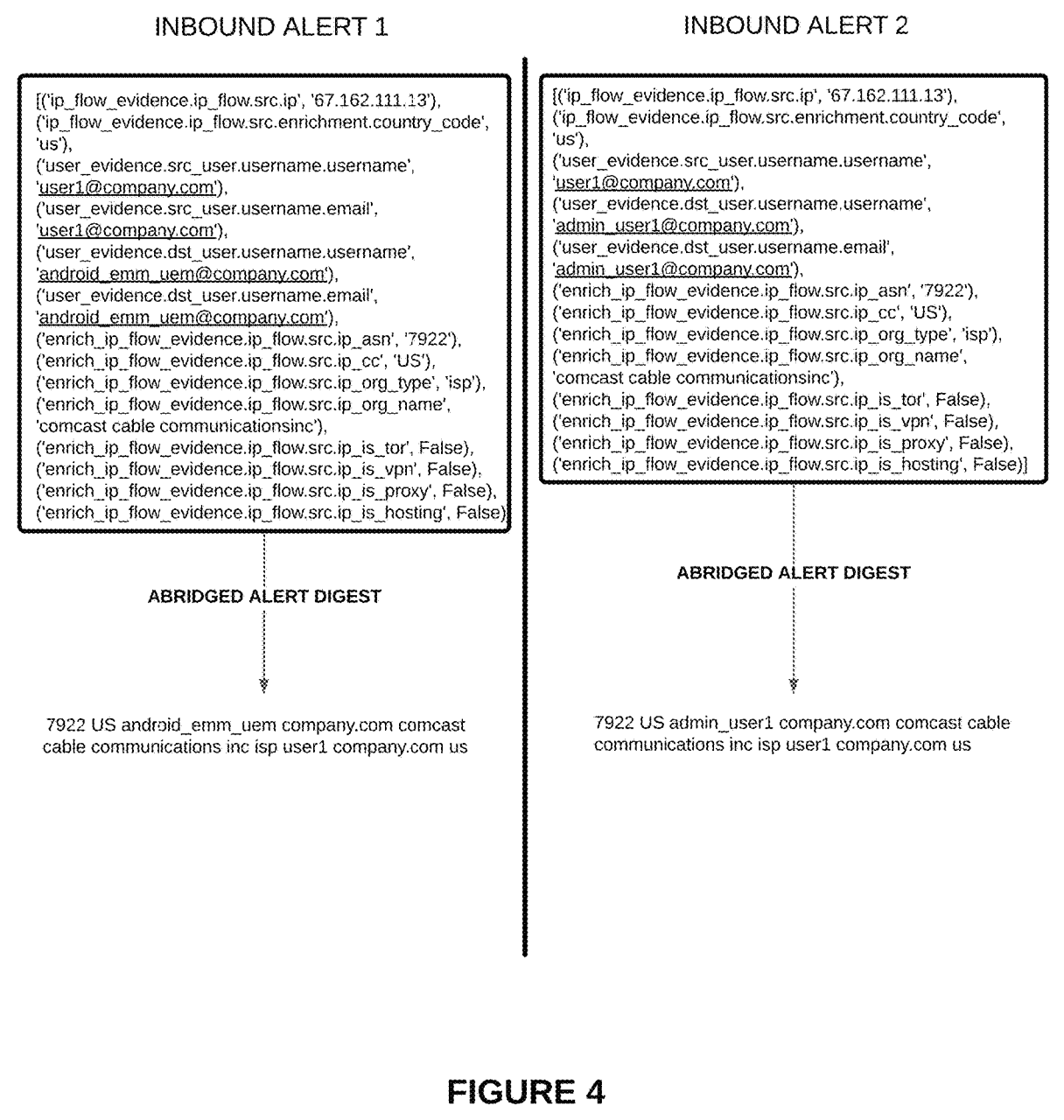

INBOUND ALERT 1

[('ip_flow_evidence.ip_flow.src.ip', '67.162.111.13'),
('ip_flow_evidence.ip_flow.src.enrichment.country_code',
'us'),
('user_evidence.src_user.username.username',
'user1@company.com'),
('user_evidence.src_user.username.email',
'user1@company.com'),
('user_evidence.dst_user.username.username',
'android_emm_uem@company.com'),
('user_evidence.dst_user.username.email',
'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name',
'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)

ABRIDGED ALERT DIGEST

7922 US android_emm_uem company.com comcast cable communications inc isp user1 company.com us

INBOUND ALERT 2

[('ip_flow_evidence.ip_flow.src.ip', '67.162.111.13'),
('ip_flow_evidence.ip_flow.src.enrichment.country_code',
'us'),
('user_evidence.src_user.username.username',
'user1@company.com'),
('user_evidence.dst_user.username.username',
'admin_user1@company.com'),
('user_evidence.dst_user.username.email',
'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name',
'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

ABRIDGED ALERT DIGEST

7922 US admin_user1 company.com comcast cable communications inc isp user1 company.com us

FIGURE 4

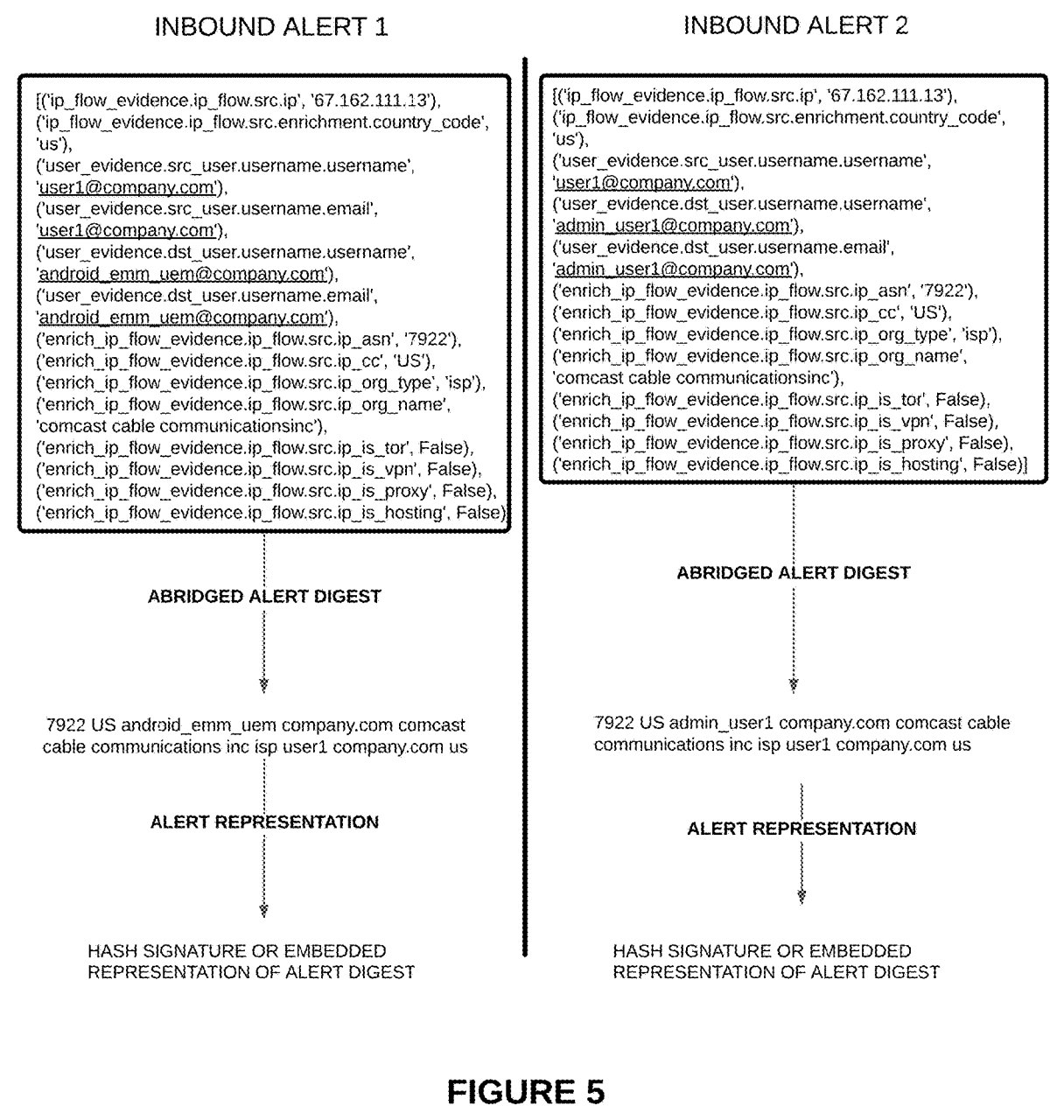

INBOUND ALERT 1

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.src_user.username.email', 'user1@company.com'),
('user_evidence.dst_user.username.username', 'android_emm_uem@company.com'),
('user_evidence.dst_user.username.email', 'android_emm_uem@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)

ABRIDGED ALERT DIGEST

7922 US android_emm_uem company.com comcast cable communications inc isp user1 company.com us

ALERT REPRESENTATION

HASH SIGNATURE OR EMBEDDED REPRESENTATION OF ALERT DIGEST

INBOUND ALERT 2

[('ip_flow_evidence.ip_flow.src.ip', '67.162.111.13'),
('ip_flow_evidence.ip_flow.src.enrichment.country_code', 'us'),
('user_evidence.src_user.username.username', 'user1@company.com'),
('user_evidence.dst_user.username.username', 'admin_user1@company.com'),
('user_evidence.dst_user.username.email', 'admin_user1@company.com'),
('enrich_ip_flow_evidence.ip_flow.src.ip_asn', '7922'),
('enrich_ip_flow_evidence.ip_flow.src.ip_cc', 'US'),
('enrich_ip_flow_evidence.ip_flow.src.ip_org_type', 'isp'),
('enrich_ip_flow_evidence.ip_flow.src.ip_org_name', 'comcast cable communicationsinc'),
('enrich_ip_flow_evidence.ip_flow.src.ip_is_tor', False),
('enrich_ip_flow_evidence.ip_flow.src.ip_is_vpn', False),
('enrich_ip_flow_evidence.ip_flow.src.ip_is_proxy', False),
('enrich_ip_flow_evidence.ip_flow.src.ip_is_hosting', False)]

ABRIDGED ALERT DIGEST

7922 US admin_user1 company.com comcast cable communications inc isp user1 company.com us

ALERT REPRESENTATION

HASH SIGNATURE OR EMBEDDED REPRESENTATION OF ALERT DIGEST

FIGURE 5

Figure 7:
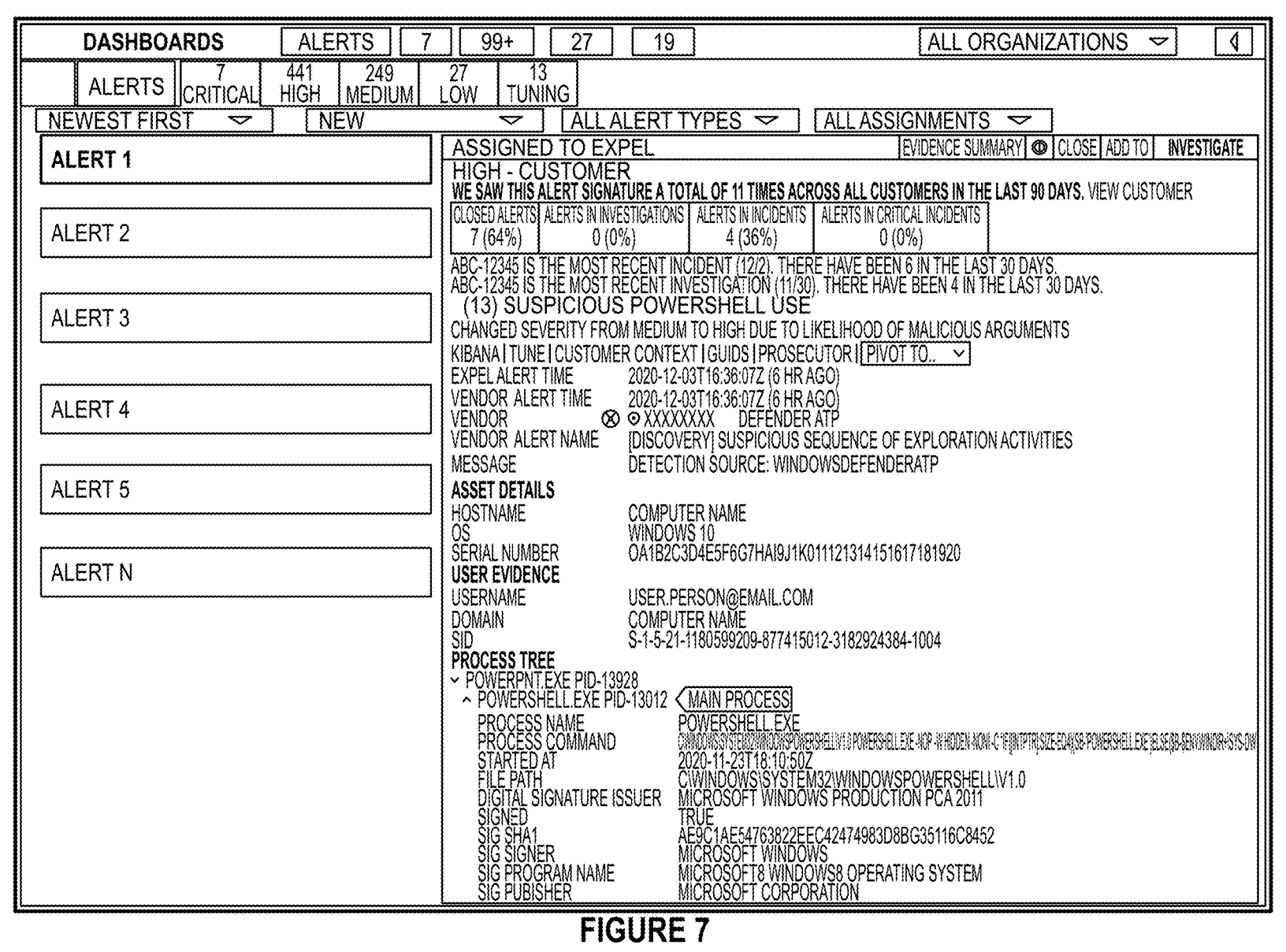

DASHBOARDS | ALERTS | 7 | 99+ | 27 | 19 | ALL ORGANIZATIONS

ALERTS | 7 CRITICAL | 441 HIGH | 249 MEDIUM | 27 LOW | 13 TUNING

NEWEST FIRST | NEW | ALL ALERT TYPES | ALL ASSIGNMENTS

ALERT 1
ALERT 2
ALERT 3
ALERT 4
ALERT 5
ALERT N

ASSIGNED TO EXPEL | EVIDENCE SUMMARY | CLOSE | ADD TO | INVESTIGATE

HIGH - CUSTOMER

WE SAW THIS ALERT SIGNATURE A TOTAL OF 11 TIMES ACROSS ALL CUSTOMERS IN THE LAST 90 DAYS. VIEW CUSTOMER

| CLOSED ALERTS | ALERTS IN INVESTIGATIONS | ALERTS IN INCIDENTS | ALERTS IN CRITICAL INCIDENTS |
|---|---|---|---|
| 7 (64%) | 0 (0%) | 4 (36%) | 0 (0%) |

ABC-12345 IS THE MOST RECENT INCIDENT (12/2). THERE HAVE BEEN 6 IN THE LAST 30 DAYS.
ABC-12345 IS THE MOST RECENT INVESTIGATION (11/30). THERE HAVE BEEN 4 IN THE LAST 30 DAYS.

(13) SUSPICIOUS POWERSHELL USE

CHANGED SEVERITY FROM MEDIUM TO HIGH DUE TO LIKELIHOOD OF MALICIOUS ARGUMENTS

KIBANA | TUNE | CUSTOMER CONTEXT | GUIDS | PROSECUTOR | PIVOT TO...

EXPEL ALERT TIME 2020-12-03T16:36:07Z (6 HR AGO)
VENDOR ALERT TIME 2020-12-03T16:36:07Z (6 HR AGO)
VENDOR XXXXXXXX DEFENDER ATP
VENDOR ALERT NAME [DISCOVERY] SUSPICIOUS SEQUENCE OF EXPLORATION ACTIVITIES
MESSAGE DETECTION SOURCE: WINDOWSDEFENDERATP

ASSET DETAILS
HOSTNAME COMPUTER NAME
OS WINDOWS 10
SERIAL NUMBER OA1B2C3D4E5F6G7HAI9J1K01112131415161718 1920

USER EVIDENCE
USERNAME USER.PERSON@EMAIL.COM
DOMAIN COMPUTER NAME
SID S-1-5-21-1180599209-877415012-3182924384-1004

PROCESS TREE
POWERPNT.EXE PID-13928
POWERSHELL.EXE PID-13012 MAIN PROCESS
PROCESS NAME POWERSHELL.EXE
PROCESS COMMAND [illegible]
STARTED AT 2020-11-23T18:10:50Z
FILE PATH C\WINDOWS\SYSTEM32\WINDOWSPOWERSHELL\V1.0
DIGITAL SIGNATURE ISSUER MICROSOFT WINDOWS PRODUCTION PCA 2011
SIGNED TRUE
SIG SHA1 AE9C1AE54763822EEC42474983D8BG35116C8452
SIG SIGNER MICROSOFT WINDOWS
SIG PROGRAM NAME MICROSOFT8 WINDOWS8 OPERATING SYSTEM
SIG PUBISHER MICROSOFT CORPORATION

OBTAINING, VIA ONE OR MORE COMPUTERS, A TARGET SECURITY EVENT COMPRISING A PLURALITY OF DISTINCT PIECES OF METADATA

S310

RETRIEVING, VIA THE ONE OR MORE COMPUTERS, A SET OF HISTORICAL SECURITY EVENTS RELATED TO THE TARGET SECURITY EVENT IN RESPONSE TO SEARCHING AN N-DIMENSIONAL EMBEDDINGS SPACE STORING A PLURALITY OF EMBEDDING VALUES THAT CORRESPOND TO A PLURALITY OF HISTORICAL SECURITY EVENTS

S320

AUTOMATICALLY GENERATING, VIA THE ONE OR MORE COMPUTERS, (I) A PLURALITY OF METADATA SIMILARITY ASSESSMENT PROMPTS AND (II) A PLURALITY OF PROPOSED EVENT HANDLING PROMPTS IN RESPONSE TO RETRIEVING THE SET OF HISTORICAL SECURITY EVENTS, WHEREIN:

EACH METADATA SIMILARITY ASSESSMENT PROMPT OF THE PLURALITY OF METADATA SIMILARITY ASSESSMENT PROMPTS INCLUDES A DISTINCT SET OF METADATA ASSESSMENT INSTRUCTIONS FOR EVALUATING AN EXTENT OF METADATA SIMILARITY BETWEEN THE TARGET SECURITY EVENT AND THE SET OF HISTORICAL SECURITY EVENTS FOR A DISTINCT METADATA TYPE, AND

EACH PROPOSED EVENT HANDLING PROMPT OF THE PLURALITY OF PROPOSED EVENT HANDLING PROMPTS INCLUDES A DISTINCT SET OF EVENT HANDLING INSTRUCTIONS FOR DETERMINING ONE OR MORE EVENT HANDLING ACTIONS OF A DISTINCT EVENT HANDLING ACTION TYPE FOR THE TARGET SECURITY EVENT

S330

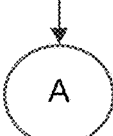

FIGURE 11

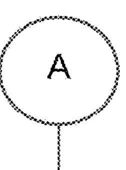

AUTOMATICALLY PROVIDING THE PLURALITY OF METADATA SIMILARITY ASSESSMENT PROMPTS AND THE PLURALITY OF PROPOSED EVENT HANDLING PROMPTS TO ONE OR MORE LANGUAGE MODELS BASED ON GENERATING THE PLURALITY OF METADATA SIMILARITY ASSESSMENT PROMPTS AND THE PLURALITY OF PROPOSED EVENT HANDLING PROMPTS

S340

OBTAINING, FROM THE ONE OR MORE LANGUAGE MODELS, A PLURALITY OF METADATA SIMILARITY FINDINGS AND A PLURALITY OF PROPOSED EVENT HANDLING ACTIONS IN RESPONSE TO THE ONE OR MORE LANGUAGE MODELS PROCESSING THE PLURALITY OF METADATA SIMILARITY ASSESSMENT PROMPTS AND THE PLURALITY OF PROPOSED EVENT HANDLING PROMPTS

S350

DISPLAYING, ON A GRAPHICAL USER INTERFACE, THE TARGET SECURITY EVENT IN ASSOCIATION WITH THE PLURALITY OF METADATA SIMILARITY FINDINGS AND THE PLURALITY OF PROPOSED EVENT HANDLING ACTIONS

S360

EXECUTING, VIA THE ONE OR MORE COMPUTERS, A THREAT MITIGATION ACTION OR AN EVENT DISPOSAL ACTION FOR THE TARGET SECURITY EVENT BASED ON EVALUATING, VIA THE GRAPHICAL USER INTERFACE, THE TARGET SECURITY EVENT AGAINST THE PLURALITY OF METADATA SIMILARITY FINDINGS AND THE PLURALITY OF PROPOSED EVENT HANDLING ACTIONS

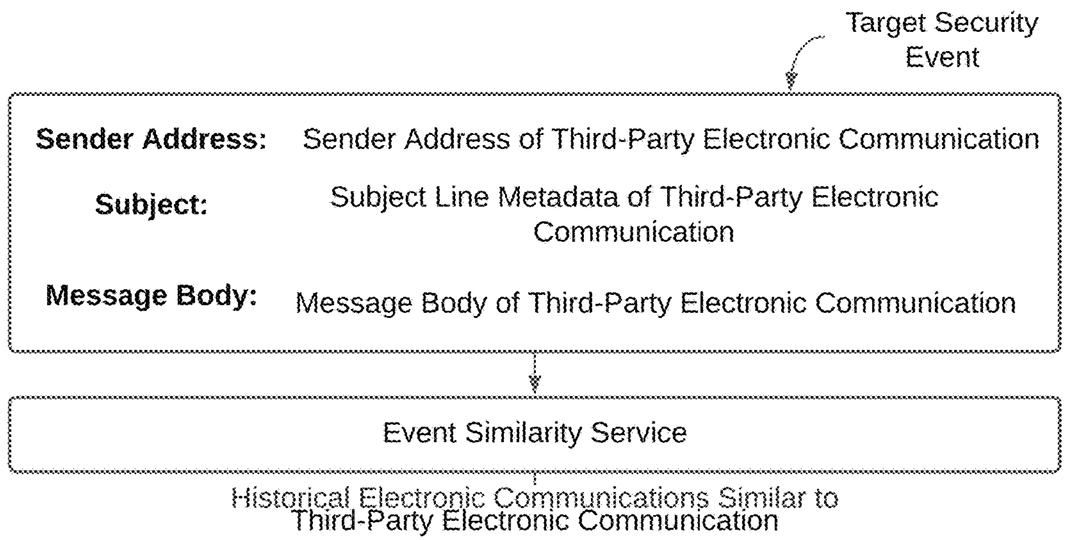

| Historical Electronic Communications | IP Address | Sender Address | Message Body | Subject Line Metadata |
|---|---|---|---|---|
| Historical Electronic Communication "A" | 123.123.123.123 | billing-receipts-noreply@acme.com | Message Body of Historical Electronic Communication "A" | Subject Line Metadata of Historical Electronic Communication "A" |
| Historical Electronic Communication "B" | 123.123.123.123 | payment-receipts-noreply@acme.com | Message Body of Historical Electronic Communication "B" | Subject Line Metadata of Historical Electronic Communication "B" |

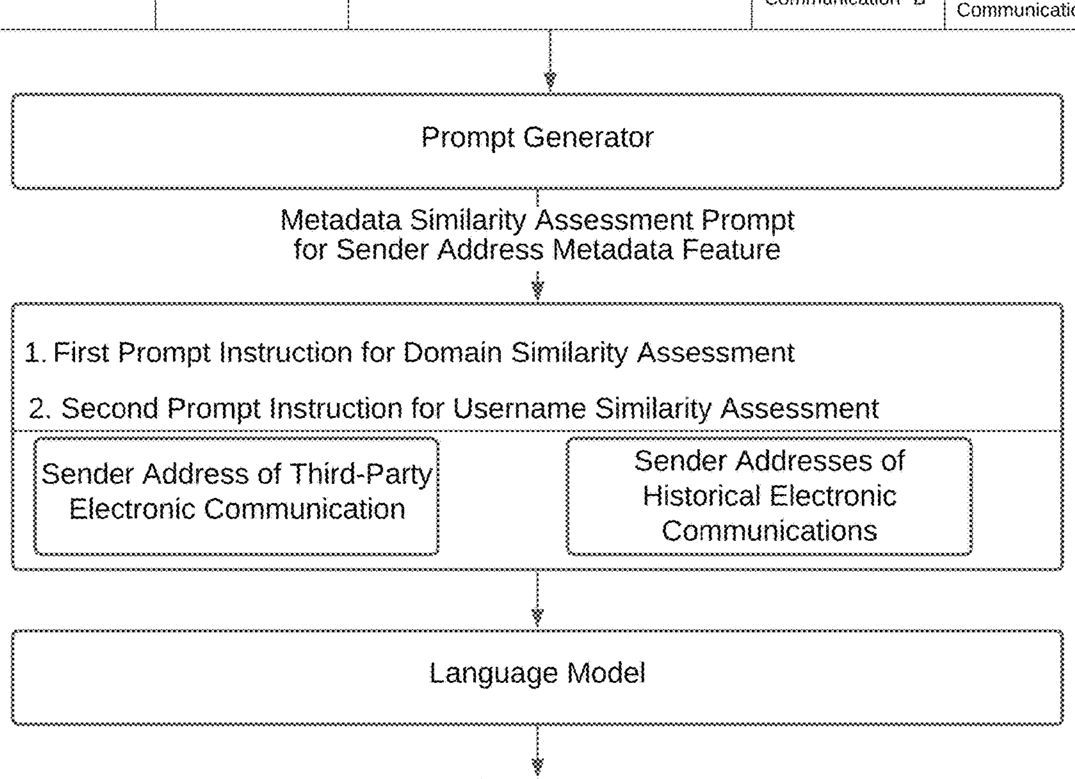

Metadata Similarity Finding for Sender Address Metadata Feature

FIGURE 16

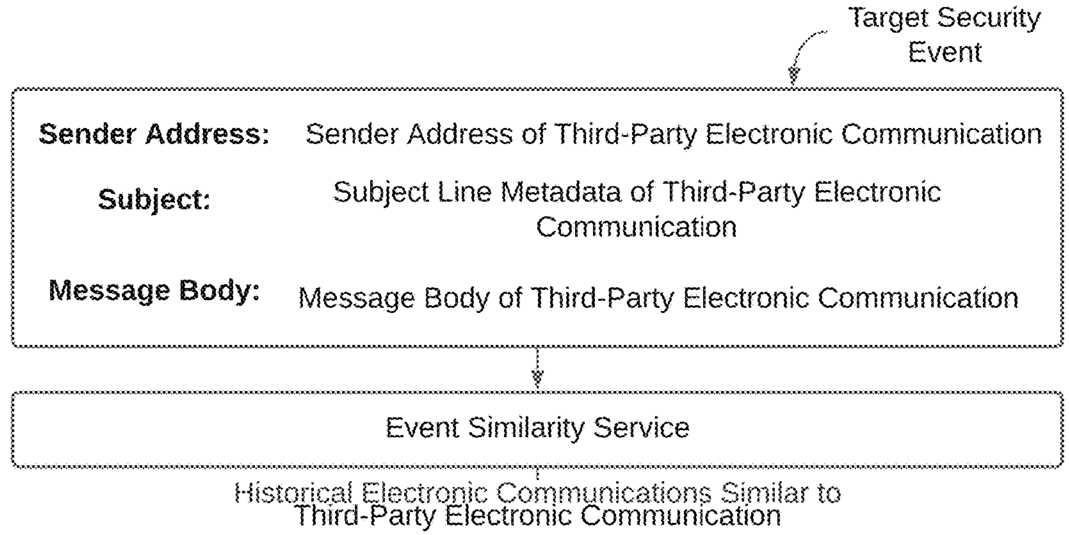

| Historical Electronic Communications | IP Address | Sender Address | Message Body | Subject Line Metadata |
|---|---|---|---|---|
| Historical Electronic Communication "A" | 123.123.123.123 | billing-receipts-noreply@acme.com | Message Body of Historical Electronic Communication "A" | Subject Line Metadata of Historical Electronic Communication "A" |
| Historical Electronic Communication "B" | 123.123.123.123 | payment-receipts-noreply@acme.com | Message Body of Historical Electronic Communication "B" | Subject Line Metadata of Historical Electronic Communication "B" |

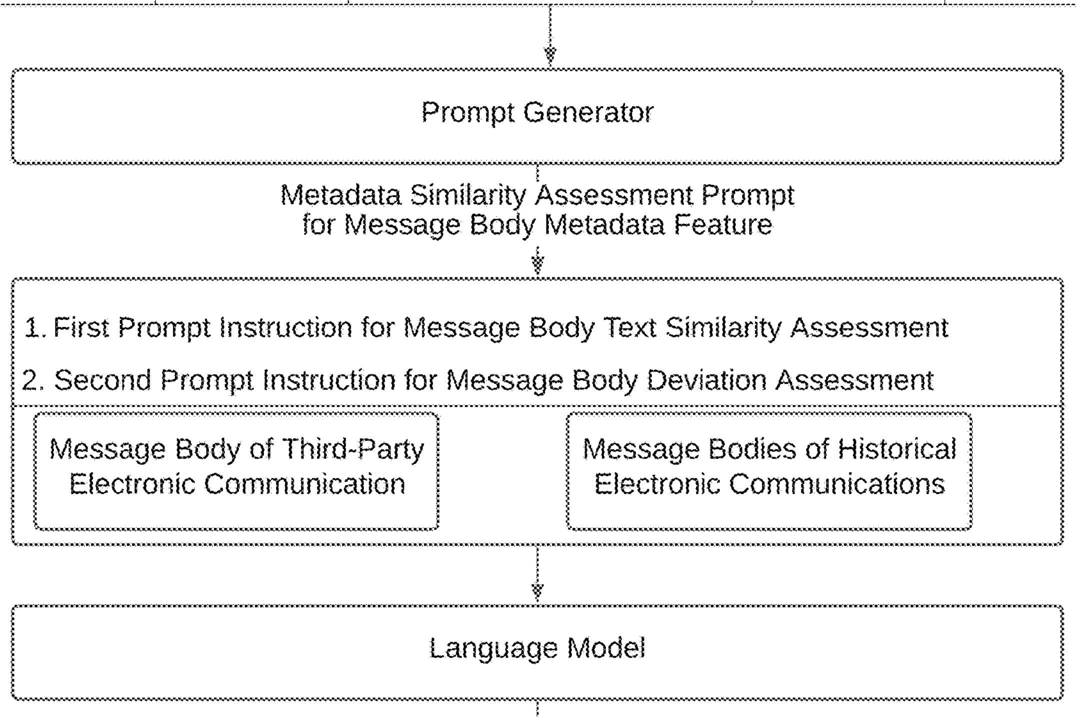

Metadata Similarity Finding for Message Body Metadata Feature

FIGURE 17

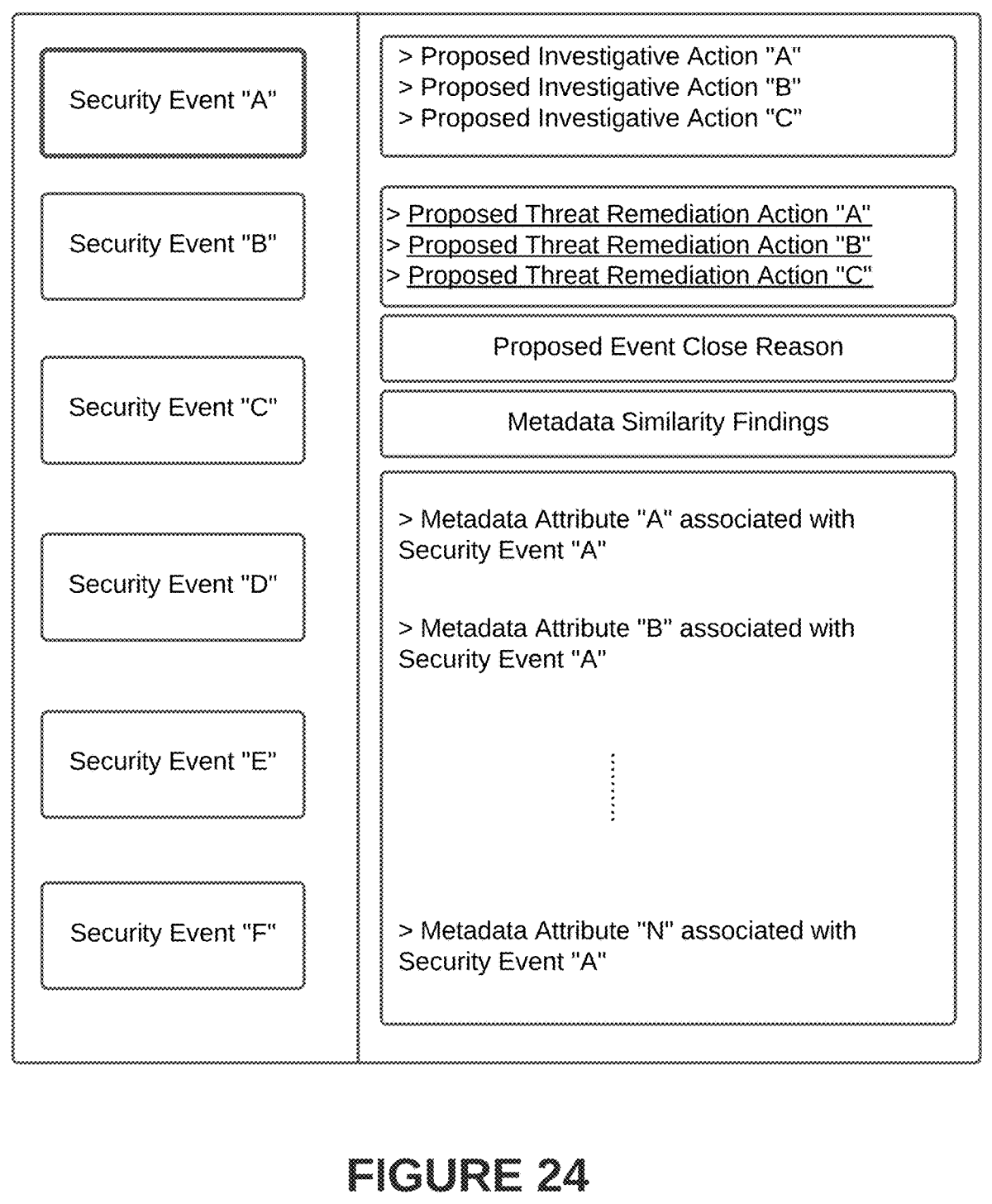

Security Event "A"

Security Event "B"

Security Event "C"

Security Event "D"

Security Event "E"

Security Event "F"

> Proposed Investigative Action "A"
> Proposed Investigative Action "B"
> Proposed Investigative Action "C"

> Proposed Threat Remediation Action "A"
> Proposed Threat Remediation Action "B"
> Proposed Threat Remediation Action "C"

Proposed Event Close Reason

Metadata Similarity Findings

> Metadata Attribute "A" associated with Security Event "A"

> Metadata Attribute "B" associated with Security Event "A"

> Metadata Attribute "N" associated with Security Event "A"

FIGURE 24

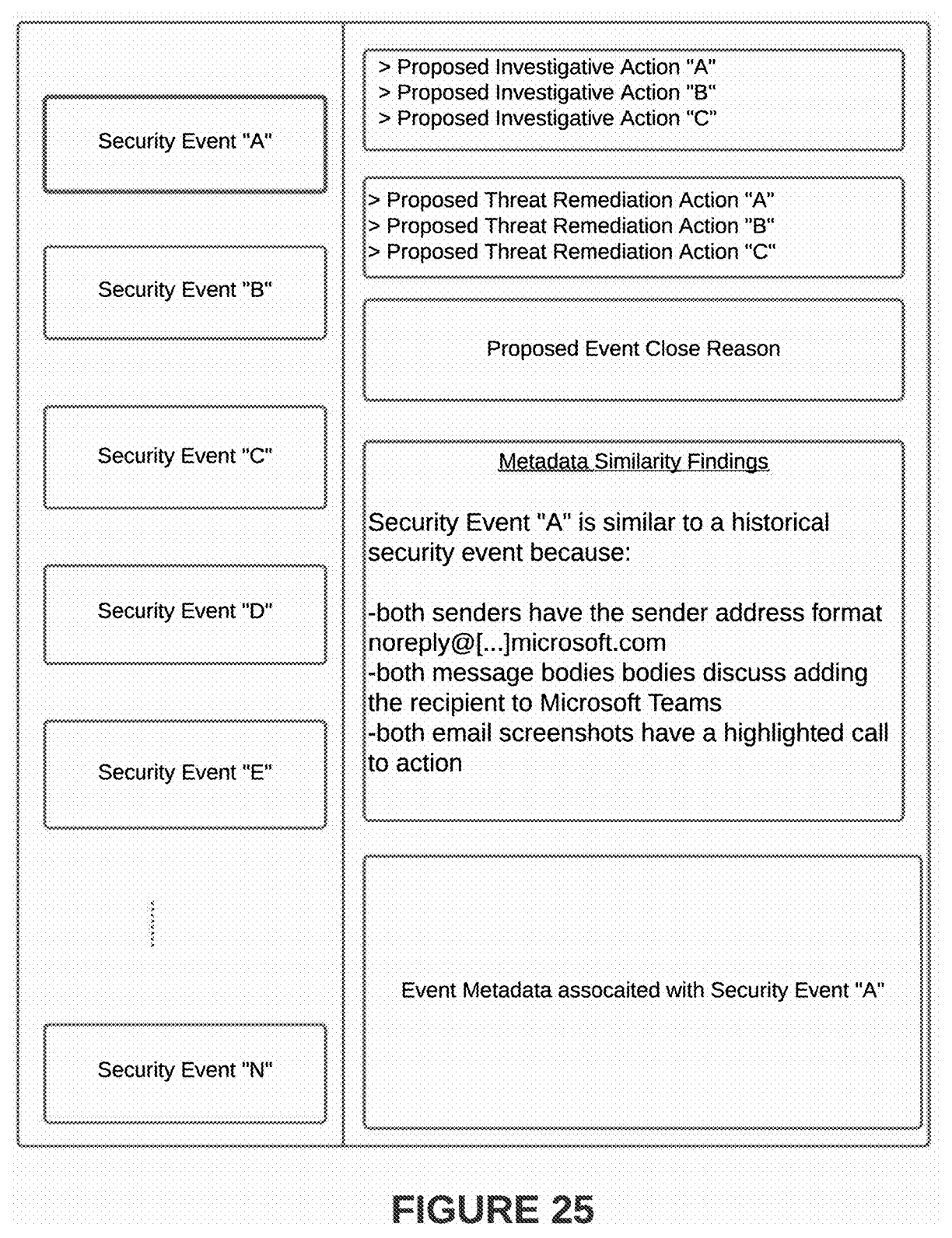

Security Event "A"

Security Event "B"

Security Event "C"

Security Event "D"

Security Event "E"

Security Event "N"

> Proposed Investigative Action "A"
> Proposed Investigative Action "B"
> Proposed Investigative Action "C"

> Proposed Threat Remediation Action "A"
> Proposed Threat Remediation Action "B"
> Proposed Threat Remediation Action "C"

Proposed Event Close Reason

Metadata Similarity Findings

Security Event "A" is similar to a historical security event because:

-both senders have the sender address format noreply@[...]microsoft.com
-both message bodies bodies discuss adding the recipient to Microsoft Teams
-both email screenshots have a highlighted call to action Event Metadata assocaited with Security Event "A"

FIGURE 25

Based on how similar historical security events were triaged, here are suggested remediation actions:

1. Remediate by removing the malicious email
2. Remediate by blocking the sender

SYSTEMS AND METHODS FOR MACHINE LEARNING-BASED EVENT SIMILARITY DETECTION, EVENT SIMILARITY EXPLAINABILITY, AND EVENT HANDLING

CROSS-REFERENCE TO RELATED APPLICATIONS

This application claims the benefit of U.S. Provisional Application No. 63/778,589, filed 27 Mar. 2025, U.S. Provisional Application No. 63/758,454, filed 14 Feb. 2025, and U.S. Provisional Application No. 63/659,562, filed 13 Jun. 2024, which are incorporated in their entireties by this reference.

TECHNICAL FIELD

This invention relates generally to the cybersecurity field, and more specifically to new and useful cyber threat detection and mitigation systems and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets.

The embodiments of the present application described herein provide technical solutions that address, at least the need described above.

BRIEF SUMMARY OF THE EMBODIMENTS

In one embodiment, a computer-implemented method for accelerating a threat mitigation or disposal of inbound security events includes obtaining, via one or more computers, a target security event comprising a plurality of distinct pieces of metadata; retrieving, in real-time via the one or more computers, a set of historical security events related to the target security event in response to searching an n-dimensional embeddings space storing a plurality of embedding values that correspond to a plurality of historical security events; automatically generating, via the one or more computers, (i) a plurality of metadata similarity assessment prompts and (ii) a plurality of proposed event handling prompts in response to retrieving the set of historical security events, wherein: each metadata similarity assessment prompt of the plurality of metadata similarity assessment prompts includes a distinct set of metadata assessment instructions for evaluating an extent of metadata similarity between the target security event and the set of historical security events for a distinct metadata type, and each proposed event handling prompt of the plurality of proposed event handling prompts includes a distinct set of event handling instructions for determining one or more event handling actions of a distinct event handling action type for the target security event; automatically providing the plurality of metadata similarity assessment prompts and the plurality of proposed event handling prompts to one or more language models based on generating the plurality of metadata similarity assessment prompts and the plurality of proposed event handling prompts; obtaining, from the one or more language models, a plurality of metadata similarity findings and a plurality of proposed event handling actions in response to the one or more language models processing the plurality of metadata similarity assessment prompts and the plurality of proposed event handling prompts; displaying, on a graphical user interface, the target security event in association with the plurality of metadata similarity findings and the plurality of proposed event handling actions; and executing, via the one or more computers, a threat mitigation action or an event disposal action for the target security event based on evaluating the target security event against the plurality of metadata similarity findings and the plurality of proposed event handling actions displayed on the graphical user interface.

In one embodiment, the target security event is a new security event that has not been previously investigated by a cybersecurity event detection and response service, the target security event involves one or more computing assets or one or more digital assets of a subscriber subscribing to the cybersecurity event detection and response service, and the threat mitigation action or the event disposal action executed for the target security event is performed in real-time or near real-time after obtaining the target security event.

In one embodiment, the plurality of metadata similarity findings and the plurality of proposed event handling actions are simultaneously generated in real-time after obtaining the target security event, the plurality of metadata similarity findings outputted by the one or more language models textually indicates a degree of similarity between the target security event and the set of historical security events across a plurality of distinct metadata types, the plurality of proposed event handling actions outputted by the one or more language models includes one or more proposed investigative actions that should be performed to assess whether the target security event corresponds to a security threat, and the plurality of proposed event handling actions outputted by the one or more language models further includes one or more proposed threat mitigation actions that should be performed to mitigate the security threat when the target security event corresponds to the security threat.

In one embodiment, the graphical user interface includes a selectable user interface object that, when selected, executes the event disposal action.

In one embodiment, the computer-implemented method further includes while displaying the graphical user interface: receiving an input selecting the selectable user interface object, and in response to receiving the input, automatically executing the event disposal action, wherein automatically executing the event disposal action includes closing the target security event.

In one embodiment, the target security event includes a representation of a third-party electronic communication that a subscriber received from an external entity, the plurality of distinct pieces of metadata of the target security event includes a sender address of the third-party electronic communication, a message body of the third-party electronic communication, and subject line metadata of the third-party electronic communication, each historical security event of the set of historical security events includes at least one piece of metadata equivalent or substantially equivalent to a corresponding piece of metadata of the target security event, and the set of historical security events include a plurality of historical electronic communications related to the third-party electronic communication.

In one embodiment, automatically generating the plurality of metadata similarity assessment prompts includes generating a first distinct metadata similarity assessment prompt configured to evaluate the extent of metadata similarity between the target security event and the set of historical security events based on a sender address metadata feature, generating the first distinct metadata similarity assessment prompt includes: instantiating, via the one or more computers, an instance of a prompt template of a plurality of predefined metadata similarity assessment prompt templates that corresponds to the sender address metadata feature, obtaining, via the one or more computers, the sender address of the third-party electronic communication, obtaining, via the one or more computers, a set of sender addresses that correspond to the plurality of historical electronic communications, and populating, within the instance of the prompt template that corresponds to the sender address metadata feature, the sender address of the third-party electronic communication and the set of sender addresses that correspond to the plurality of historical electronic communications.

In one embodiment, the instance of the prompt template that corresponds to the sender address metadata feature includes at least: a first instruction that instructs the one or more language models to perform a domain similarity assessment to identify if a domain pattern exists between the sender address of the third-party electronic communication and the set of sender addresses that correspond to the plurality of historical electronic communications, and a second instruction that instructs the one or more language models to perform a username similarity assessment to identify if a username pattern exists between the sender address of the third-party electronic communication and the set of sender addresses that correspond to the plurality of historical electronic communications.

In one embodiment, the one or more language models perform the domain similarity assessment and the username similarity assessment in response to the one or more language models receiving the first distinct metadata similarity assessment prompt, the one or more language models output a textual summary that includes: the domain pattern identified between the third-party electronic communication and the plurality of historical electronic communications, and the username pattern identified between the third-party electronic communication and the plurality of historical electronic communications, and the graphical user interface further displays the textual summary.

In one embodiment, automatically generating the plurality of metadata similarity assessment prompts includes generating a second distinct metadata similarity assessment prompt configured to evaluate the extent of metadata similarity between the target security event and the set of historical security events based on a message body metadata feature, generating the second distinct metadata similarity assessment prompt includes: instantiating, via the one or more computers, an instance of a prompt template of the plurality of predefined metadata similarity assessment prompt templates that corresponds to the message body metadata feature, obtaining, via the one or more computers, the message body of the third-party electronic communication, obtaining, via the one or more computers, a set of message bodies that correspond to the plurality of historical electronic communications, and populating, within the instance of the prompt template that corresponds to the message body metadata feature, the message body of the third-party electronic communication and the set of message bodies that correspond to the plurality of historical electronic communications.

In one embodiment, the instance of the prompt template that corresponds to the message body metadata feature includes at least: a first instruction that instructs the one or more language models to perform a text similarity assessment to identify if a message body pattern exists between the message body of the third-party electronic communication and the set of message bodies that correspond to the plurality of historical electronic communications, and a second instruction that instructs the one or more language models to perform a message body deviation assessment to identify if a message body deviation exists between the message body of the third-party electronic communication and the set of message bodies that correspond to the plurality of historical electronic communications.

In one embodiment, the one or more language models perform the text similarity assessment and the message body deviation assessment in response to the one or more language models receiving the second distinct metadata similarity assessment prompt, the one or more language models output a textual summary that includes: the message body pattern identified between the third-party electronic communication and the plurality of historical electronic communications, and one or more message body deviations identified between the third-party electronic communication and the plurality of historical electronic communications, and the graphical user interface further displays the textual summary.

In one embodiment, automatically generating the plurality of metadata similarity assessment prompts includes generating a third distinct metadata similarity assessment prompt configured to evaluate the extent of metadata similarity between the target security event and the set of historical security events based on an electronic communication subject feature, generating the third distinct metadata similarity assessment prompt includes: instantiating, via the one or more computers, an instance of a prompt template of the plurality of predefined metadata similarity assessment prompt templates that corresponds to the electronic communication subject feature, obtaining, via the one or more computers, the subject line metadata of the third-party electronic communication, obtaining, via the one or more computers, a corresponding set of subject line metadata that correspond to the plurality of historical electronic communications, and populating, within the instance of the prompt template that corresponds to the electronic communication subject feature, the subject line metadata of the third-party electronic communication and the corresponding set of subject line metadata that correspond to the plurality of historical electronic communications.

In one embodiment, the instance of the prompt template that corresponds to the electronic communication subject feature includes at least: a first instruction that instructs the one or more language models to perform a subject similarity assessment to determine if a subject pattern exists between the subject line metadata of the third-party electronic communication and the corresponding set of subject line metadata that correspond to the plurality of historical electronic communications.

In one embodiment, the one or more language models perform the subject similarity assessment in response to the one or more language models receiving the third distinct metadata similarity assessment prompt, and the one or more language models output a textual summary that includes: the subject pattern identified between the third-party electronic communication and the plurality of historical electronic communications, and the graphical user interface further displays the textual summary.

In one embodiment, automatically generating the plurality of proposed event handling prompts includes generating an investigative actions prompt that instructs the one or more language models to propose one or more investigative actions for the target security event, generating the investigative actions prompt includes instantiating, via the one or more computers, an instance of a prompt template of a plurality of predefined event handling prompt templates that corresponds to an investigative actions prompt template, obtaining, via the one or more computers, a corpus of historical investigative actions that corresponds to the set of historical security events, wherein the corpus of historical investigative actions includes each investigation action that was performed during a respective security investigation for each historical security event of the set of historical security events, and populating, within the instance of the prompt template that corresponds to the investigative actions prompt template, the corpus of historical investigative actions that correspond to the set of historical security events.

In one embodiment, the investigative actions prompt includes at least one instruction that instructs the one or more language models to propose the one or more investigative actions for the target security event based on assessing at least the corpus of historical investigative actions and a set of investigation action protocols defined by a cybersecurity event detection and response service, the one or more language models outputs the one or more investigative actions in response to the one or more language models receiving the investigative actions prompt, and the graphical user interface further displays the one or more investigative actions.

In one embodiment, automatically generating the plurality of proposed event handling prompts includes generating a remediation actions prompt that instructs the one or more language models to propose one or more remediation actions for the target security event, generating the remediation actions prompt includes instantiating, via the one or more computers, an instance of a prompt template of the plurality of predefined event handling prompt templates that corresponds to a remediation actions prompt template, obtaining, via the one or more computers, a corpus of historical remediations actions that corresponds to the set of historical security events, wherein the corpus of historical remediation actions includes each remediation action that was proposed to mitigate a security threat associated with each respective historical security event of the set of historical security events, and populating, within the instance of the prompt template that corresponds to the remediation actions prompt template, the corpus of historical remediation actions that correspond to the historical security events.

In one embodiment, the instance of the prompt template that corresponds to the remediation actions prompt template includes at least one instruction that instructs the one or more language models to propose the one or more remediation actions for the target security event based on assessing at least the corpus of historical remediation actions and a set of remediation action protocols defined by the cybersecurity event detection and response service, the one or more language models output the one or more remediation actions in response to the one or more language models receiving the remediation actions prompt, and the graphical user interface further displays the one or more remediation actions.

In one embodiment, a computer-implemented method for accelerating a threat mitigation or disposal of security alerts includes retrieving, in real-time via one or more computers, a set of historical security alerts related to a target security alert in response to searching an n-dimensional embeddings space storing a plurality of embedding values that correspond to a plurality of historical security alerts; automatically generating, in real-time via the one or more computers, (i) a plurality of metadata similarity assessment prompts and (ii) a plurality of proposed alert handling prompts in response to retrieving the set of historical security alerts, wherein: each metadata similarity assessment prompt of the plurality of metadata similarity assessment prompts includes a distinct set of metadata assessment instructions for evaluating an extent of metadata similarity between the target security alert and the set of historical security alerts with respect to a single distinct metadata type, and each proposed alert handling prompt of the plurality of proposed alert handling prompts includes a distinct set of alert handling instructions for determining one or more alert handling actions of a distinct alert handling action type for the target security alert; automatically providing the plurality of metadata similarity assessment prompts and the plurality of proposed alert handling prompts to one or more language models based on generating the plurality of metadata similarity assessment prompts and the plurality of proposed alert handling prompts; obtaining, from the one or more language models, a plurality of metadata similarity findings and a plurality of proposed alert handling actions in response to the one or more language models processing the plurality of metadata similarity assessment prompts and the plurality of proposed alert handling prompts; displaying, on a graphical user interface, the target security alert in association with the plurality of metadata similarity findings and the plurality of proposed alert handling actions; and executing, in real-time via the one or more computers, a threat mitigation action or an alert disposal action for the target security alert based on evaluating the target security alert against the plurality of metadata similarity findings and the plurality of proposed alert handling actions.

BRIEF DESCRIPTION OF THE FIGURES

FIG. 2 illustrates an example method 200 in accordance with one or more embodiments of the present application;

FIG. 3 illustrates an example representation of one or more inbound alerts in accordance with one or more embodiments of the present application;

FIG. 4 illustrates an example representation of generating one or more abridged alert digests in accordance with one or more embodiments of the present application;

FIG. 5 illustrates an example representation of generating one or more alert representations in accordance with one or more embodiments of the present application;

FIG. 7 illustrates an example representation of an internet-accessible alert user interface in accordance with one or more embodiments of the present application

FIG. 11 illustrates an example method 300 in accordance with one or more embodiments of the present application;

FIG. 12 illustrates an example of retrieving a set of historical security events related or similar to a new security event in accordance with one or more embodiments of the present application;

FIG. 16 illustrates an example of generating a metadata similarity finding for a sender address metadata feature in accordance with one or more embodiments of the present application;

FIG. 17 illustrates an example of generating a metadata similarity finding for a message body metadata feature in accordance with one or more embodiments of the present application;

FIGS. 22-25 illustrates example graphical user interfaces in accordance with one or more embodiments of the present application.

DESCRIPTION OF THE PREFERRED EMBODIMENTS

Figure 1:
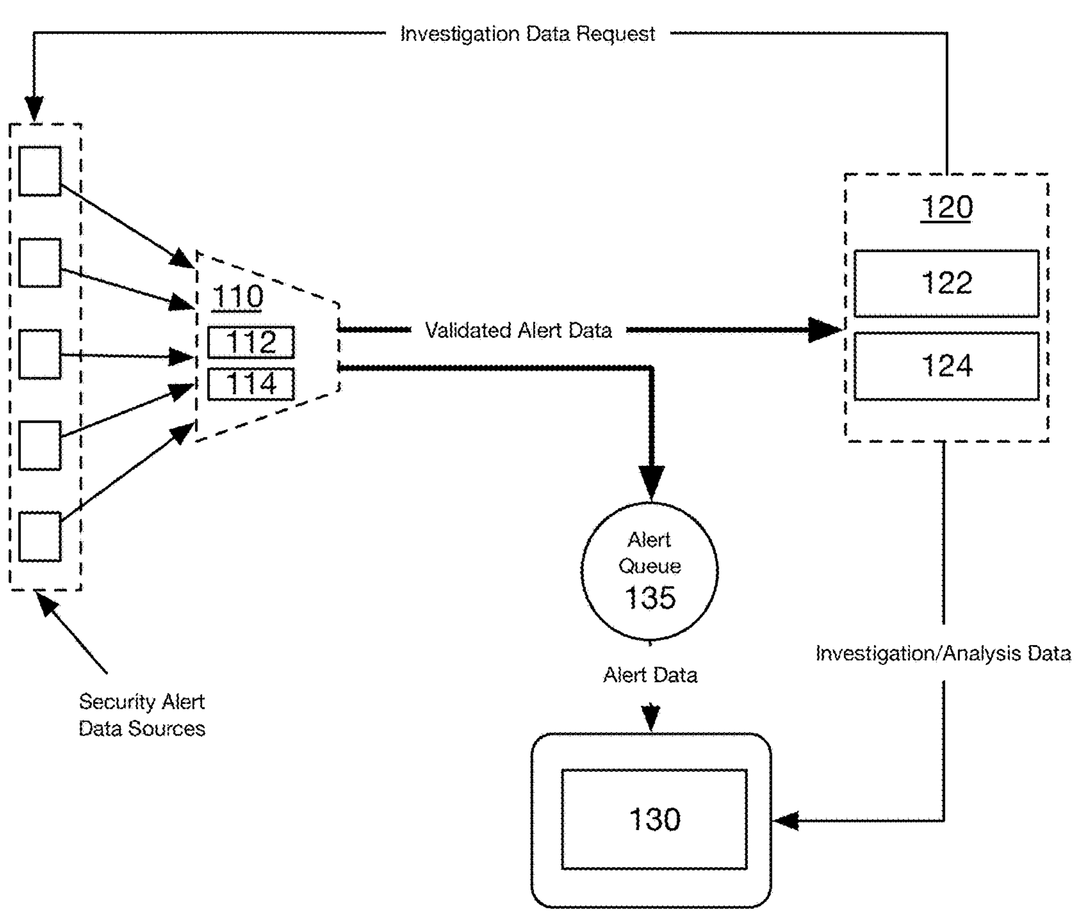
FIG. 1 illustrates a schematic representation of a system 100 in accordance with one or more embodiments of the present application.

The following description of the preferred embodiments of the inventions are not intended to limit the inventions to these preferred embodiments, but rather to enable any person skilled in the art to make and use these inventions.

The systems, methods, and computer-program products described herein may be used in any suitable security environment that requires real-time or near real-time assessment and handling of inbound security events to protect computing assets, digital infrastructure, and subscriber environments from harm. Such inbound security events may relate to suspicious electronic communications, file attachments, file hashes, command-line execution events, process execution events, or any other security event or alert that may exhibit suspicious characteristics.

Conventional cybersecurity systems do not provide real-time or context-aware assessment of a security event (e.g., security alert) across multiple metadata dimensions, nor do they automatically propose investigation actions or threat remediations actions for the security event. Instead, conventional cybersecurity systems assess each security event in isolation and start from a clean state without leveraging historical security events similar or equivalent to the respective security event under review. As a result, conventional cybersecurity systems fail to detect meaningful similarities between the current security event under review and previously encountered security events and further fails to utilize the detected similarities for accelerating a threat assessment and response of the current security event-thereby requiring each security event to be re-evaluated from scratch without the benefit of historical context. This causes conventional cybersecurity systems to detect security threats associated with new or inbound security events more slowly, resulting in delayed triage, slower security threat mitigation, and increased exposure to potential harm-such as giving the security threat more time to propagate within the computing environment, exfiltrate sensitive data, escalate privileges, or disrupt critical systems.

Conversely, the systems, methods, and computer-program products described herein triage new or inbound security events, detect security threats associated with the new or inbound security events, and/or perform threat mitigation actions (e.g., remediation actions or the like) for the security events determined to be associated with security threats faster than conventional cybersecurity systems by implementing method 200 and/or method 300. As described in more detail herein, method 200 and/or method 300 may enable rapid (e.g., real-time or near real-time) detection of historical events similar to a target security event, rapid (e.g., real-time or near real-time) explanation of metadata similarities or differences between the target security event and the similar historical events across multiple metadata dimensions, and rapid (e.g., real-time or near real-time) execution of a threat mitigation action or threat disposal action for the target security event based on prior investigative actions and remediation actions corresponding to the similar historical events.

Additionally, in some of the systems, methods, and computer-program products described herein, a graphical user interface may be used to concurrently display a current security event under threat assessment in association with one or more metadata similarity findings and one or more proposed event handling actions generated for the current security event based at least in part on a set of historical security events similar or equivalent to the current security event. Unlike conventional cybersecurity systems-which do not expose historical context and require users to navigate across multiple user interfaces or query separate databases to perform a security investigation, the graphical user interface described herein includes all metadata similarity findings and proposed event handing actions generated for the current security event within a single user interface, thereby significantly reducing the number of inputs required for the user to assess the current security event and perform a corresponding remediation or disposal action, when necessary.

It shall be recognized that, in such an embodiment, reducing the number of inputs required for the user to assess the current security event and perform the corresponding remediation or disposal action reduces power usage and improves battery life of battery-operated devices by enabling the user to use the electronic device (e.g., computing device, battery-operated device, etc.) displaying the graphical user interface more quickly and efficiently. Therefore, the systems, methods, and computer-program products described herein provide an improvement over conventional cybersecurity systems by reducing cognitive burden on a user, preventing an unnecessary use of resources (e.g., central processing unit (CPU) resources, memory resources, battery resources, etc.), and saving resources (e.g., central processing unit (CPU) resources, memory resources, battery resources, etc.) while accelerating the end-to-end handling of security events, including triage, threat assessment, and remediation-which is particularly important in battery-operated devices.

1. System for Remote Cyber Security Operations & Automated Investigations

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100.

The system 100 may function to enable real-time cybersecurity threat detection, agile, and intelligent threat response for mitigating detected security threats.

1.1 Security Alert Engine

The security alert aggregation and identification module 110, sometimes referred to herein as the "security alert engine 110" may be in operable communication with a plurality of distinct sources of cyber security alert data. In one or more embodiments, the module 110 may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine 110 may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct sources of security alert data by normalizing all alerts into a predetermined alert format.

1.1.1 Security Alert Machine Learning System

Optionally, or additionally, the security alert engine 110 may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) and/or an administrator implementing the security mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security mitigation user interface 130 may include and/or may be in digital communication with a security alert queue 135 that stores and prioritizes validated security alerts.

1.4 Alert Similarity Detection and Alert Handling Module

Figure 1A:
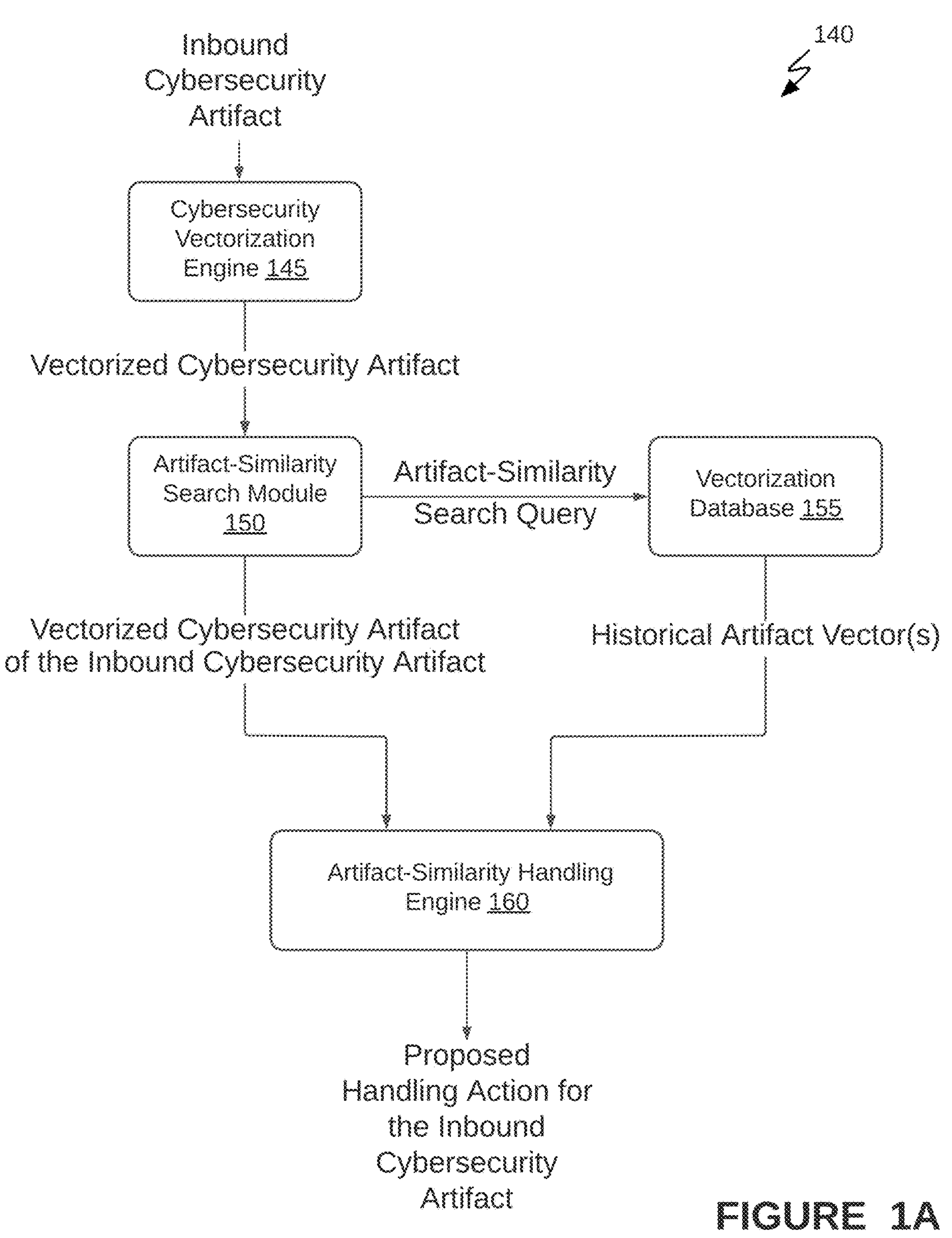
FIG. 1A illustrates a schematic representation of a subsystem of the system 100 in accordance with one or more embodiments of the present application.

As shown in FIG. 1A, a subsystem 140 (of the system 100) for intelligent alert similarity detection and handling of inbound alerts/events may include a cybersecurity vectorization engine 145, an artifact-similarity search module 150, a vectorization database or repository 155, and an artifact-similarity handling engine 160.

In one or more embodiments, the cybersecurity vectorization engine 145 may function to ingest inbound security artifact data including, but not limited to, cybersecurity alert data, event data, evidence data, and/or the like from a plurality of distinct sources of cybersecurity data. In one or more embodiments, based on identifying the inbound security artifact data for a distinct cybersecurity artifact, the cybersecurity vectorization engine 145 may function to compute or generate a distinct vector representation (or signature) that corresponds to the inbound cybersecurity artifact (e.g., an inbound cybersecurity event, an inbound cybersecurity alert, etc.).

In one or more embodiments, the artifact-similarity search module 150 may function to receive, as input, the distinct vector representation corresponding to the inbound cybersecurity artifact and construct an artifact-similarity search query that may include the distinct vector representation as a search parameter. In one or more embodiments, the artifact-similarity search query, when executed, may be used to search one or more vectorization databases (or alert spaces) 155 to identify one or more (probable) vector signatures or vector representations of the one or more vectorization databases (or alert spaces) 155 that may be homogenous, substantially similar or equivalent to the distinct vector representation corresponding to the inbound cybersecurity artifact, if any.

In one or more embodiments, the artifact-similarity handling engine 160 may function to receive the distinct vector representation corresponding to the inbound cybersecurity artifact and/or the one or more (probable) vector signatures or vector representations of the one or more vectorization databases (or alert spaces) 155 to generate one or more proposed handling actions (e.g., one or more mitigation or disposal actions) for the inbound cybersecurity artifact, as described in more detail herein.

2. Method for Intelligent Alert Similarity Detection and Alert Handling

As shown in FIG. 2, a method 200 for intelligent identification of similar alerts and alert handling of inbound alerts and/or events may include identifying inbound alert and/or event data S210, converting inbound alert or event data into vector representations S220, evaluating inbound alerts/events or alert/event representations against one or more n-dimensional spaces generated from processing alert or events S230, and generating one or more proposed mitigation actions (or one or more suggested actions) for one or more of the inbound alerts and/or events based on the evaluation S240. The method 200 may optionally include constructing one or more n-dimensional spaces S205.

In one or more embodiments, the method 200 may include an alert similarity detection technique that may identify historical alerts or historical events similar to a recently identified event or alert in real-time or near real-time. As described in U.S. Pat. No. 11,303,666, titled SYSTEMS AND METHODS FOR INTELLIGENT CYBER SECURITY THREAT DETECTION AND MITIGATION THROUGH AUTOMATED INVESTIGATIONS, each identified or generated alert produced by a security alert engine may lead to further investigation steps, including identifying an investigation workflow, executing the investigation workflow, and reporting on the findings of the investigation workflow, which is incorporated herein in its entirety by this reference. While such state-of-the-art investigation flow may provide effective alert-to-remediation or alert-to-triage, it may be possible to further accelerate alert-to-remediation or alert-to-triage by implementing an alert similarity detection stage or layer, as described herein below.

2.05 Constructing One or More N-Dimensional Spaces

Optionally, S205, which includes constructing one or more n-dimensional spaces, may function to construct one or more n-dimensional spaces based on converting one or more corpora of alert/event data into embeddings, vector representations, bit representation, or the like that may be mapped onto the one or more n-dimensional spaces. An n-dimensional space, as generally referred to herein, may be an n-dimensional space or an n-bit space that may be configured to include vector representations of distinct alert (or event) data and/or alert (or event) documents generated from alerts, events, and/or other pieces of evidence processed by the system 100 implementing the method 200.

In one or more embodiments, an n-dimensional space may include one or more vector representations generated based on distinct alert data, one or more vector representations generated based on distinct event data, and/or one or more vector representations generated based on both event data and alert data associated with the event data. Therefore, for ease of description in the remainder of this disclosure a vector representation mapped to an alert space (e.g., n-dimensional space) may generally be referred to and treated as an "alert vector," "an alert vector representation," "an alert hash signature," "a cybersecurity hash signature," or "an alert embedding" irrespective of if the alert vector representation was generated based on alert data, event data, or a combination of both alert and event data.

In one or more embodiments, S205 may function to construct an n-dimensional space (hereafter referred to as an "alert space") in a variety of modes based on a preferred deployment (or utilization) of a system 100 and/or the method 200. For instance, in one embodiment, S205 may function to construct a global alert space based on identifying corpora of alert/event data from a plurality of distinct subscribers. In such embodiments, a global alert space may be constructed that may include historical alert data or historical event data from a plurality of distinct subscribers in a single alert space (or repository). In other words, each of the alert vector representations stored in and/or mapped to the global alert space may be used as a primary evaluation source for recently identified inbound alerts or recently identified events from a plurality of subscribers (e.g., the global alert space may be subscriber agnostic when evaluating for historical alert vectors substantially similar to a target alert vector).

Alternatively, in one or more embodiments, S205 may function to individually construct one or more local or subscriber-specific alert spaces isolated to alert and/or event data of an individual subscriber (e.g., constructing an alert space per subscriber).

It shall be noted that, in one or more embodiments, corpora of alert/event data may include event data, alert data, log data that may be generated external to the system 100 and/or the method 200. It shall be further noted that the alert spaces described herein may be configured to store a plurality of distinct alert hashes (e.g., alert hash signatures, cybersecurity hash signatures) or a plurality of distinct alert embeddings associated with a plurality of distinct alerts and/or a plurality of distinct events.

Hash-Based Alert Space

In one or more embodiments, each of the one or more alert spaces may be configured or constructed to store and/or include representations of alerts and/or events (e.g., historical alerts or historical events or other historical cybersecurity evidence) in a variety of modes. For instance, in a first implementation, the one or more alert spaces may be a hash-based alert space configured to store a plurality of distinct hashes (or a plurality of distinct hash signatures (e.g., cybersecurity hashing-based signatures) for each piece of alert or event data included in the one or more corpora of alert/event data. That is, the hash-based alert space may be configured to store a distinct hash or a distinct hash signature that may represent each distinct piece of data of the one or more corpora of alert/event data based on any suitable type of hashing technique including, but not limited to, MinHash, a token-frequency hashing technique, and/or the like.

It shall be noted that, in operation, to generate a hash signature for each piece of alert data and/or event data of the one or more corpora of alert/event data, alert or event metadata associated with each distinct piece of alert or event data may be extracted and/or enriched from the distinct piece of alert or event data and arranged in an intelligent text sequence (e.g., an intelligent document sequence, an abridged alert digest, an abridged event digest or the like), as described in more detail herein. Accordingly, the intelligent text sequence (or the abridged alert digest or the abridged event digest) for each piece of alert or event data may be passed through a hashing algorithm (e.g., cybersecurity hashing algorithm) to generate a distinct hash signature, which may be mapped to the hash-based alert space.

Embeddings-Based Alert Space

In a second implementation, the one or more alert spaces may be an embeddings-based alert space configured to include a plurality of embeddings based on one or more corpora of alert/event data. In such implementation, the embeddings-based alert space may be configured to store a distinct embedding value or distinct embedding representation of each distinct piece of alert data and/or event data included in the one or more corpora of alert/event data based on any suitable type of embedding technique or service.

It shall be noted that, the embedding technique that may be used to generate embedding values for the embeddings-based alert space may take a variety of forms based on a preferred embedding technique of the system 100 and/or the method 200.

For instance, in a first implementation, generating an embedding value for each (distinct) piece of alert data and/or event data of the one or more corpora of alert/event data may include extracting, modifying, removing, enriching, and/or arranging alert metadata (or data) associated with a distinct alert or distinct event of the one or more corpora of alert/event data in an intelligent text sequence (e.g., an intelligent document sequence, an abridged alert digest, an abridged event digest or the like). In one or embodiments, the intelligent text sequence may be directly passed to an embedding service and/or an embedding model that may generate a distinct embedding value representative of the distinct alert or event, such that the distinct embedding value may then be mapped to the embedding-based alert space. It shall be noted that in some embodiments, the system 100 and/or the method 200 may directly generate an embedding value for each piece of alert data or event data of the one or more corpora of alert/event data from (raw) alert or event data.

In a second implementation, generating an embedding value for each piece of alert and/or event data of the one or more corpora of alert/event data, may include selectively extracting, enriching, and/or arranging alert metadata associated with a distinct alert or event of the one or more corpora of alert/event data in an intelligent text sequence (e.g., an intelligent document sequence, an abridged alert digest, an abridged event digest or the like). In such implementation, the intelligent text sequence may be directly passed to a hashing algorithm to generate a hash signature, and the outputted hash signature from the hashing algorithm may be passed to an embedding service and/or an embedding model that may generate a distinct embedding representative of the distinct alert or event based on the passed hash signature, such that the generated embedding value may then be mapped to the embedding-based alert space.

Alert/Event Database

In a third implementation, the one or more alert spaces may be an alert database in which each distinct intelligent text sequence (e.g., each abridged alert digest, each abridged event digest, etc.) for each piece of alert data or event data of one or more corpora of alert data may be associated with an alert hash signature and/or an alert embedding value that may be digitally stored in the alert database and electronically accessible to a system (e.g., the system 100 implementing the method 200). That is, in some embodiments, each (distinct) piece of alert or event data of the one or more corpora of alert/event data may be associated with both a corresponding hash signature and a corresponding embedding value. In such embodiments, any suitable search technique, such as regular expression with or without Boolean logic, k-nearest neighbors (kNN), approximate nearest neighbors (ANN) may be implemented for performing alert similarity detection.

Alert Decay Rate|Rate of Decay

Additionally, or optionally, each hash signature (e.g., cybersecurity hashing-based signature) or each embedding value included in the one or more alert spaces of the first implementation, the second implementation, and/or the third implementation may be associated with a decay rate. In other words, each piece of alert and/or event data of the one or more corpora of alert/event data mapped to (or stored in) a target alert space may further have a corresponding decay rate value assigned thereto.

In one or more embodiments, each distinct hash signature generated for each piece of alert and/or event data may be associated with a decay value that may change or reduce over time according to a decay rate. Accordingly, in such embodiments, the decay rate may reduce the evidentiary value of a given hash signature within an alert space as time passes. For instance, a first (cybersecurity) hash signature (in an alert space) may have a decay value greater (e.g., decaying faster) than a second (cybersecurity) hash signature (in the same alert space), as the first hash signature may have appeared in the alert space earlier in time than the second hash signature.

It shall be noted that, in one or more embodiments, the decay rate may influence detecting similar alerts and/or events. For example, within a first time period, the system 100 and/or the method 200 may identify, for a target embedding value or a target hash signature corresponding to an inbound alert or event, one or more embedding values or one or more hash signatures in an alert space that may be similar to the target embedding value or target hash signature of the inbound alert or event, however, outside of the first time period, the one or more embedding values or the one or more hash signatures may not be identified as similar due to the decay rate.

2.10 Identifying Alerts and/or Events

S210, which includes identifying alerts and/or events, may function to identify inbound alerts and/or events collected from one or more data sources. In one or more preferred embodiments, the system 100 and/or the method 200 may identify inbound alerts and/or events by collecting and/or receiving alert and/or event data from one or more data sources in real-time or near real-time to initiate fast-processing of the inbounds alerts and/or events (e.g., recently identified cybersecurity alerts, recently identified cybersecurity events, etc.). It shall be further noted that for identifying inbound alerts or events, reference is made to U.S. patent application Ser. No. 17/671,881, filed on 15 Feb. 2022 titled SYSTEMS AND METHODS FOR INTELLIGENT CYBER SECURITY THREAT DETECTION AND INTELLIGENT VERIFICATION MESSAGES THROUGH AUTOMATED WORKFLOWS, which is incorporated herein in its entirety by this reference.

In operation, S210 may function to instantaneously initiate (or instantiate) an alert similarity detection technique that may function to identify historical alerts and/or events similar or homogenous to each (recently) identified inbound alert and/or event by the system 100 and/or the method 200, or at least for a target inbound alert and/or event. It shall be noted that identifying inbound alerts and/or events may include identifying generated alerts and/or events external to the system (e.g., raw data signals from enrichment sources, vendor alerts, third party alerts, etc.) and/or internal to the system (e.g., system-validated security alerts, or the like).

In a first implementation, S210 may function to identify inbound alerts and/or events by collecting and/or receiving data signals from one or more distinct data sources. In one or more embodiments of the first implementation, the data signals may relate to third-party alerts, event data, event logs, security policy alerts and/or activity data occurring with or involving internal computing networks or resources from a subscriber (e.g., one or more computing resources of the subscriber, one or more computer network resources of the subscriber, one or more data resources of the subscriber, one or more cloud-based resources of the subscriber, any computer accessible digital entity or device of the subscriber, and/or the like). In one or more embodiments, the data signals may be unprocessed to the system 100 and generated by one or more distinct data sources external to the system 100 and/or the method 200.

In one or more embodiments, S210 may function to periodically request or generate application programming interface (API) calls to each of the one or more distinct data sources for providing data signals to the system (e.g., the system 100 implementing the method 200). Additionally, or alternatively, S210 may function to receive automatic pushes of data signals from the one or more distinct data sources to the system (e.g., the system 100) and/or the method 200. It shall be noted that internal user activity and/or external third-party activity occurring within a subscriber environment that deviates from an implemented subscriber security policy may cause a security data signal to be generated, and, thus, identifiable or detectable by the system or service 100 implementing the method 200.

Additionally, or alternatively, in a second implementation, S210 may function to identify inbound alerts by automatically passing the identified data signals through an automated security alert engine that may generate system-validated security alerts. In such implementation, S210 may function to implement an automated security alert engine that may automatically ingest the data signals, process the data signals, and generate and/or publish one or more system-validated alerts based on the processing of the data signals.

A system-validated alert, as generally be referred to herein, may relate to one or more identified data signals that may be processed through an automated security alert engine (e.g., the security alert engine 110) and published/identified by the system (e.g., the system 100 and/or the method 200) as valid (e.g., not a false-positive, initially appears to be a security threat, initially appears to look malicious, etc.).

Accordingly, in one or more embodiments of the first implementation or the second implementation, based on identifying inbound alerts and/or events, S210 may function to collect the inbounds alerts (e.g., recently generated alerts and/or events) and store the identified inbound alerts and/or events in a security alert queue for review and/or evaluation by a security analyst or the like. It shall be noted that a representation of the security alert queue may be displayed on a web-based alert user interface, as shown generally by way of example in FIG. 7 and FIG. 8.

2.20 Converting Alerts and/or Events into Vector Representations

S220, which includes converting inbound alerts and/or events into vector representations, may function to convert one or more of the identified (inbound) alerts and/or one or more of the identified events into one or more distinct vector representations, respectively. A vector representation, as generally referred to herein, may be a conversion of an inbound alert and/or inbound event (e.g., a recently identified alert and/or event) from an original dimensional state into a dimensional state lower than the original dimensional state.

It shall be noted that for ease of description in the remainder of S220, disclosure is generally directed to converting inbound alerts into abridged alert digests and converting the abridged alert digests into alert representations (e.g., alert vector representations, cybersecurity hashing-based signatures or the like), however, an analogous technique and description similarly applies for events and alert/event combinations (e.g., event data+alert data that may be associated with the event data).

In one or more preferred embodiments, S220 may function to translate or convert inbound alerts into alert representations through one or more transformations, including, but not limited to, intelligently deriving an alert digest corpus comprising indicative metadata features of a target inbound alert, composing the indicative metadata features into at least one string of text, and/or converting the at least one string of text into a distinct alert hash value (or signature) and/or a distinct alert embedding value, as shown generally by way of example in FIG. 3, FIG. 4, and FIG. 5.

Converting Inbound Alert Data into Abridged Alert Digests

In one or more embodiments, before converting inbound alerts into alert representations (e.g., hash signatures, hash values, embedding values, etc.), S220 may apply one or more alert pre-processing technique to each identified inbound alert or at least for a target inbound alert. In such embodiments, the alert pre-processing technique may include generating an abridged alert digest that may intelligently and/or succinctly characterize each target inbound alert. That is, in some embodiments, S220 may function to automatically generate an abridged alert digest that may be a condensed representation of a collection of metadata/data associated with one or more events and/or occurrences associated with the target inbound alert.

For instance, in one or more preferred embodiments, S220 may function to derive for each distinct inbound alert, an intelligent token sequence (e.g., intelligent text string) that may intelligently and/or succinctly describe or characterize a target inbound alert. Stated differently, in one or more embodiments, S220 may function to automatically, by one or more computers, selectively extract a digest corpus that may include a subset of indicative data and/or metadata features from a plurality of distinct pieces of alert metadata of a target cybersecurity alert. It shall be noted that a target inbound alert may include a plurality of identifying elements or metadata, such as a source internet protocol address (e.g., 67.162.111.13 or the like), a country code (e.g., US or the like) associated with the source internet protocol address, a source user (e.g., user1@company.com) associated with the alert, a source user email (e.g., user1@company.com) associated with the alert, a destination user of the alert (e.g., android_emm_uem@company.com or the like), a destination user email of the alert (e.g., android_emm_uem@company.com or the like), an internet service provider (e.g., ISP or the like), an antonymous system number (ASN) of the Internet provider (e.g., 7744 or the like), the country of origin of the internet provider (e.g., US or the like), and/or a type of alert, as shown generally by way of example in FIG. 3. It shall be further noted that, in one or more embodiments, the target inbound alert may include one or more pieces of non-probative metadata (or data) that may not be included in the digest corpus.

Accordingly, in one or more embodiments, S220 may function to generate an intelligent token sequence (or intelligent document sequence) of the inbound alert based on the one or more identifying elements or (e.g., probative) metadata associated with the target inbound alert. That is, S210 may generate an abridged alert digest in the form of an intelligent token sequence or intelligent document sequence based on intelligently extracting and/or prioritizing one or more alert metadata elements associated with the target inbound alert. In other words, S210 may generate an abridged alert digest for a target inbound alert by converting (or translating) the target inbound alert that may include a plurality of metadata elements into a single text string (e.g., an abridged alert digest) comprising a subset of the plurality of metadata elements.

In operation, the intelligent token sequence (or the intelligent document sequence) may be automatically generated based on a type or class of alert and/or automatically generated based on predefined conditions and/or sequence (or ordering) conditions by an alert similarity detection engine, as shown generally by way of example in FIG. 4. That is, in one or more embodiments, S220 may function to create an abridged alert digest for a target alert automatically by an alert similarity detection engine and/or by predefined conditions and/or order sequencing heuristics of an alert/event similarity detection engine. For instance, in a non-limiting example, S220 may function to generate an alert digest for a target inbound alert of a first type in a first metadata sequence. Additionally, or alternatively, S220 may function to generate an alert digest for a target inbound alert of a second type in a second metadata sequence distinct from the first metadata sequence.

It shall be noted that sequencing and/or ordering conditions (e.g., cybersecurity metadata arrangement heuristics), as generally referred to therein, may be heuristics that governs a positioning or location of metadata (or data) relative to other metadata (or data) in an alert digest (e.g., text-based cybersecurity digest or the like). For instance, in a non-limiting example, one of the cybersecurity metadata arrangement heuristics may require that metadata associated with a first metadata tag (e.g., an ASN number) may be positioned in front of metadata associated with a second metadata tag (e.g., a country of origination), which may be positioned in front of metadata associated with a third metadata tag (e.g., an internet service provider), which may be positioned in front of metadata associated with a fourth metadata tag (e.g., a user), which may be positioned in front of metadata associated with a fifth metadata tag (e.g., the company a user may be associated with).

(i) Abstracting Alert Metadata Features

Additionally, or optionally, in some embodiments, to prevent a downstream operation from generating overly specific alert representations (e.g., vector representations, cybersecurity hash signatures, etc.), S220 may function to generalize or abstract non-informative and/or overly-informative alert metadata features. For instance, in a non-limiting example, an inbound alert may include a unique email metadata feature such as "john.doe@company123.com" and, in some embodiments, S220 may function to abstract or generalize the unique email metadata feature in the abridged alert digest as "<user>@<company>.com". In the same or another non-limiting example, an inbound alert may include time stamp metadata and file path metadata such as "2021-12-13T00:45:31+00:00/users/john/documents/projects" and, in some embodiments, S220 may function to not include the time stamp metadata feature and/or generalize or abstract the file path metadata (in the abridged alert as digest) "/users/<user>/documents/projects." It shall be noted that abstracting or generalizing non-informative alert metadata features may prevent misidentifying similar (or homogenous) alert representations of the one or more alert spaces contributed to overly specific alert metadata features included in the abridged alert digest (e.g., text-based cybersecurity event digest).

(ii) Abridged Alert Digest Enrichment

Additionally, or optionally, in one or more embodiments, S220 may function to include one or more pieces of evidence that may not have been originally included as alert metadata in a target inbound security alert. For instance, in a non-limiting example, an inbound alert may include metadata corresponding to an internet protocol address, but may not include geo-location data (e.g., time zone data, geographical location data, etc.) and, in such non-limiting example, S220 may function to derive one or more pieces of geo-location data based on the internet protocol address and construct an abridged alert digest (e.g., text-based cybersecurity digest) that includes, at least, the one or more pieces of geo-location data and/or the internet protocol address.

Converting Abridged Alert Digests-to-Alert Representations

In one or more embodiments, based on or in response to generating an abridged alert digest for a target inbound alert, S220 may function to convert or transform the abridged alert digest of the target inbound alert into an alert vector representation (e.g., fixed length alert representation, an alert hash value, an alert embedding value, or the like), as shown generally by way of example in FIG. 5.

In a first implementation, an alert hash value or an alert hash signature may be generated for an abridged alert digest associated with a target inbound alert based on using a MinHash hashing algorithm. In such implementation, the MinHash hashing algorithm may function to approximate a target abridged alert digest associated with an inbound alert as a vector of integers or bits of a fixed length vector size (e.g., 128/256, etc.). In one or more embodiments of the first implementation, via a cybersecurity event hashing algorithm, S220 may function to compute one or more hash value for each token of the (abridged) alert digest. For instance, in a non-limiting example, an abridged alert digest of an inbound alert, such as, "7744 US android_emm_uem company.com comcast cable communications inc isp user1 company.com us" may be passed through a MinHash hashing algorithm to generate an alert hash signature (with bit width), such as, [0, 1, 1, 0, 1, . . . , 1, 1]. It shall be noted that a distinct hash value or a distinct hash signature may be generated for each abridged alert digest of each inbound alert by passing each abridged alert digest through a MinHash hashing algorithm (e.g., cybersecurity hashing algorithm).

In a second implementation, an alert hash value or alert hash signature may be generated based on using a token-frequency hashing algorithm. In such implementation, the token-frequency hashing algorithm may function to approximate a target abridged alert digest associated with an inbound alert as a vector of bits or integers of a fixed length vector size (e.g., 128/256) based on token frequency. For instance, an abridged alert digest of an inbound alert, such as, "7744 US android_emm_uem company.com comcast cable communications inc isp user1 company.com us" may be passed through a token-frequency hashing algorithm to generate an alert hash signature, such as, [0, 0, 1, 0, 1, . . . , 1, 1]. It shall be noted that a distinct hash value or distinct hash signature may be generated for each abridged alert digest of each inbound alert by passing each abridged alert digest through the token-frequency hashing algorithm.

In a third implementation, an embedding value may be generated based on using an embedding service or embedding model to generate an embedded representation of an abridged alert digest of a target inbound alert. For instance, in one or more embodiments, an embedding service or embedding module may function to approximate an abridged alert digest associated with a target inbound alert by passing the abridged alert digest of the target inbound alert to an embeddings service or embeddings model to generate an embedding value based on the abridged alert digest of the inbound alert.

It shall be noted that, in operation, the system 100 and/or the method 200 may function to intelligently select or implement any type of embedding service and/or any type of hashing algorithm that may optimally and accurately interpret the abridged alert digest associated with a distinct inbound alert. For instance, based on an alert representation type of a constructed alert space, the system 100 and/or the method 200 may default to interpreting each generated abridged alert digest associated with each inbound alert to the same (or an equivalent) alert representation type of the constructed alert space. In other words, if the constructed alert space stores hash signatures of alerts based on or using a MinHash algorithm, the MinHash algorithm or an equivalent hashing algorithm may be used when converting abridged alert digests to alert representations.

Accordingly, in one or more embodiments, S220 may use the same or a substantially similar embedding service or hashing algorithm for both constructing an alert space and generating alert representations of abridged alert digests of inbound alerts (e.g., recently identified alerts).

2.30 Evaluating Inbound Alerts and/or Inbound Events Against One or More Alert Spaces S230, which includes evaluating the inbound alerts and/or the inbound events against the one or more alert spaces or repositories, may function to evaluate a hash signature or embedded representation of each target alert or event against one or more alert spaces to identify homogenous or substantially similar hash signatures or embedded representations located in the one or more alert spaces. In a preferred embodiment, to identify hash signatures or embedded representations that may be similar to hash signatures or embedded representations in the one or more alert spaces, S230 may function to compute one or more similarity metrics (e.g., computing an alert similarity score, computing a similarity distance, etc.) and/or may require one or more similarity criterion to be satisfied.

It shall be noted that for ease of description in the remainder of S230, disclosure is generally directed evaluating hash signatures or embedding values of inbound alerts against an alert space, however, an analogous technique and description similarly applies for events (e.g., evaluating hash signatures or embedding values of inbound events against an alert space) and alert/event combinations (e.g., event data+alert data that may be associated with the event data).

In operation, S230 may function to construct an alert similarity search query that may include a target alert representation (e.g., cybersecurity hashing-based signature, etc.) as a search parameter that, when executed may function to search the one or more alert spaces. In one or more embodiments, evaluating hash signatures or embedding values of inbound alerts against an alert space, may include accessing an alert space (e.g., accessing one or more of the alert spaces constructed in S205) that may have used the same or an equivalent hashing or embedding technique used to interpret historical alerts into alert representations (e.g., embedding values or hash signatures) to that of the technique used to convert inbound alert data into alert representations, as described above. Stated differently, hash signatures of inbounds alerts and hash signatures of alerts spaces may preferably use the same or an equivalent type of hashing service and/or hashing technique to generate hash values and/or hash signatures. This may provide S230 the capability of accurately identifying (historical) alerts in the alert space that may be similar (or homogeneous) to a target inbound alert while avoiding false positives.

In one or more embodiments, based on or in response to executing the alert similarity search query, S230 may function to (e.g., only) evaluate or assess the cybersecurity-hashing based signatures of the alert space that are substantially similar or equivalent to a size or length of a target cybersecurity hashing-based signature of a target alert. Stated differently, in one or more embodiments, S230 may (e.g., only) assess or evaluate the hashing-based signature of the target cybersecurity event against each of a subset of the plurality of historical cybersecurity event hashing-based signatures having a same or similar number of tokens or similar token size.

In a first implementation, S230 may function to compute an alert similarity score between a hash signature of a target inbound alert and at least one of a plurality of hash signatures of an alert space to identify similar (or homogenous) alerts. In one or more embodiments of such implementation, S230 may function to compute an alert similarity score between a hash signature of a target inbound alert and each hash signature of the plurality of hash signatures of the alert space (or a selective subset) and if a computed alert similarity score exceeds a similarity score threshold, a similar hash signature may be identified, and thus a similar alert. It shall be noted that the similarity score may be set at a level high enough to return near or substantially exact (hash signature) matches.

Additionally, in some embodiments of the first implementation, computing an alert similarity score for an alert pairwise (e.g., between a hash signature of a target inbound alert and a hash signature of an alert space) may be a function of or based on a computed distance therebetween. For instance, a hamming distance may be used for comparing MinHash hashes. Accordingly, a higher alert similarity score may be generated for an alert pair if the computed distance may be below a distance threshold and a lower alert score may be generated for an alert pair if the computed distance exceeds a distance threshold.

It shall also be noted that as a decay rate factor may be assigned to one or more hash signatures in the alert space this may additionally affect the computed similarity score and/or distance for an alert pairwise. For instance, in a non-limiting example, S230 may identify two or more hash items within a hash alert space having a comparable or same distance to a subject inbound alert. In such example, the distinct decay rate for each of the two or more items may function to reduce its evidentiary value or alert value as time progresses and therefore, influence a selection of one of the two or more hash items having the highest or best alert value (e.g., least amount of decay).

Additionally, or alternatively, in a second implementation, S230 may function to identify similar alerts for a target inbound alert based on computing a mathematical distance between an embedded representation of a target inbound alert and at least one of a plurality of embedded representations of an alert space. In such implementation, a short distance threshold (e.g., a maximum distance value) may be set to identify similar alerts between an embedded representation of a target inbound alert and an embedded representation of a historical alert of the alert space, which may signify a high degree of similarity (or homogenous) upon satisfying the short distance threshold. Additionally, or alternatively, S230 may function to identify similar alerts for a target inbound alert based on identifying if the target inbound alert may be spatially near a centroid or the like of an alert cluster of an alert space.

It shall be noted that, similar (or homogenous) identified alerts to a target inbound alert in the first implementation and/or the second implementation may be an alert that may have occurred in the past and may share one or more similar metadata characteristics with the target inbound alert. It shall be noted that upon identifying similar alerts some (non-critical or non-probative) alert characteristics or alert metadata of the similar alerts may be different than one or more alert characteristics or alert metadata of the target inbound alert.

2.40 Generating One or More Proposed Actions for a Target Inbound Alert or Target Inbound Event S240, which includes generating one or more proposed actions for a target inbound alert or target inbound event, may function to generate or propose one or more cybersecurity handling actions, one or more management actions, and/or one or more disposals actions for a target inbound alert or target inbound event based on identifying a cybersecurity handling action or cybersecurity management action associated with each (or at least one of an) identified similar alert and/or event. In one or more embodiments, via one or more computers, S240 may function to generate (or derive) one or more proposed (or recommended) handling or management actions for a target inbound alert or a target inbound event by borrowing the handling/management actions performed in handling the historical, similar alert and/or event. It shall be noted that for ease of description in the remainder of S240, disclosure is generally directed to generating a proposed alert action for a target inbound alert, however, an analogous technique and description similarly applies for events (e.g., generating a proposed event action for a target inbound event).

In one or more embodiments, a proposed alert action, as generally referred to herein, may include one or more of a proposed triaging action (e.g., proposed triaging recommendation), one or more proposed threat mitigation actions (e.g., proposed threat mitigation recommendations), and one or more proposed remediation actions (e.g., proposed remediation recommendations).

In one or more preferred embodiments, based on identifying an alert similar or related to a target inbound alert as described in S230, S240 may function to identify a manner in which the similar alert was handled and/or managed by one or more portions of the system 100.

For instance, in one or more embodiments, identifying a manner in which the one or more similar alerts may have been managed and/or handled by one or more portions of the system 100 may include obtaining (or surfacing or acquiring) information (e.g., data) on one or more of: how the one or more identified similar (or homogenous) alerts were triaged, what type of investigation workflows were triggered for the one or more similar alerts, was the one or more similar alerts eventually identified as a false-positive, was the one or more similar alerts ever escalated to an incident level, was the one or more similar alert ever de-escalated from an incident level, or the like. It shall be noted that S240 may function to identify and/or obtain and/or surface any type of system handling or system management information that may inform or support a proposed (handling) action for a target inbound alert.

Figure 6:
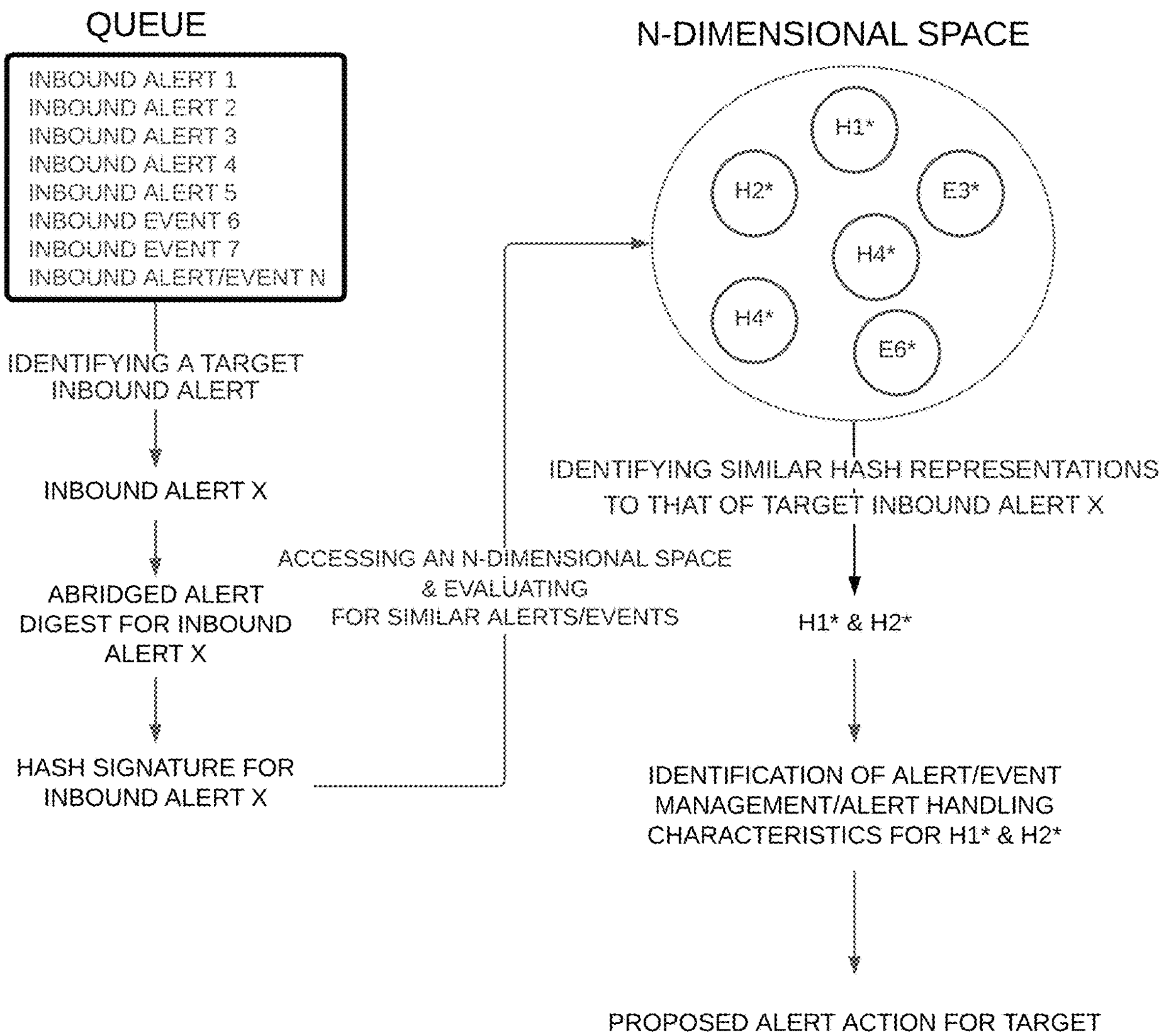
FIG. 6 illustrates an example schematic for implementing portions of the method 200 and a system in accordance with one or more embodiments of the present application.
Figure 9:
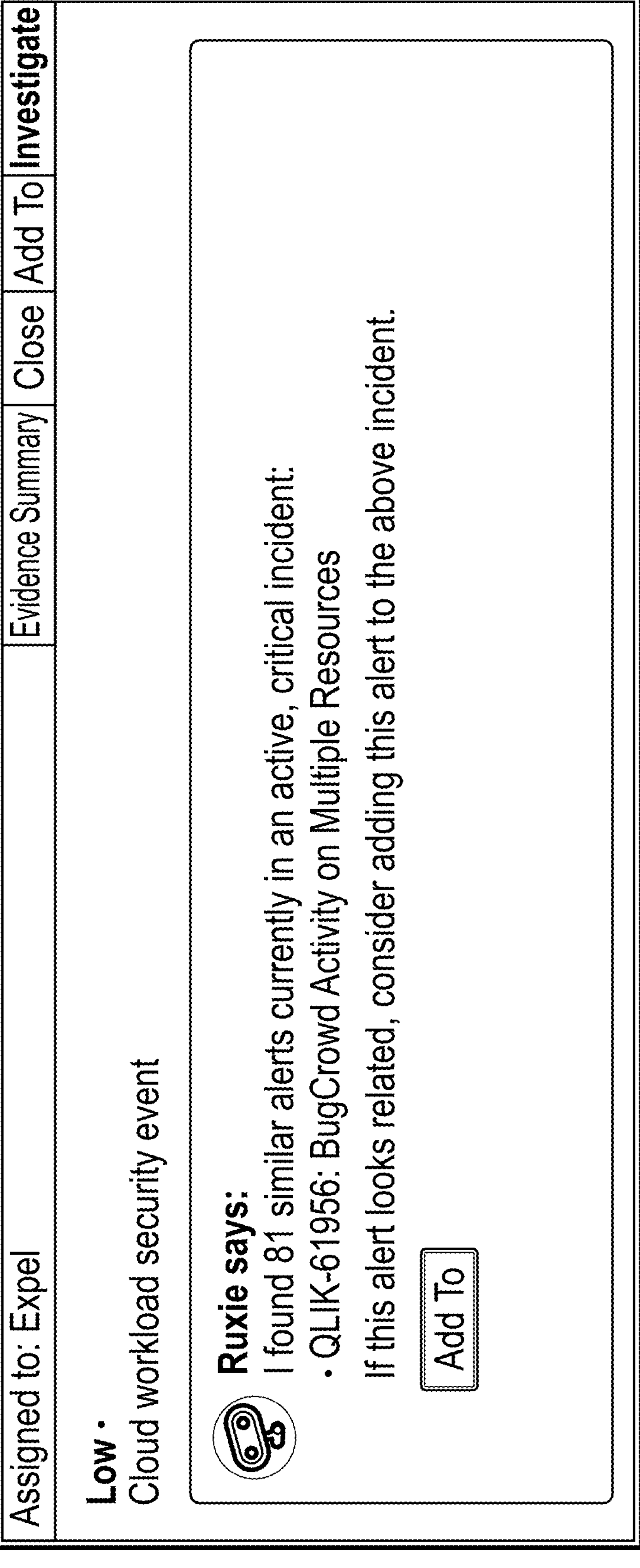
FIG. 9 illustrates an example representation of a graphical alert similarity user interface element in accordance with one or more embodiments of the present application.

Accordingly, in one or more embodiments, S240 may function to derive or identify, by one or computers, the proposed alert action based on how one or more of the similar alerts were handled and/or managed by one or more portions of the system 100 (e.g., if one or more similar alerts were promoted to an incident level—the proposed alert action may be to promote the target inbound alert to an incident level, if one or more similar alerts were disposed or deescalated (e.g., during an investigation, etc.)—the proposed alert action may be to dispose of/remove the target inbound alert in the alert queue, if one or more similar alerts caused proposal of a remediation (or resiliency) action—the proposed alert action may be to propose the same remediation (or resiliency action), and if one or more similar alerts were previously closed as "benign" the proposed alert action may be to dispose (or close) the target inbound alert in the alert queue as "benign", etc.) as shown generally by way of example in FIG. 6 and FIG. 9.

Additionally, or alternatively, in one or more embodiments, S240 may function to detect, by one or more computers, that a hash signature of a recently-identified target alert (e.g., inbound alert) may be similar to one or more hash signatures of one or more alerts in an active, critical cybersecurity incident. In such embodiments, S240 may function to generate a proposed alert action that may relate to adding or routing the recently identified target alert to the active, critical cybersecurity incident to expedite a threat evaluation and/or mitigation of the recently-identified target alert, as shown generally by way of example in FIG. 10.

Additionally, or alternatively, S240 may function to identify a proposed alert action for a target inbound alert based on identifying if the target inbound alert may be spatially near an alert cluster in the alert space (e.g., within a threshold distance). The alert cluster may be associated with a plurality of alerts that may be associated with a specific alert suppression type, and thus, the proposed alert action for the target inbound alert may be to propose the specific suppression type of the nearest alert cluster if within a threshold distance.

Additionally, or optionally, before generating a proposed alert action, S240 may require a similar alerts quantity threshold to be satisfied that may require identifying (or detecting) a predetermined number of similar alerts before an alert action may be generated or proposed for a target inbound alert. That is, S240 may function to only generate or propose an alert action based on identifying n-number of similar alerts (e.g., two or more similar alerts, three or more similar alert, eight or more similar alert, n-number of similar alerts, etc.) related to a target inbound alert (e.g., more similar alerts to target alert may equate to an increase in the confidence and/or probability of a proposed alert action). It shall be noted that the similar alerts threshold may be tunable based upon different subscriber environments and/or subscriber security policies. In one or more embodiments, an alert similarity user interface element (described in more detail below) may be displayed on a cybersecurity dashboard based on satisfying the similar alerts threshold in analogous ways.

Accordingly, it shall be noted that in such embodiments in which a similar alerts quantity threshold may not be satisfied, S240 may still function to provide (or pass) the similar alert(s) that may have been identified in S230 to a downstream operation that may aid in supplementing or supporting an investigation for the target inbound alert.

Applications of Proposed Alert Actions

In a first implementation, S240 may function to automatically recommend or propose an alert action to a portion of the system 100 and/or the method 200 to act on a target inbound alert without review by a subscriber and/or a security analyst. Accordingly, in embodiments in which S240 may automatically generate and implement an alert-based recommendation for a target inbound alert, S240 may further function to remove or dispose of the target inbound alert from an alert queue. Thereby, enabling the system 100 (implementing the method 200) the capability of focusing on new (or emerging) alerts, while simultaneously reducing the time an inbound alert is in the alert queue.

In a second implementation, S240 may function to automatically propose and surface, via a user interface, an alert action for a target inbound alert. In one or more embodiments of the second implementation, S240 may require that a security analyst reviews the proposed alert action generated and surfaced by the system 100 and/or the method 200 to verify that the proposed alert action may be appropriate and/or accurate. In such implementations in which the proposed alert action may be surfaced to a security analyst, the security analyst may accept (e.g., execute) or decline (e.g., not execute) the proposed alert action for a target inbound alert, which may be used as feedback for future learning and training of the system 100 and/or the method 200 when adjustments or tuning may be needed.

Surfacing Proposed Alert Actions to Analysts

In one or more embodiments, S240 may function to generate an alert similarity user interface element, via a cybersecurity dashboard, that may surface or emphasize that the target cybersecurity alert may be substantially similar to one or more historical cybersecurity alerts and/or events previously assessed by the cybersecurity threat detection and threat mitigation system 100 and/or indicate a (proposed) alert handling action based on the substantially-similar (or homogenous) historical cybersecurity alerts and/or events.

Figure 8:
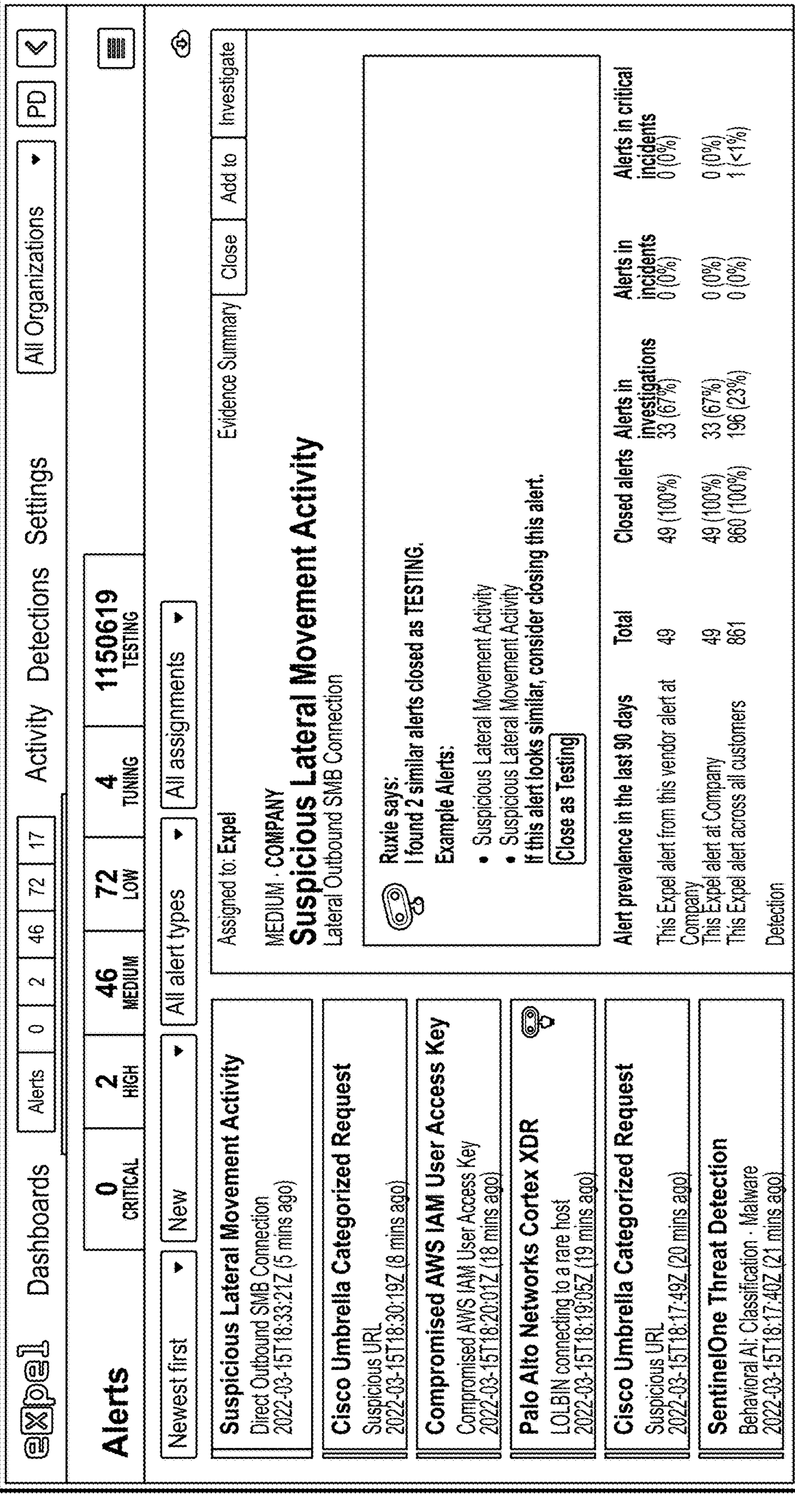
FIG. 8 illustrates an example representation of an internet-accessible alert user interface including an alert similarity user interface element in accordance with one or more embodiments of the present application.

In one or more embodiments, based on or in response to identifying that a subject cybersecurity alert may be substantially similar to one or more historical cybersecurity alerts and/or events previously assessed by the cybersecurity threat detection and threat mitigation system 100, S240 may function to generate an alert similarity user interface element (e.g., homogenous alert user interface element) that may be integrally displayed within a distinct cybersecurity alert windowpane associated with the target cybersecurity alert that (e.g., visually) emphasizes to an analyst or the like that the target cybersecurity alert is substantially similar (or homogenous) to one or more historical cybersecurity alerts and/or events previously assessed by the cybersecurity threat detection and threat mitigation system 100, as shown generally by way of example in FIG. 8.

In one or more embodiments, to emphasize, expose, or bring attention (e.g., analyst focus) to the alert similarity user interface element, S240 may function to position the alert similarity user interface element proximal or substantially near an upper portion of the cybersecurity alert windowpane, display the alert similarity user interface element with a first color intensity and display the target cybersecurity alert windowpane with a second color intensity distinct from the first color intensity, and/or display the alert similarity user interface element with a first (background) color (e.g., blue) and display the target cybersecurity alert windowpane with a second (background) color distinct from the first color (e.g., grey), or the like. It shall be recognized that S240 may function to surface or emphasize the alert similarity user interface element via any suitable mechanism including, but not limited, via user interface notifications (e.g., sounds, alarms, etc.), messages, and/or the like.

In one or more embodiments, the alert similarity user interface element may include one or more text strings that may be designed for slot filling one or more tokens of text that may indicate a rationale for indicating why a target cybersecurity alert may have been identified as an alert similarity candidate. For instance, in a non-limiting example, the one or more text strings of the alert similarity user interface element that may be displayed within an exemplarily cybersecurity alert windowpane may be "Ruxie says: I found two (2) similar alerts previously closed as TESTING", as shown generally by way of example in FIG. 8.

Additionally, or optionally, in one or more embodiments, the alert similarity user interface element may function to display the corresponding collection of historical alerts underpinning the quantity of historical alerts identified by the cybersecurity threat detection and threat mitigation system as similar (or homogenous) to the subject cybersecurity alert. Alternatively, in one or more embodiments, the alert similarity user interface element may function to display a distinct alert hyperlink for each historical alert underpinning the quantity of historical alerts that was identified by the cybersecurity threat detection and threat mitigation system as similar to the subject cybersecurity alert (e.g., the alert hyperlink, when selected, may function to instantiate a user interface that includes distinct alert data corresponding to the selected alert hyperlink, thus, the selected historical alert), as shown generally by way of example in FIG. 8.

Figure 10:
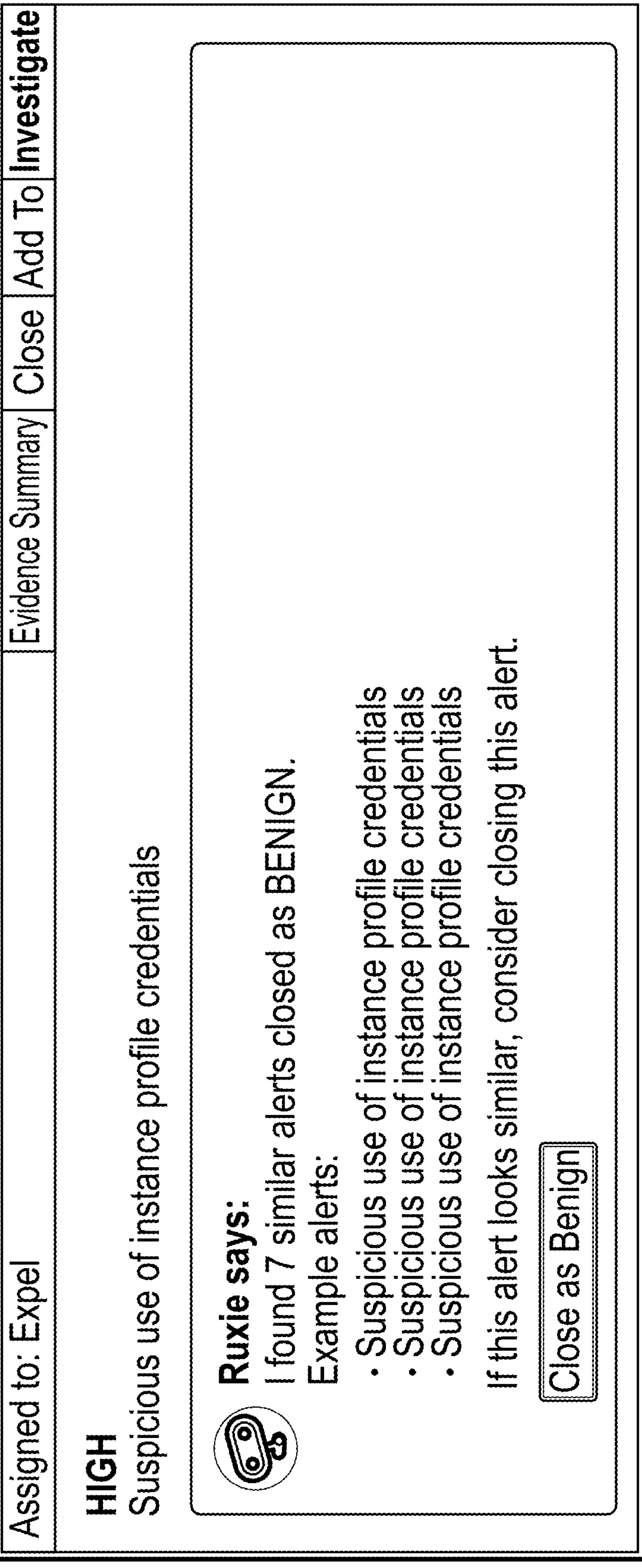
FIG. 10 illustrates an example representation of a graphical alert similarity user interface element in accordance with one or more embodiments of the present application.

Additionally, or optionally, in one or more embodiments, the alert similarity user interface element may include a selectable user interface object, that when selected, may function to perform an alert handling action (or one or more alert handling actions) that corresponds to or aligns with one or more of the previous alert handling action(s) associated with historical alerts that was previously assessed and identified by the cybersecurity threat detection and threat mitigation system as similar to the subject cybersecurity alert, as shown generally by way of example in FIG. 8, FIG. 9, and FIG. 10.

At least one technical advantage of generating the alert similarity user interface element for a target cybersecurity alert of a cybersecurity alert queue may decrease analyst fatigue and analyst triaging time. It shall be noted, in implementations in which S240 automatically implements a proposed alert action and/or a security analyst accepts the proposed alert action for a target inbound alert, S240 may inform the system 100 and/or the method 200 to bypass an (e.g., automated) investigation workflow or interrupt a current, ongoing investigation. Thereby, preventing an unnecessary time investigating and providing alert triaging times at increased efficiencies and speed.

3. Method for Event Similarity Detection, Event Similarity Explainability, and Event Handling As shown in FIG. 11, a method 300 for event similarity detection, event similarity explainability, and event handling may include obtaining a security event S310, retrieving historical security events related or substantially similar to the security event S320, generating metadata similarity assessment prompts and proposed event handling prompts based on the retrieved historical security events S330, providing the metadata similarity assessment prompts and the proposed event handling prompts to one or more language models S340, obtaining metadata similarity findings and proposed event handing actions outputted by the one or more language models S350, generating a graphical user interface based on the security event and the metadata similarity findings and proposed event handing actions outputted by the one or more language models S360, and executing a threat mitigation actions or an event disposal action for the security event S370.

3.10 Obtaining a Security Event

S310, which includes obtaining a security event, may function to obtain a security event that may require a security assessment to determine if the security event is associated with malicious activity. The security assessment, as generally referred to herein, may be performed by an automated operator, a security operations center (SOC) asset, or a combination thereof. It shall be recognized that the phrase "security event" may be interchangeably referred to herein as an "event," an "event signal," a "target security event," a "representation of digital activity," and/or the like.

In one or more embodiments, a system or service implementing method 300 may function to obtain, via one or more computers, a security event that has not been previously investigated, assessed, or otherwise analyzed to determine whether the security event corresponds to one of a malicious security event and a non-malicious security event. In other words, in some embodiments, the system or service implementing method 300 may obtain or identify a new security event that has not been previously investigated by the cybersecurity event detection and response service, as shown generally by way of example in FIG. 12. It shall be recognized that even though the new security event has not been investigated by the cybersecurity event detection and response service, the cybersecurity event detection and response service may have previously investigated and/or remediated one or more historical security events substantially similar to the new security event. As described in more detail herein, the cybersecurity event detection and response service may use historical security event data, including previously investigated security events and/or previously investigated security alerts, to accelerate an alert-to-remediation or alert-to-triage.

In one or more embodiments, a security event may be a security alert generated by the cybersecurity event detection and response service. For instance, in a non-limiting example, each security alert generated by security alert engine 110 or the like may be a security event. That is, in some embodiments, a security event may correspond to an alert produced or generated by the cybersecurity event detection and response service.

In one or more embodiments, the cybersecurity event detection and response service may obtain raw event data from a third-party security service or device (e.g., a security information and event management (SIEM) device, a cloud-based security device or service, an endpoint detection and response (EDR) platform, an intrusion detection system (IDS), an intrusion prevention system (IPS), or any other suitable security monitoring service). In such an embodiment, the cybersecurity event detection and response service implementing method 300 may use the security alert engine 110 to assess the raw event data and, in turn, generate a respective security alert based on the assessment. Accordingly, in some embodiments, the respective security alert (e.g., security event or the like) may be routed to an alert/event queue for investigation and threat mitigation when necessary.

Additionally, or alternatively, in one or more embodiments, a system or service implementing method 300 may be configured to identify or detect a security event that may require a security assessment. In one or more embodiments, the system or service implementing method 300 may identify or detect the security event based on or in response to routing the security event (e.g., a security alert or the like) to a security alert/event handling queue.

It shall be recognized that S310 may obtain, generate, or identify a security event using one or more computers or processing devices of the cybersecurity event detection and response service without departing from the scope of the disclosure. In one or more embodiments, the security event identified, obtained, and/or generated by S310 may include a plurality of distinct pieces of metadata related to the security event.

For instance, in a non-limiting example, the security event may correspond to a phishing-type security event (e.g., phishing security alert or the like). In such a non-limiting example, the security event may have been generated by the cybersecurity event detection and response service in response to the cybersecurity event detection and response service receiving, from a subscriber, a request to assess a threat of a third-party electronic communication (e.g., an email or the like). Accordingly, in one or more embodiments, the security event may include the third-party electronic communication and/or a plurality of distinct pieces of metadata associated with the third-party electronic communication, such as but not limited to subject line metadata (e.g., the email subject) of the third-party electronic communication, the sender address (e.g., the email address) from which the third-party electronic communication was sent, and a message body (e.g., the email body) of the third-party electronic communication.

3.20 Retrieving Historical Security Events

Figure 12:
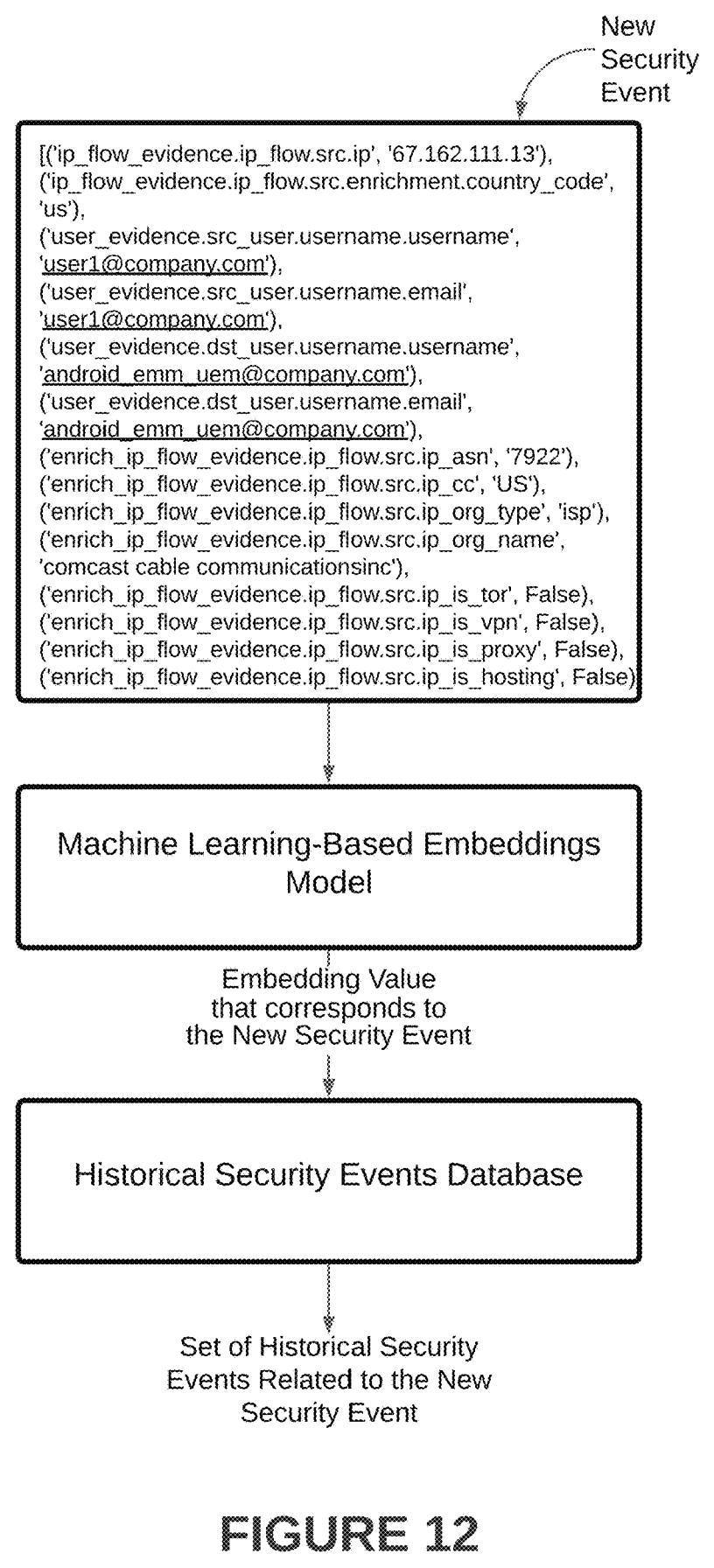

S320, which includes retrieving historical security events, may function to retrieve a set of historical security events related or substantially similar to a target security event, as shown generally by way of example in FIG. 12. In one or more embodiments, in response to S310 obtaining or identifying a subject security event that requires a security assessment, S320 may function to commence a computer-implemented event similarity detection and explainability pipeline that identifies, in real-time or near real-time, a set of historical security events similar or homogeneous to the subject security event, as well as generates, in real-time or near real-time, one or more explainability artifacts that includes a rationale describing one or more reasons the set of historical security events are related or substantially similar to the subject security event. It shall be recognized that the "set of historical security events" may be interchangeably referred to herein as the "set of historical events" and/or the like.

It shall be noted that "real-time" or "near real-time" as used herein may refer to performing an operation or generating an output within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

In one or more embodiments, S320 may determine that a respective historical security event may be related or substantially similar to a target security event if the respective historical security event has at least one metadata attribute equivalent to the target security event (e.g., the respective historical security event and the target security event have the same IP address, the same email domain, the same sender address, etc.) and/or the embedding value computed for the respective historical security event is within a predefined vector distance of the embedding value computed for the target security event. In other words, in one or more embodiments, a set of historical security events identified by S320 to be similar to the target security event may be semantically similar to the target security event and/or share one or more metadata attributes with the target security event.

Embeddings-Based Similarity Search

Figure 13:
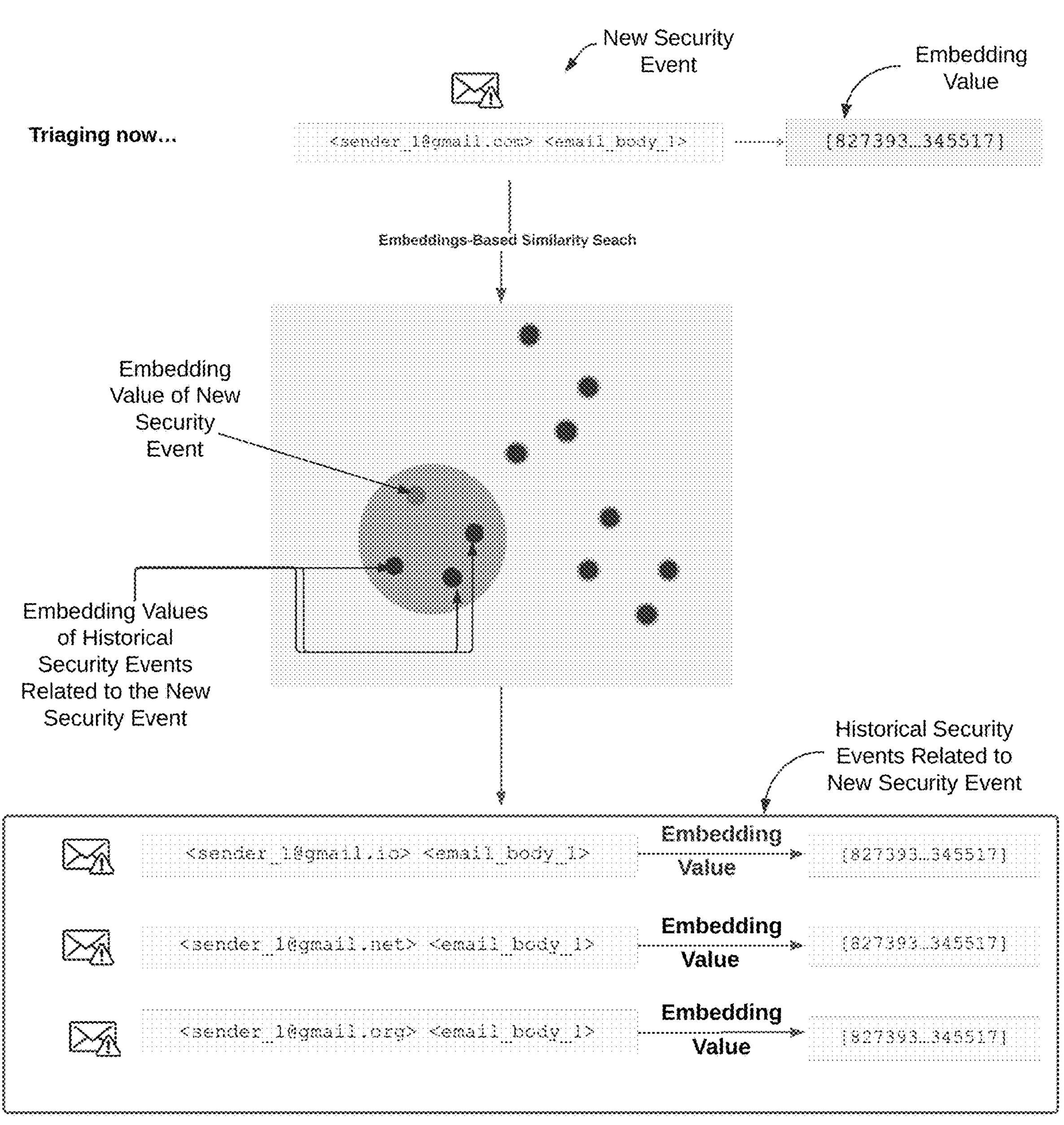
FIG. 13 illustrates an example of retrieving a set of historical electronic communications related or similar to a target third-party electronic communication in accordance with one or more embodiments of the present application.

In one or more embodiments, S320 may execute an embeddings-based similarity search to identify historical security events that are semantically similar to a target security event (e.g., the security event identified by S310), as shown generally by way of example in FIG. 13.

In one or more embodiments, before performing an embedding-based similarity search, a system or service implementing method 300 may function to construct an n-dimensional embeddings space or index that stores a plurality of embedding values that correspond to a plurality of historical security events. For instance, in a non-limiting example, the system or service implementing method 300 may function to obtain a corpus of historical security events and, in turn, convert each historical security event into a corresponding embedding representation using a machine learning-based embedding model. Accordingly, in such a non-limiting example, each embedding representation outputted by the machine learning-based embedding model may be mapped onto the n-dimensional embeddings space and/or stored in an indexed data structure (e.g., vector database or the like).

In one or more embodiments, the n-dimensional embeddings space or index may be an n-dimensional space or an n-bit space that may include a plurality of vector representations (e.g., vector values) that correspond to a plurality of distinct historical security alerts and/or a plurality of distinct historical security events. In one or more embodiments, the system or service implementing method 300 may construct a global n-dimensional embeddings space using corpora of alert/event data from a plurality of distinct subscribers to the system or service implementing method 300. In such an embodiment, the constructed global n-dimensional embeddings space (or database index) may include a plurality of embedding values that correspond to a plurality of historical security events of a plurality of subscribers in a single embeddings space (or data repository or database index).

Alternatively, in one or more embodiments, the system or service implementing method 300 may function to individually construct one or more local or subscriber-specific embedding spaces isolated to alert and/or event data of an individual subscriber (e.g., constructing an event space per subscriber).

In one or more embodiments, in response to S310 identifying or obtaining, via one or more computers, a subject security event that requires a security assessment, S320 may function to retrieve, via the one or more computers, a set of historical security events related to the subject security event in response to executing an embeddings-based similarity search. In such an embodiment, S320 may function to construct an embeddings-based similarity search query that may include an embedding representation (e.g., embedding vector value) of the subject security event as a search parameter. The embeddings-based similarity search query, when executed, may be configured to search the n-dimensional embeddings space or index that stores the plurality of embedding values that correspond to the plurality of historical security events, identify a subset of the plurality of embedding values that are closest to the embedding representation (e.g., embedding vector value) of the subject security event, and return the set of historical security events that correspond to the subset of the plurality of embedding values that are closest to the embedding representation (e.g., embedding vector value) of the subject security event.

For instance, in a non-limiting example, the cybersecurity event detection and response service may function to receive, from a subscriber, a request to assess a threat of a third-party electronic communication that the subscriber received from an external entity. In one or more embodiments, in response to receiving the request, the cybersecurity event detection and response service may function to generate a security alert (e.g., security event or the like) that includes a representation of the third-party electronic communication that the subscriber received from the external entity.

Accordingly, in one or more embodiments, in response to the cybersecurity event detection and response service obtaining or generating the security alert, S320 may function to compute, using a machine learning-based embeddings model or the like, an embedding value for the security alert. For instance, in a non-limiting example, S320 may function to provide, as input, a text document to the machine learning-based embeddings model that includes the message body (e.g., email text body or the like) of the third-party electronic communication and/or the sender address associated with the third-party electronic communication and, in turn, the machine learning-based embeddings model may output the embedding value for the security alert based on translating the text document into a numerical vector or numerical vector representation.

Furthermore, in such an embodiment, the cybersecurity event detection and response service may perform an embeddings-based similarity search by querying the n-dimensional embeddings space or index (that stores the plurality of embedding values that correspond to the plurality of historical security events) using the computed embedding value that corresponds to the security alert. Accordingly, in such an embodiment, the embeddings-based similarity search may identify a subset of the plurality of embedding values that are closest to the embedding value of the security alert (e.g., closest fifteen embedding values, closest ten embedding values, closest five embedding values or another suitable number) and, in turn, return the set of historical security events (e.g., a plurality of historical electronic communications, etc.) that correspond to the subset of the plurality of embedding values.

Composite-Based Similarity Search

Figure 14:
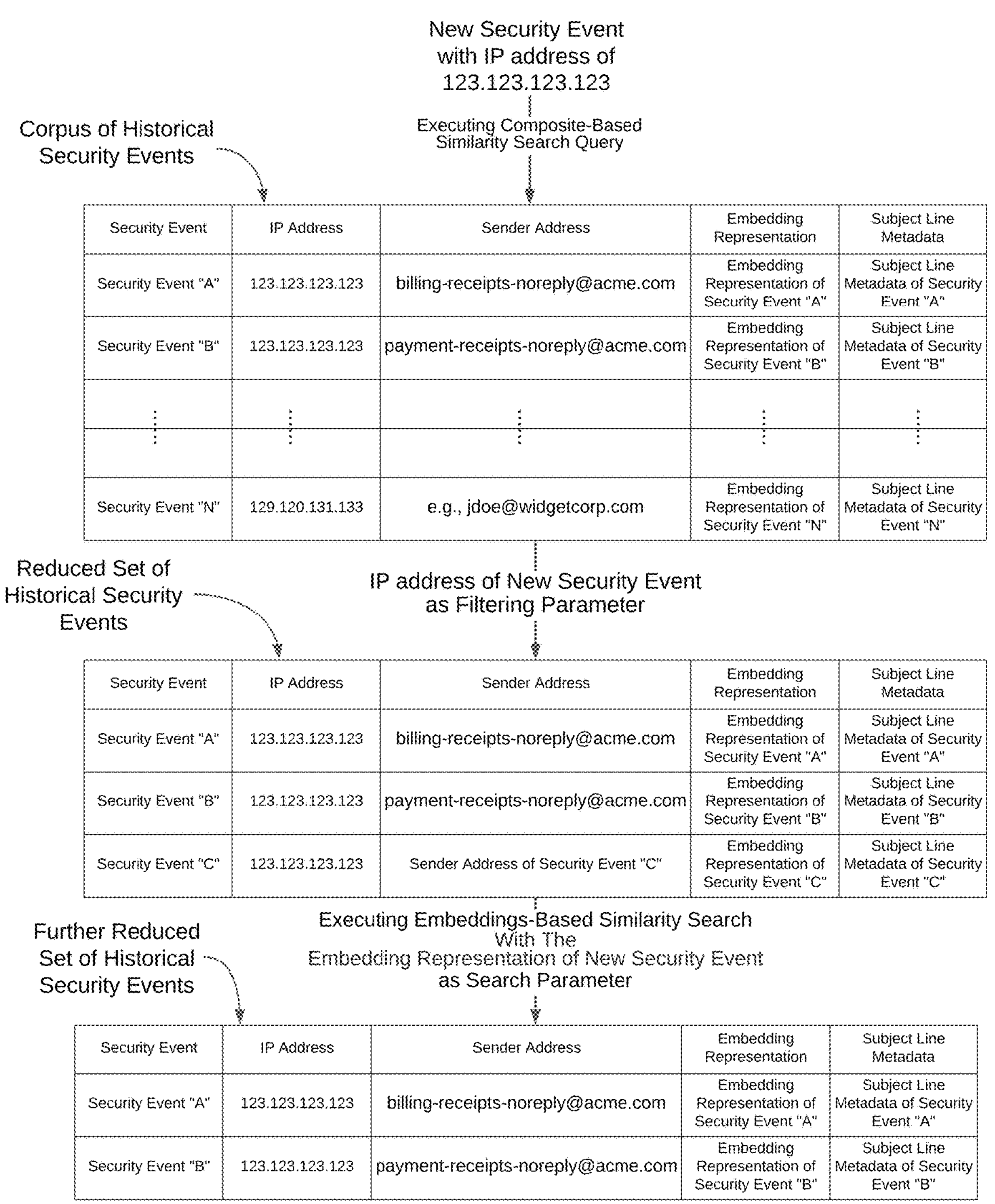
FIG. 14 illustrates an example of executing a composite-based similarity search query in accordance with one or more embodiments of the present application.

In one or more embodiments, S320 may function to perform a composite-based similarity search to identify a set of historical security events (e.g., security alerts, etc.) that are both semantically similar to a target security event and shares one or more target metadata attributes with the target security event, as shown generally by way of example in FIG. 14. At least one technical benefit of performing a composite-based similarity search instead of the aforementioned embeddings-based similarity search may improve retrieval precision by filtering or pairing down the plurality of historical security events stored in the index or the n-dimensional embeddings space to a reduced subset of historical security events before executing an embeddings-based similarity search. Each historical security event of the reduced subset of historical security events, in one or more embodiments, may have at least one target metadata attribute value in common with the target security event (e.g., same internet protocol address value, same email domain, same sender address, etc.). This type of search may reduce false positives, enhance retrieval accuracy, and improve computational efficiency (e.g., lower memory and CPU usage) by filtering out irrelevant historical security events based on metadata attributes before performing embeddings-based similarity computations, which may reduce the number of vector comparisons needed to be performed, decrease computational load, and accelerate query execution while ensuring high retrieval precision.

In one or more embodiments, before performing a composite-based similarity search, the system or service implementing method 300 may function to construct an indexed data structure that stores a plurality of historical security events along with their associated metadata attributes and corresponding embedding values. In one or more embodiments, the indexed data structure may be maintained within a database, vector index, or in-memory data store optimized for high-performance retrieval and vector similarity computations. The system or service implementing method 300 may continuously update the indexed data structure by ingesting newly observed security events, extracting their respective metadata attributes, computing their respective embedding values, and storing the newly observed security events for future retrieval.

In one or more embodiments, in response to S310 identifying or obtaining, via one or more computers, a subject security event that requires a security assessment, S320 may function to retrieve, in real-time or near real-time, a set of historical security events related to the subject security event in response to executing a composite-based similarity search. In such an embodiment, S320 may function to construct a composite-based similarity search query that includes one or more target metadata values extracted from the subject security event as filter parameters and an embedding representation of the subject security event. Accordingly, in response to executing the composite-based similarity search query configured for the subject security event, S320 may identify an initial set of historical security events of the plurality of historical security events stored within the indexed data structure that includes at least the one or more target metadata values and may then further pare down the initial set of historical security events to a further refined set of historical security events by performing an embeddings-based similarity search on the initial set of historical security events using the embedding representation of the subject security event. It shall be recognized that, in one or more embodiments, S320 may generate the further refined set of historical security events by removing historical security events from the initial set of historical security events whose embedding values exceed a predefined maximum vector distance threshold from the embedding representation of the subject security event.

For instance, in a non-limiting example, S310 may function to obtain or identify a security event that includes a representation of a third-party electronic communication that a subscriber received from an external entity. The security event may include one or more metadata attributes associated with the third-party electronic communication such as a source internet protocol (IP) address from which the third-party electronic communication was sent, a sender email address (e.g., jdoe@acme.com) that sent the third-party electronic communication, a username (e.g., jdoe) associated with the sender email address, subject line metadata of the third-party electronic communication, and a message body of the third-party electronic communication.

In such an embodiment, S320 may function to execute a composite-based similarity search to identify or retrieve a set of historical security events that are both semantically similar to the security event (e.g., the third-party electronic communication) and shares at least one target metadata attribute with the security event (e.g., the third-party electronic communication). It shall be recognized that, in one or more embodiments, the retrieved set of historical security events may include a plurality of historical electronic communications related to the third-party electronic communication of the security event.

Accordingly, in one or more embodiments, in response to executing the composite-based similarity search, the composite-based similarity search may assess the plurality of historical security events stored within the indexed data structure to identify a reduced subset of historical security events of the plurality of historical security events that includes the at least one target metadata attribute in common with the security event, such as the same username or source IP address. In other words, in such an embodiment, each distinct historical security event of the reduced subset of historical security events includes the at least one target metadata attribute in common with the security event (e.g., the reduced subset of historical security events excludes historical security events that do not contain the at least one target metadata attribute in common with the security event).

Furthermore, in such an embodiment, the composite-based similarity search may reduce the reduced subset of historical security events to a further reduced subset of historical security events by performing an embeddings-based similarity search to identify only historical security events included in the reduced subset of historical security events that satisfy a predefined vector distance threshold. That is, in one or more embodiments, for each respective historical security event in the reduced subset of historical security events, the embeddings-based similarity search may compute a vector distance between an embedding representation of the respective historical security event and the embedding representation of the security event, and generate the further reduced subset of historical security events by removing respective historical security events from the reduced subset of historical security events whose respective vector distance exceeds the predefined vector distance threshold. Accordingly, in such an embodiment, the further reduced subset of historical security events may be returned in response to performing the composite-based similarity search (e.g., each historical security event included in the further reduced subset of historical security events are both contextually relevant based on the metadata assessment and semantically similar based on the embeddings assessment).

In other words, the composite-based similarity search may pare down the large set of historical security events (e.g., over one million historical security events, etc.) stored in the index or the n-dimensional embeddings space to a significantly smaller subset of historical security events (e.g., fifteen historical security events, thirty historical security events, etc.) through a multi-stage filtering process. The first stage of the multi-stage filtering process may retrieve historical security events that share at least one target metadata value extracted from the active or new security alert obtained by S310, where the at least one target metadata value may be a source IP address, email address, domain name, or another suitable metadata attribute value. By executing the first stage of the multi-stage filtering process of the composite-based similarity search, the search space may be smaller as the total number of historical security events under consideration may be reduced by filtering out historical security events included in the large set of historical security events that do not contain the at least one target metadata value. As a result, the large set of historical security events is transformed into a much smaller, more relevant subset of historical security events before performing embeddings-based similarity computations (e.g., the much smaller, more relevant subset of historical security events includes only historical security events of the large set of historical security events that contain the at least one target metadata attribute in common with the active or new security alert obtained by S310 and excludes historical security events of the large set of historical security events that do not contain the at least one target metadata attribute in common with the active or new security alert obtained by S310).

Accordingly, in one or more embodiments, once the first stage of the multi-stage filtering process is complete, the composite-based similarity search may proceed to the second stage of the multi-stage filtering process. The second stage of the multi-stage filtering process may execute an embeddings-based similarity search to further refine the much smaller, more relevant subset of historical security events identified in the first stage. In a non-limiting example of the second stage, the embedding representation of each historical security event in the much smaller, more relevant subset of historical security events identified in the first stage may be compared to the embedding representation of the active or new security alert obtained by S310 using a predefined similarity metric, such as cosine similarity or Euclidean distance. The embeddings-based similarity search may remove historical security events from the much smaller, more relevant subset of historical security events identified in the first stage whose embedding values exceed a predefined maximum vector distance threshold from the embedding representation of the active or new security alert. As a result, the smaller, more relevant subset of historical security events identified in the first stage is further reduced into a further refined subset of historical security events that includes only the historical security events included in the much smaller, more relevant subset of historical security events that satisfies the predefined maximum vector distance threshold. In one or more embodiments, after generating the further refined subset of historical security events, the further refined subset of historical security events may be returned as a response to executing the composite-based similarity search.

Figure 15:
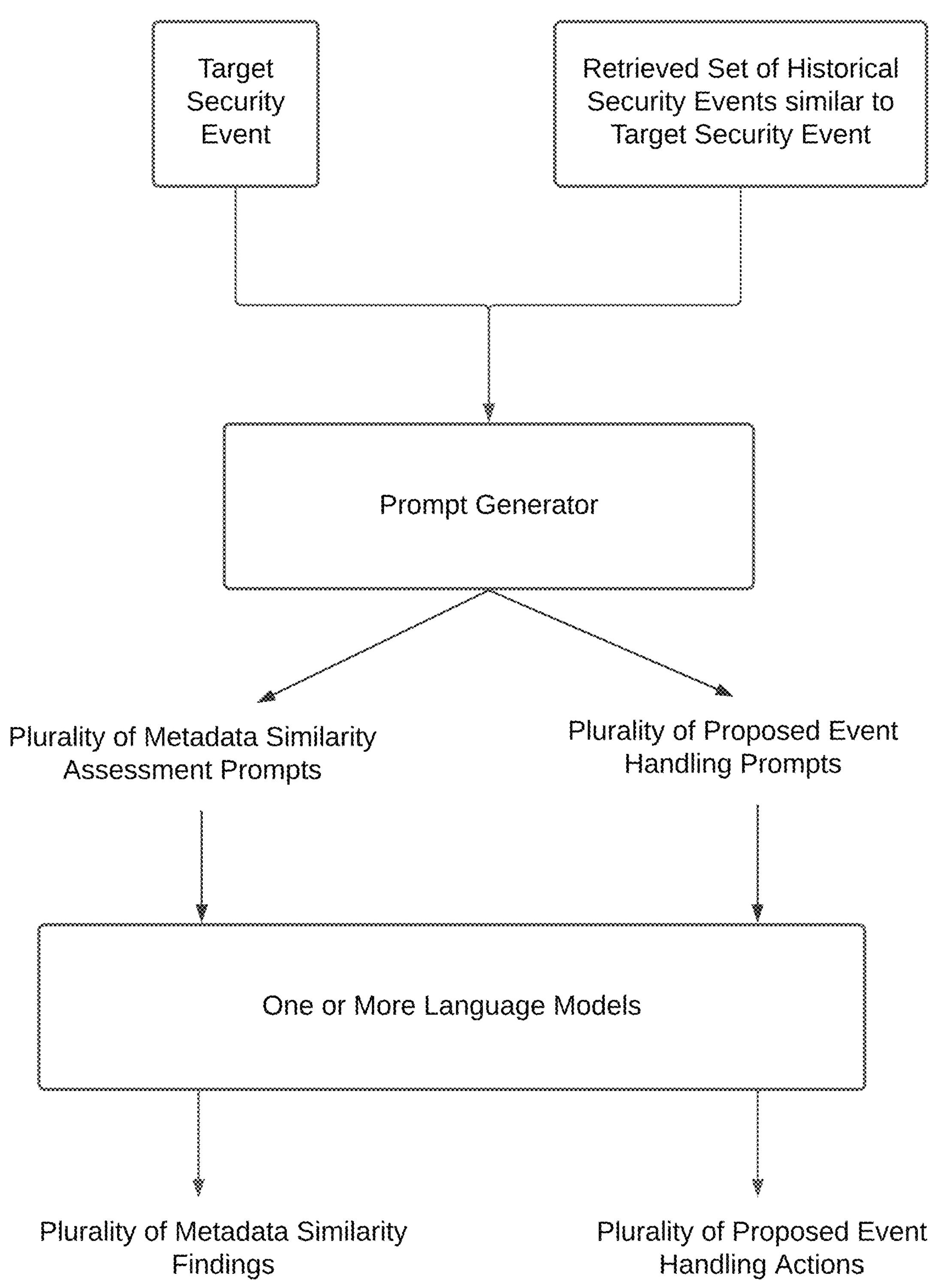
FIG. 15 illustrates an example of generating a plurality of metadata similarity assessment prompts and a plurality of proposed event handling prompts in accordance with one or more embodiments of the present application.

3.30 Generating Metadata Similarity Assessment Prompts and Proposed Event Handling Prompts S330, which includes generating metadata similarity assessment prompts and proposed event handling prompts, may function to generate, in real-time or near real-time, a plurality of metadata similarity assessment prompts and a plurality of proposed event handling prompts, as shown generally by way of example in FIG. 15. A prompt, as generally referred to herein, may include a set of instructions and contextual information that may be provided as input to a language model or large language model and, in turn, the language model or large language model may generate an output based on assessing the contextual information in accordance with the set of instructions. As described in more detail herein, the plurality of metadata similarity assessment prompts and the plurality of proposed event handling prompts generated by S330 may be specifically configured for the security event obtained, generated, or identified in S310.

Generating Metadata Similarity Assessment Prompts

In one or more embodiments, based on or in response to retrieving the set of historical security events similar or related to the security event obtained by S310, S330 may function to generate, via one or more computers, a plurality of metadata similarity assessment prompts in real-time or near real-time. Each metadata similarity assessment prompt of the plurality of metadata similarity assessment prompts may include a distinct set of metadata assessment instructions for evaluating an extent of metadata similarity between the security event obtained by S310 and the set of historical security events retrieved by S320 for a distinct metadata type (e.g., single distinct metadata type). In other words, each distinct metadata similarity assessment prompt of the plurality of metadata similarity assessment prompts may be specifically designed to evaluate metadata similarity for a distinct metadata type to determine the extent of metadata similarity between the security event obtained by S310 and the set of historical security events retrieved by S320 for the distinct metadata type.

In one or more embodiments, the security event obtained by S310 may include a first metadata value that corresponds to a first distinct type of metadata, a second metadata value that corresponds to a second distinct type of metadata, a third metadata value that corresponds to a third distinct type of metadata, and a fourth metadata value that corresponds to a fourth distinct type of metadata. Each historical security event of the set of historical security events retrieved by S320, in one or more embodiments, may include a first respective metadata value that corresponds to the first distinct type of metadata, a second respective metadata value that corresponds to the second distinct type of metadata, a third respective metadata value that corresponds to the third distinct type of metadata, and a fourth respective metadata value that corresponds to the fourth distinct type of metadata.

Accordingly, in such an embodiment, S330 may function to generate, in real-time using one or more computers, a plurality of metadata similarity assessment prompts. The plurality of metadata similarity assessment prompts may include a first distinct metadata similarity assessment prompt that includes a first distinct set of metadata assessment instructions for evaluating an extent of metadata similarity between the security event obtained by S310 and the set of historical security events retrieved by S320 with respect to the first distinct type of metadata, a second distinct metadata similarity assessment prompt that includes a second distinct set of metadata assessment instructions for evaluating an extent of metadata similarity between the security event obtained by S310 and the set of historical security events retrieved by S320 with respect to the second distinct type of metadata, a third distinct metadata similarity assessment prompt that includes a third distinct set of metadata assessment instructions for evaluating an extent of metadata similarity between the security event obtained by S310 and the set of historical security events retrieved by S320 with respect to the third distinct type of metadata, and a fourth distinct metadata similarity assessment prompt that includes a fourth distinct set of metadata assessment instructions for evaluating an extent of metadata similarity between the security event obtained by S310 and the set of historical security events retrieved by S320 with respect to the fourth distinct type of metadata.

For instance, in a non-limiting example, the first distinct metadata similarity assessment prompt may include the first metadata value of the security event obtained by S310 that corresponds to the first distinct type of metadata, a set of metadata values of the set of historical security events retrieved by S320 that corresponds to the first distinct type of metadata (e.g., the set of metadata values include the respective metadata value of each distinct historical security event retrieved by S320 that corresponds to the first distinct type of metadata), and the first distinct set of metadata assessment instructions that provide directives to a machine learning model (e.g., language model, large language model, etc.) for evaluating the extent of metadata similarity between the first metadata value of the security event obtained by S310 and the set of metadata values associated with the set of historical security events retrieved by S320 that corresponds to the first distinct type of metadata.

Additionally, or alternatively, in such a non-limiting example, the second distinct metadata similarity assessment prompt may include the second metadata value of the security event obtained by S310 that corresponds to the second distinct type of metadata, a set of metadata values of the set of historical security events retrieved by S320 that corresponds to the second distinct type of metadata (e.g., the set of metadata values includes the respective metadata value of each distinct historical security event retrieved by S320 that corresponds to the second distinct type of metadata), and the second distinct set of metadata assessment instructions that provide directives to a machine learning model (e.g., language model, large language model, etc.) for evaluating the extent of metadata similarity between the second metadata value of the security event obtained by S310 and the set of metadata values associated with the set of historical security events retrieved by S320 that corresponds to the second distinct type of metadata.

Additionally, or alternatively, in such a non-limiting example, the third distinct metadata similarity assessment prompt may include the third metadata value of the security event obtained by S310 that corresponds to the third distinct type of metadata, a set of metadata values of the set of historical security events retrieved by S320 that corresponds to the third distinct type of metadata (e.g., the set of metadata values includes the respective metadata value of each distinct historical security event retrieved by S320 that corresponds to the third distinct type of metadata), and the third distinct set of metadata assessment instructions that provide directives to a machine learning model (e.g., language model, large language model, etc.) for evaluating the extent of metadata similarity between the third metadata value of the security event obtained by S310 and the set of metadata values associated with the set of historical security events retrieved by S320 that corresponds to the third distinct type of metadata.

Additionally, or alternatively, in such a non-limiting example, the fourth distinct metadata similarity assessment prompt may include the fourth metadata value of the security event obtained by S310 that corresponds to the fourth distinct type of metadata, a set of metadata values of the set of historical security events retrieved by S320 that corresponds to the fourth distinct type of metadata (e.g., the set of metadata values includes the respective metadata value of each distinct historical security event retrieved by S320 that corresponds to the fourth distinct type of metadata), and the fourth distinct set of metadata assessment instructions that provide directives to a machine learning model (e.g., language model, large language model, etc.) for evaluating the extent of metadata similarity between the fourth metadata value of the security event obtained by S310 and the set of metadata values associated with the set of historical security events retrieved by S320 that corresponds to the fourth distinct type of metadata.

Stated another way, in one or more embodiments, each distinct metadata similarity assessment prompt of the plurality of metadata similarity assessment prompts may include a subject piece of metadata of the security event obtained by S310 that corresponds to a distinct metadata type, a set of metadata attributes of the set of historical security events retrieved by S320 that only correspond to the same distinct metadata type, and a set of instructions for performing a metadata similarity assessment between the subject piece of metadata of the security event that corresponds to the distinct metadata type and the set of metadata attributes of the set of historical security events that correspond to the same distinct metadata type.

It shall be recognized that, in one or more embodiments, the set of metadata assessment instructions for each distinct metadata similarity assessment prompt may be distinct, even though all prompts are configured to perform a metadata similarity assessment, because the similarity evaluation process is metadata-type dependent. In other words, the instructions or directives provided to the language model may vary based on the metadata type. For instance, in a non-limiting example, a metadata similarity assessment prompt for assessing domain names may instruct the language model to identify patterns or common substrings that indicate a relationship between domains, whereas a metadata similarity assessment prompt for assessing file hash signatures may require an exact match, as a minor change in a file may result in a completely different hash signature.

It shall be further recognized that, in some embodiments, the total number of metadata similarity assessment prompts generated by S330 may be equivalent to the total number of distinct pieces of metadata included in the security event obtained by S310. For instance, in a non-limiting example, if the security event obtained by S310 includes fifteen (15) distinct pieces of metadata, S330 may generate fifteen (15) metadata similarity assessment prompts, ensuring that each metadata type is independently evaluated.

It shall be further recognized that, in some embodiments, the total number of metadata similarity assessment prompts generated by S330 may be less than the total number of distinct pieces of metadata included in the security event obtained by S310. For example, if the security event contains fifteen (15) distinct pieces of metadata, S330 may generate only four (4) distinct metadata similarity assessment prompts. The system or service implementing method 300 may function to select the metadata types for which metadata similarity assessment prompts are generated based on their effectiveness in determining whether the security event obtained by S310 is actually similar or equivalent to the set of historical security events retrieved by S320. Metadata types that strongly indicate similarity—such as domain names, IP addresses, or file hashes, which can directly link events to common entities, infrastructure, or attack vectors—may be prioritized, while metadata types that are more variable or incidental—such as timestamps or dynamic process IDs, which may differ even among highly similar events—may be deprioritized or ignored.

In one or more embodiments, a new security event obtained, identified, or generated by S310 may include a plurality of distinct pieces of metadata. The new security event, in such an embodiment, may include a representation of a third-party electronic communication that a subscriber received from an external entity. Furthermore, in such an embodiment, the plurality of distinct pieces of metadata associated with the new security event may include a sender address from which the third-party electronic communication was sent, a message body (e.g., the email body) of the third-party electronic communication, and subject line metadata (e.g., the email subject) of the third-party electronic communication. It shall be recognized that, in such an embodiment, the set of historical security events retrieved by S320 may include or correspond to a plurality of historical electronic communications related, similar, or equivalent to the third-party electronic communication.

Accordingly, in such an embodiment, in response to obtaining, identifying, or generating the new security event, S330 may function to generate, in real-time or near real-time, a first distinct metadata similarity assessment prompt configured to only evaluate the extent of metadata similarity between the new security event (e.g., the third-party electronic communication) and the set of historical security events (e.g., the plurality of historical electronic communications related to the third-party electronic communication) based on or with respect to a sender address metadata feature, as shown generally by way of example in FIG. 16. A sender address metadata feature, as generally referred to herein, may be a characteristic or attribute associated with the sender address in an electronic communication.

In one or more embodiments, generating the first distinct metadata similarity assessment prompt may include instantiating, via one or more computers, an instance of a prompt template of a plurality of predefined metadata similarity assessment prompt templates that corresponds to the sender address metadata feature; obtaining, via the one or more computers, the sender address of the third-party electronic communication associated with the new security event; obtaining, via the one or more computers, a set of sender addresses that correspond to the plurality of historical electronic communications; and populating, within the instance of the prompt template that corresponds to the sender address metadata feature, the sender address of the third-party electronic communication associated with the new security event and the set of sender addresses that correspond to the plurality of historical electronic communications.

It shall be recognized that, in one or more embodiments, the instance of the prompt template that corresponds to the sender address metadata feature may include a first instruction that instructs one or more language models to perform a domain similarity assessment to identify if a domain pattern exists between the sender address of the third-party electronic communication of the new security event and the set of sender addresses that correspond to the plurality of historical electronic communications. Furthermore, in such an embodiment, the instance of the prompt template that corresponds to the sender address metadata feature may include a second instruction that instructs the one or more language models to perform a username similarity assessment to identify if a username pattern exists between the sender address of the third-party electronic communication of the new security event and the set of sender addresses that correspond to the plurality of historical electronic communications.

For instance, in a non-limiting example, the sender address of the third-party electronic communication associated with the new security event may be "finance-receipts-noreply@acme.com" and the plurality of historical electronic communications retrieved by S320 may include a first historical electronic communication sent from "billing-receipts-noreply@acme.com" and a second historical electronic communication sent from "payment-receipts-noreply@acme.com." In such a non-limiting example, S330 may function to instantiate an instance of the prompt template that corresponds to the sender address metadata feature. The prompt template that corresponds to the sender address metadata feature may be configured to evaluate whether a metadata similarity relationship exists between the sender address of the new security event and the sender addresses of the plurality of historical electronic communications. Accordingly, using one or more computers, S330 may function to populate the instance of the prompt template with the sender address associated with the new security event (e.g., "finance-receipts-noreply@acme.com") and the set of sender addresses that correspond to the plurality of historical electronic communications (e.g., "billing-receipts-noreply@acme.com" and "payment-receipts-noreply@acme.com"). It shall be recognized that, in such a non-limiting example, the sender address of the third-party electronic communication associated with the new security event, the sender address of the first historical electronic communication of the plurality of historical electronic communications retrieved by S320, and the sender address of the second historical electronic communication of the plurality of historical electronic communications retrieved by S320 may be nearly identical except for the portion of the sender address preceding "-receipts-noreply" (i.e., "finance," "billing," and "payment").

Additionally, or alternatively, in such an embodiment, in response to obtaining, identifying, or generating the new security event, S330 may function to generate, in real-time or near real-time, a second distinct metadata similarity assessment prompt configured to only evaluate the extent of metadata similarity between the new security event (e.g., the third-party electronic communication) and the set of historical security events (e.g., the plurality of historical electronic communications related to the third-party electronic communication) based on or with respect to a message body metadata feature, as shown generally by way of example in FIG. 17. A message body metadata feature, as generally referred to herein, may be the textual content (e.g., sentences, paragraphs, embedding links, etc.) included in the main body or message of a subject third-party electronic communication (e.g., email).

In one or more embodiments, generating the second distinct metadata similarity assessment prompt may include instantiating, via one or more computers, an instance of a prompt template of the plurality of predefined metadata similarity assessment prompt templates that corresponds to the message body metadata feature; obtaining, via the one or more computers, the message body of the third-party electronic communication associated with the new security event; obtaining, via the one or more computers, a set of message bodies that correspond to the plurality of historical electronic communications; and populating, within the instance of the prompt template that corresponds to the message body metadata feature, the message body of the third-party electronic communication associated with the new security event and the set of message bodies that correspond to the plurality of historical electronic communications.

It shall be recognized that, in one or more embodiments, the instance of the prompt template that corresponds to the message body metadata feature may include a first instruction that instructs one or more language models to perform a text similarity assessment to identify if a message body pattern exists between the message body of the third-party electronic communication of the new security event and the set of message bodies that correspond to the plurality of historical electronic communications. Furthermore, in one or more embodiments, the instance of the prompt template that corresponds to the message body metadata feature may include a second instruction that instructs the one or more language models to perform a message body deviation assessment to identify if a message body deviation exists between the message body of the third-party electronic communication of the new security event and the set of message bodies that correspond to the plurality of historical electronic communications.

For instance, in a non-limiting example, the message body of the third-party electronic communication associated with the new security event may be "Hello, Dear! 364 days ago, you registered on our platform for automatic cloud Bitcoin mining (collecting) by linking your devices to our platform by IP address. You were not active in your personal [[Graphical Representation of Dollar Emoji]] account, but the collection of cryptocurrency occurred automatically from your device. Your account: ACCT-93827164; will be blocked after 24 hours. Please, withdraw the remaining funds within 24 hours! Sincerely, Finance Department. P/S: Details in your personal account: www.acme-crypto-secure.com/login?ACCT=93827164", the message body of the first historical electronic communication of the plurality of historical electronic communications retrieved by S320 may be "Hello, Dear! 364 days ago, you registered on our platform for automatic cloud Bitcoin mining (collecting) by linking your devices to our platform by IP address. You were not active in your personal account, but the collection of cryptocurrency occurred automatically from your device. [[Graphical Representation of Dollar Sign Emoji]] Your account: ACCT-2025-187653; will be blocked after 24 hours. Please, withdraw the remaining funds within 24 hours! Sincerely, Finance Department. P/S: Details in your personal account", and the message body of the second historical electronic communication of the plurality of historical electronic communications retrieved by S320 may be "Hello, Dear! 364 days ago, you registered on our platform for automatic cloud Bitcoin mining (collecting) by linking your devices to our platform by IP address. You were not active in your personal account, but the collection of cryptocurrency occurred automatically from your device. [[Graphical Representation of Cart Emoji]] Your account: ACCT-2023-12345; will be blocked after 24 hours. Please, withdraw the remaining funds within 24 hours! Sincerely, Finance Department. P/S: Details in your personal account." In such a non-limiting example, S330 may function to instantiate an instance of the prompt template that corresponds to the message body metadata feature. The prompt template that corresponds to the message body metadata feature may be configured to evaluate if a metadata similarity relationship exists between the message body of the new security event and the message bodies of the historical electronic communications. Accordingly, using one or more computers, S330 may function to populate the instance of the prompt template with the message body associated with the new security event and the set of message bodies that correspond to the plurality of historical electronic communications (e.g., the message body of the first historical electronic communication and the message body of the second historical electronic communication). It shall be recognized that, in such a non-limiting example, the message bodies of the third-party electronic communication associated with the new security event, the first historical electronic communication of the plurality of historical electronic communications retrieved by S320, and the second historical electronic communication of the plurality of historical electronic communications retrieved by S320 may be nearly identical.

Figure 18:
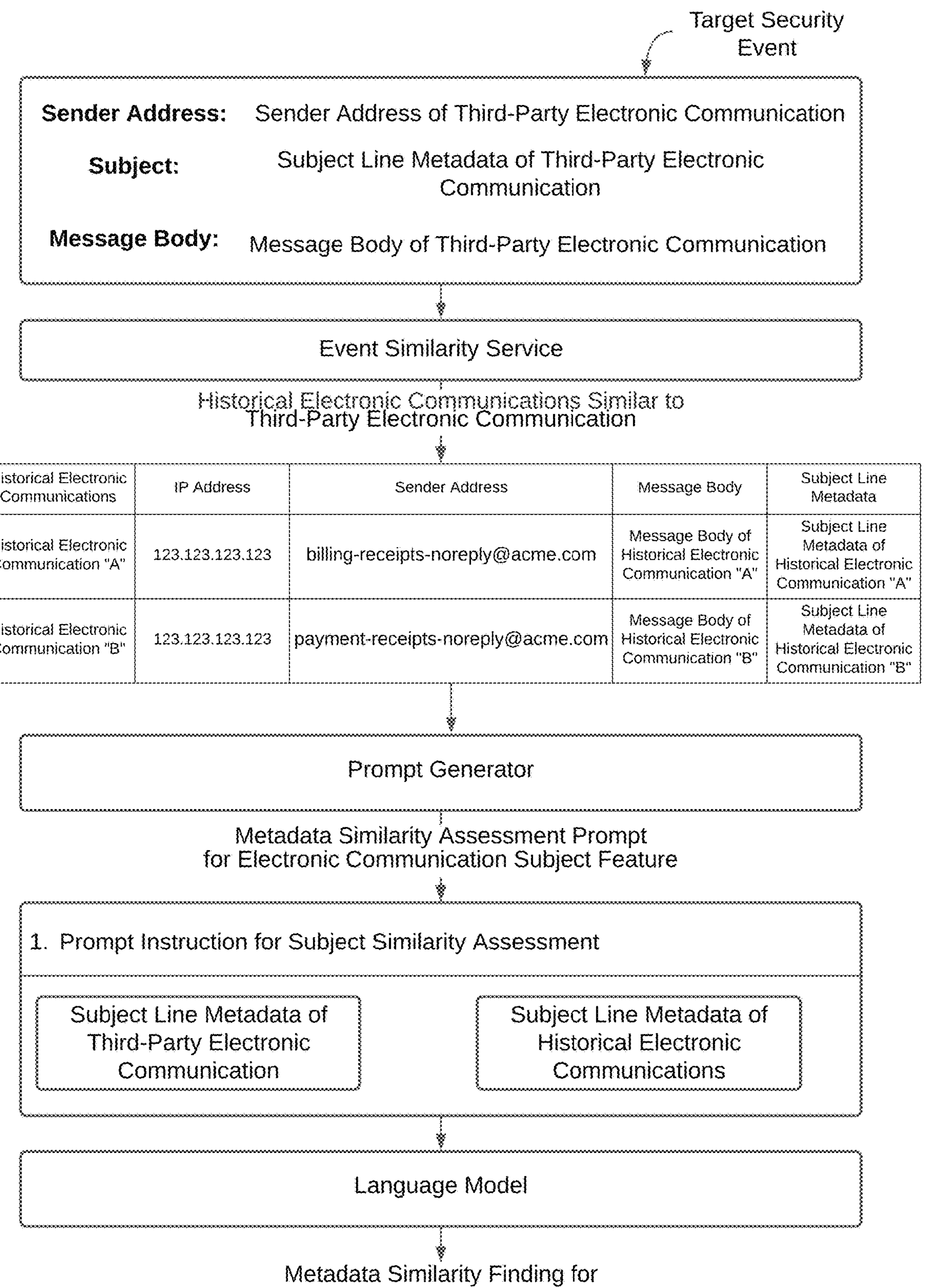
FIG. 18 illustrates an example of generating a metadata similarity finding for an electronic communication subject feature in accordance with one or more embodiments of the present application.

Additionally, or alternatively, in such an embodiment, in response to obtaining, identifying, or generating the new security event, S330 may function to generate, in real-time or near real-time, a third distinct metadata similarity assessment prompt configured to only evaluate the extent of metadata similarity between the new security event (e.g., the third-party electronic communication) and the set of historical security events (e.g., the plurality of historical electronic communications related to the third-party electronic communication) based on or with respect to an electronic communication subject feature, as shown generally by way of example in FIG. 18. An electronic communication subject feature, as generally referred to herein, may be the text string present in the "subject" field of an electronic communication (e.g., an email or message).

In one or more embodiments, generating the third distinct metadata similarity assessment prompt may include instantiating, via one or more computers, an instance of a prompt template of the plurality of predefined metadata similarity assessment prompt templates that corresponds to the electronic communication subject feature; obtaining, via the one or more computers, the subject line metadata of the third-party electronic communication associated with the new security event; obtaining, via the one or more computers, a corresponding set of subject line metadata that corresponds to the plurality of historical electronic communications; and populating, within the instance of the prompt template that corresponds to the electronic communication subject feature, the subject line metadata of the third-party electronic communication associated with the new security event and the corresponding set of subject line metadata that correspond to the plurality of historical electronic communications.

It shall be recognized that, in one or more embodiments, the instance of the prompt template that corresponds to the electronic communication subject feature may include a first instruction that instructs the one or more language models to perform a subject similarity assessment to determine if a subject pattern exists between the subject line metadata of the third-party electronic communication of the new security event and the corresponding set of subject line metadata that correspond to the plurality of historical electronic communications.

For instance, in a non-limiting example, the subject line metadata of the third-party electronic communication associated with the new security event may be "[[Graphical Representation of Scroll Emoji]] Your account: ACCT-93827164; will be blocked!", the subject line metadata of the first historical electronic communication of the plurality of historical electronic communications retrieved by S320 may be "[[Graphical Representation of Dollar Sign Emoji]] Your account: ACCT-2025-187653; will be blocked!", and the subject line metadata of the second historical electronic communication of the plurality of historical electronic communications retrieved by S320 may be "[[Graphical Representation of Link Emoji]] Your account: ACCT-ACCT-2023-12345; will be blocked!." In such a non-limiting example, S330 may function to instantiate an instance of the prompt template that corresponds to the electronic communication subject feature. The prompt template that corresponds to the electronic communication subject feature may be configured to evaluate if a metadata similarity relationship exists between the subject line metadata of the new security event and the subject line metadata of the plurality of historical electronic communications. Accordingly, using one or more computers, S330 may function to populate the instance of the prompt template with the subject line metadata associated with the new security event and the corresponding set of subject line metadata that correspond to the plurality of historical electronic communications (e.g., "[[Graphical Representation of Dollar Sign Emoji]] Your account: ACCT-2025-187653; will be blocked!" and "[[Graphical Representation of Link Emoji]] Your account: ACCT-ACCT-2023-12345; will be blocked!"). It shall be recognized that, in such a non-limiting example, the subject line metadata of the third-party electronic communication associated with the new security event, the subject line metadata data of the first historical electronic communication of the plurality of historical electronic communications retrieved by S320, and the subject line metadata of the second historical electronic communication of the plurality of historical electronic communications retrieved by S320 may be nearly identical except for the account identifiers and the emojis used.

Generating Proposed Event Handling Prompts

In one or more embodiments, based on or in response to retrieving the set of historical security events similar, related, or equivalent to the security event obtained by S310, S330 may function to generate, via one or more computers, a plurality of proposed event handling prompts in real-time or near real-time. Each proposed event handling prompt of the plurality of proposed event handling prompts may include a distinct set of event handling instructions for determining one or more event handling actions of a distinct event handling action type for the security event obtained by S310. In other words, each distinct proposed event handling prompt generated by S330 may be specifically designed to generate event handling actions tailored to different aspects of security event response.

In one or more embodiments, each proposed event handling prompt of the plurality of proposed event handling prompts may be specifically designed to instruct one or more language models to generate event handling recommendations of a distinct event handling action type based on the historical event handling actions associated with the set of historical security events related or substantially similar to the security event obtained by S310. The plurality of proposed event handling prompts may be structured to instruct or direct the one or more language models in analyzing and identifying patterns across previous security investigations, threat mitigation strategies, and resolution processes to derive the most appropriate course of action for the security event obtained by S310.

Figure 19:
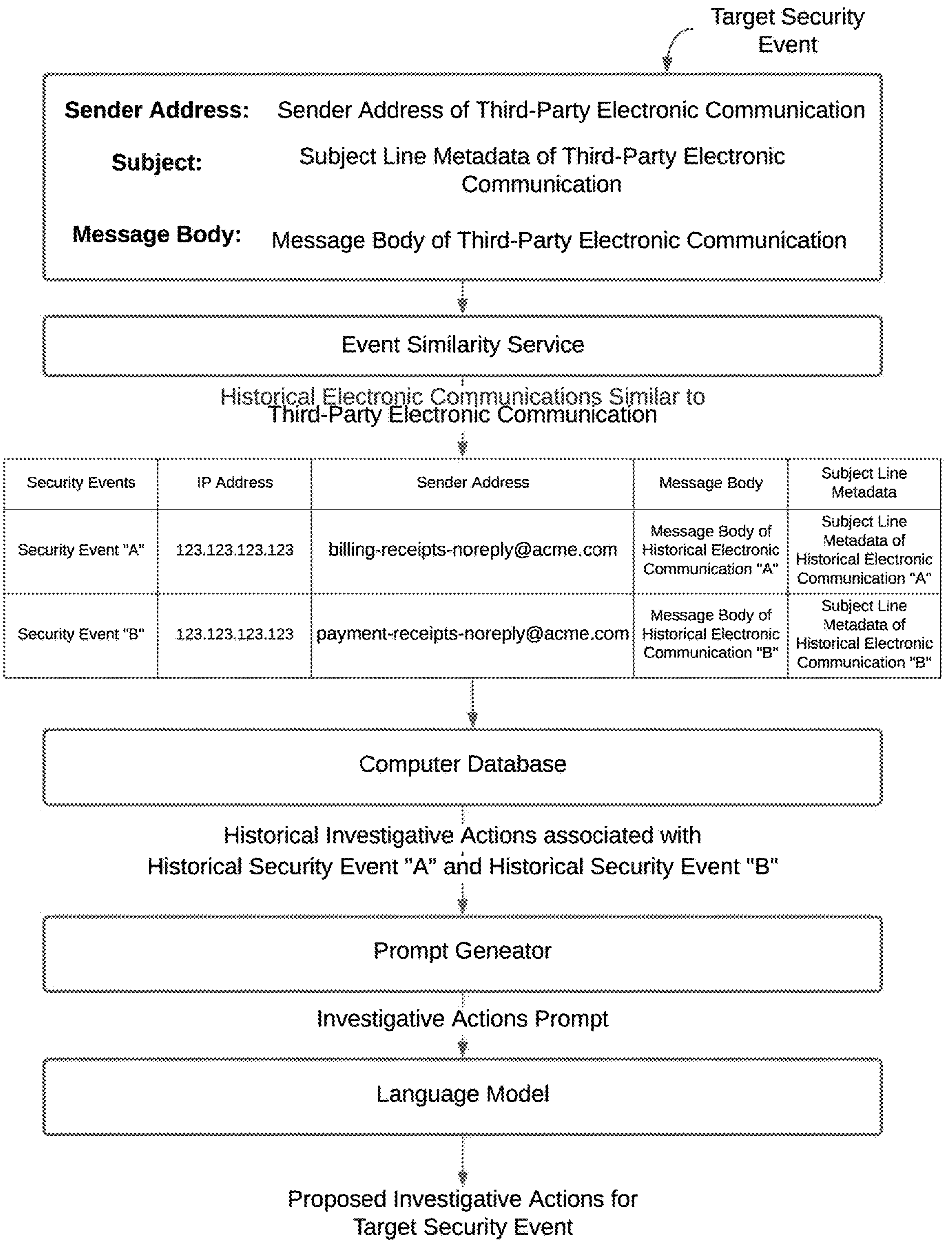
FIG. 19 illustrates an example of generating one or more proposed investigative actions for a target security event in accordance with one or more embodiments of the present application.

In one or more embodiments, S330 may function to automatically generate an investigative actions prompt that instructs one or more language models to propose one or more investigative actions for the target security event, as shown generally by way of example in FIG. 19. An investigative action, as generally referred to herein, may be an operation that, when performed, assists the system or service implementing method 300 (e.g., SOC asset, etc.) in analyzing a target security event, investigating the target security event, contextualizing the target security event, diagnosing the target security event, and/or responding to the target security event.

In one or more embodiments, generating the investigative actions prompt may include instantiating, via one or more computers, an instance of a prompt template of a plurality of predefined event handling prompt templates that corresponds to an investigative actions prompt template, obtaining, via the one or more computers, a corpus of historical investigative actions that corresponds to the set of historical security events retrieved by S320, wherein the corpus of historical investigative actions includes each investigation action that was performed and/or recommended to be performed during a respective security investigation of each historical security event of the set of historical security events, and populating, within the instance of the prompt template that corresponds to the investigative actions prompt template, the corpus of historical investigative actions that correspond to the set of historical security events.

It shall be recognized that, in one or more embodiments, the investigative actions prompt may include at least one instruction that instructs or directs one or more language models to propose one or more investigative actions for the security event obtained by S310 based on assessing at least the corpus of historical investigative actions and a set of investigation action protocols defined by the cybersecurity event detection and response service. The set of investigation action protocols defined by the cybersecurity event detection and response service, in one or more embodiments, may include predefined investigation procedures that prescribe specific investigative actions to be performed for particular types of security events, wherein each predefined investigation procedure is associated with a corresponding security event type and specifies a sequence of one or more investigative steps, data sources to query, security analysis techniques to apply, and/or potential remediation actions to execute.

For instance, in a non-limiting example, in response to S310 identifying a new security event that includes a third-party electronic communication suspected to be a phishing email sent to a user of a subscribing entity and S320 retrieving a set of historical security events that correspond to historical third-party electronic communications that share one or more characteristics similar or equivalent to the third-party electronic communication of the new security event, S330 may function to search a computer database to obtain a corpus of historical investigative actions that were previously performed during a security investigation of each historical security event of the set of historical security events. Accordingly, in such an embodiment, the set of historical security events retrieved by S320 may include at least a first third-party electronic communication and a second third-party electronic communication and, in turn, S330 may function to retrieve a first distinct set of investigative actions that was performed or proposed for the first third-party electronic communication and a second distinct set of investigative actions that was performed or proposed for the second third-party electronic communication.

It shall be recognized that, in one or more embodiments, the first distinct set of investigative actions and the second distinct set of investigative actions may include one or more common investigative actions and/or one or more different investigative actions.

It shall be further recognized that, in one or more embodiments, S330 may function to generate the investigative actions prompt based on a combination of retrieved historical investigative actions, predefined investigation protocols, and contextual attributes (or metadata) of the new security event obtained by S310. The investigative actions prompt may be structured to instruct one or more language models to analyze the similarities between the new security event and the set of historical security events, identify relevant investigative procedures, and propose a sequence of investigative actions for investigating the new security event. In other words, the investigative actions prompt may include the first distinct set of investigative actions that was performed or proposed for investigating the first third-party electronic communication and the second distinct set of investigative actions that was performed or proposed for investigating the second third-party electronic communication.

Figure 20:
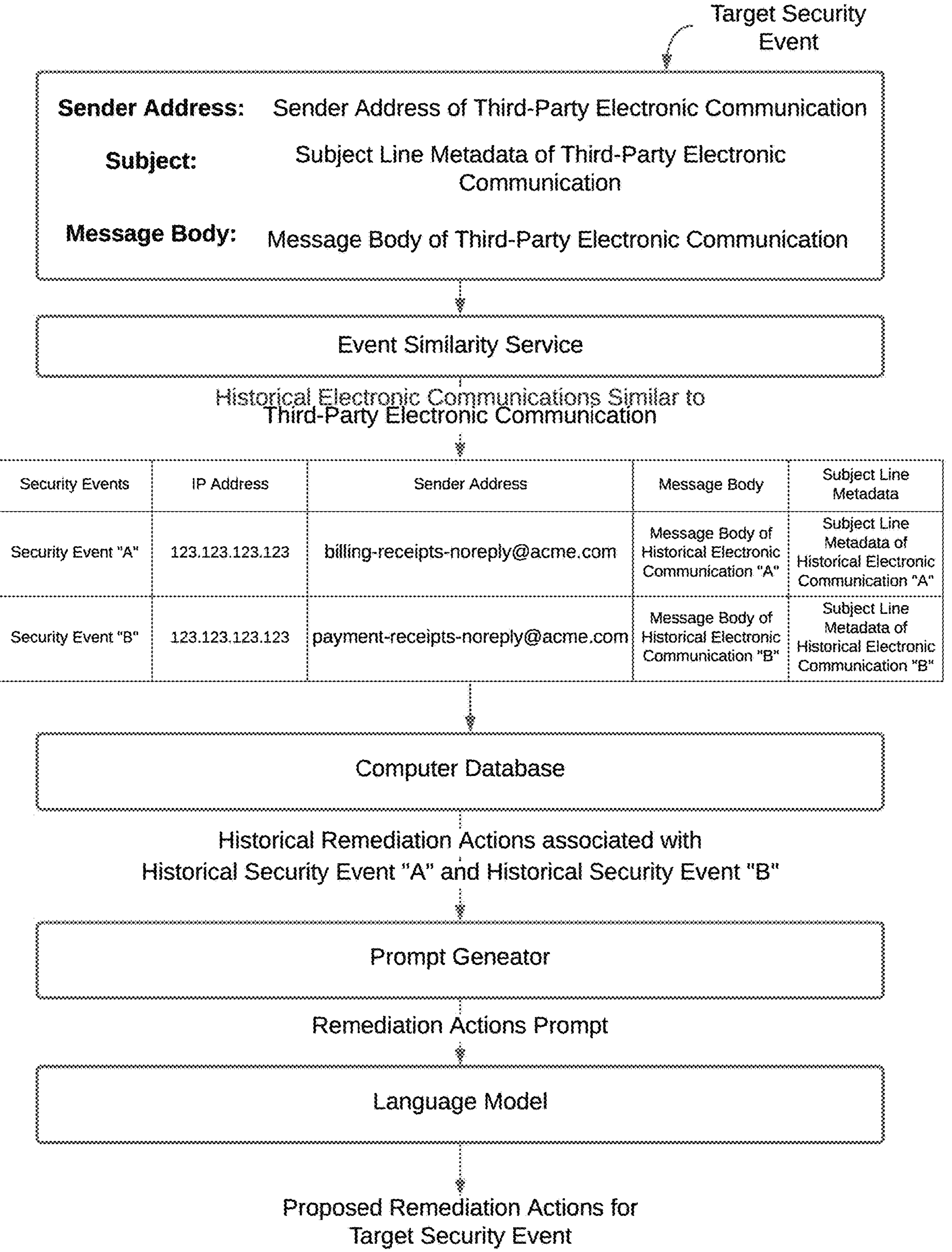
FIG. 20 illustrates an example of generating one or more proposed remediation actions for a target security event in accordance with one or more embodiments of the present application.

Additionally, or alternatively, in one or more embodiments, S330 may function to automatically generate a remediation actions prompt that instructs or directs one or more language models to propose one or more remediation actions for the new security event, as shown generally by way of example in FIG. 20. A remediation action, as generally referred to herein, may be an operation that, when performed or executed, mitigates or resolves a security threat associated with the new security event.

In one or more embodiments, generating the remediation actions prompt may include instantiating, via one or more computers, an instance of a prompt template of the plurality of predefined event handling prompt templates that corresponds to a remediation actions prompt template; obtaining, via the one or more computers, a corpus of historical remediations actions that corresponds to the set of historical security events related or substantially similar to the new security alert, wherein the corpus of historical remediation actions includes each remediation action that was executed or proposed to mitigate a security threat associated with each respective historical security event of the set of historical security events; and populating, within the instance of the prompt template that corresponds to the remediation actions prompt template, the corpus of historical remediation actions that correspond to the historical security events.

It shall be recognized that, in one or more embodiments, the instance of the prompt template that corresponds to the remediation actions prompt template may include at least one instruction that instructs the one or more language models to propose one or more remediation actions for the new security event based on assessing at least the corpus of historical remediation actions and a set of remediation action protocols defined by the cybersecurity event detection and response service. The set of remediation action protocols defined by the cybersecurity event detection and response service, in one or more embodiments, may include predefined remediation procedures that describe specific remediation actions to be performed for particular types of security events, wherein each predefined remediation procedure is associated with a corresponding security event type and specifies a sequence of one or more remediation actions to be executed in response to determining the new security event is malicious, including but not limited to containment measures, threat eradication steps, system recovery processes, and preventive security tasks.

Figure 26:
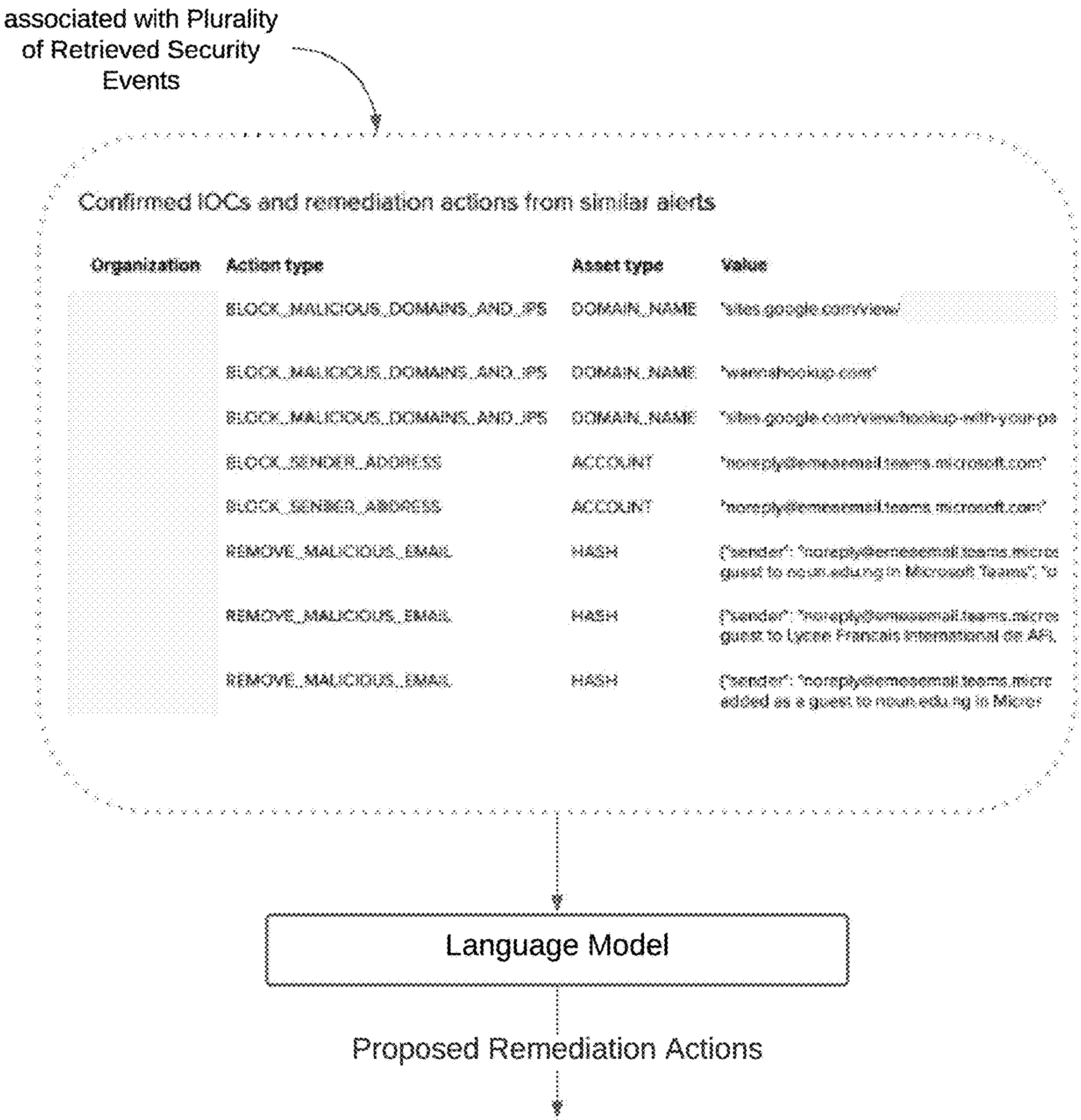
FIG. 26 illustrates example remediation actions in accordance with one or more embodiments of the present application.

For instance, in a non-limiting example, in response to S310 identifying a new security event that includes a third-party electronic communication suspected to be a phishing email that was sent to a user of a subscribing entity and S320 retrieving a set of historical security events that correspond to previous third-party electronic communications that share one or more characteristics similar or equivalent to the third-party electronic communication of the new security event, S330 may function to automatically search a computer database to obtain a corpus of historical remediation actions that were previously performed or proposed for mitigating or remediating security threats associated with the retrieved set of historical security events, as shown generally by way of example in FIG. 26. Accordingly, in such an embodiment, the set of historical security events retrieved by S320 may include a first third-party electronic communication (e.g., first historical security event) and a second third-party electronic communication (e.g., second historical security event) and, in turn, S330 may function to retrieve a first distinct set of remediation actions that was performed or proposed to mitigate a security threat associated with the first third-party electronic communication (e.g., first historical security event) and a second distinct set of remediation actions that was performed or proposed to mitigate a security threat associated with the second third-party electronic communication (e.g., second historical security event).

It shall be recognized that, in one or more embodiments, the first distinct set of remediation actions and the second distinct set of remediation actions may include one or more common remediation actions and/or one or more different remediation actions.

It shall be further recognized that, in one or more embodiments, S330 may function to generate the remediation actions prompt based on a combination of retrieved historical remediation actions, predefined remediation protocols, and/or contextual attributes (or metadata) of the new security event obtained by S310. The remediation actions prompt may be structured to instruct one or more language models to analyze the similarities between the new security event and the set of historical security events, identify relevant remediation procedures, and propose a sequence of remediation actions or tasks for remediating the new security event. In other words, the remediation actions prompt may include the first distinct set of remediation actions that was performed or proposed for remediating a (e.g., security) threat of the first third-party electronic communication (e.g., first historical security event) and the second distinct set of remediation actions that was performed or proposed for remediating a (e.g., security) threat of the second third-party electronic communication (e.g., second historical security event).

Figure 21:
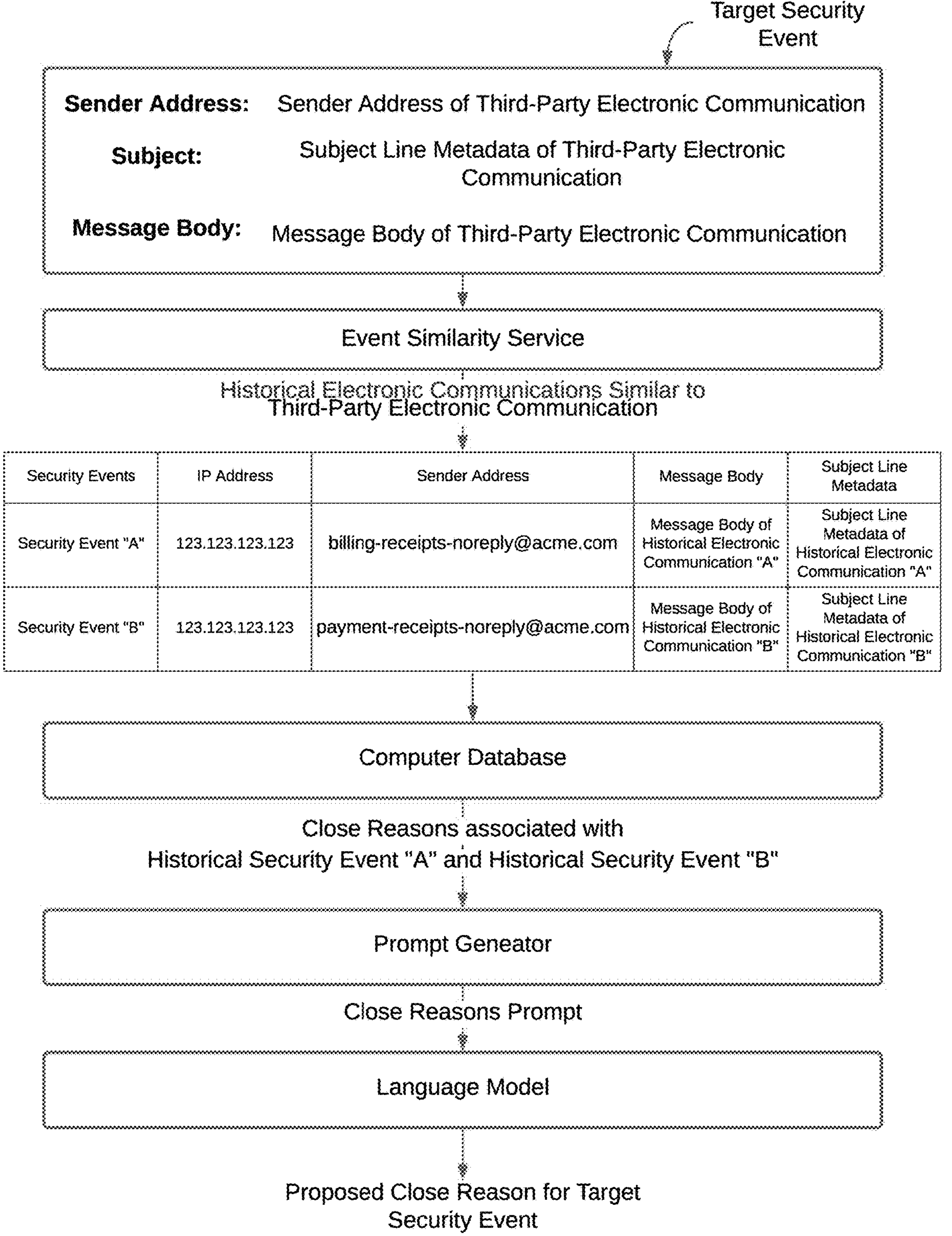
FIG. 21 illustrates an example of generating a proposed close reason for a target security event in accordance with one or more embodiments of the present application.

Additionally, or alternatively, in one or more embodiments, S330 may function to automatically generate a close reason prompt that instructs or directs one or more language models to propose a close reason for the security event obtained by S310, as shown generally by way of example in FIG. 21. A close reason, as generally referred to herein, may include one of a plurality of predetermined close reason labels that specifies the reason a security event should no longer being actively investigated or why the SOC asset or an automated operator determined that no further action is required for a subject security event.

In one or more embodiments, generating the close reason prompt may include instantiating, via one or more computers, an instance of a prompt template of a plurality of predefined event handling prompt templates that corresponds to a close reason prompt template; obtaining, via the one or more computers, a corpus of historical close reasons that correspond to the retrieved set of historical security events, wherein the corpus of historical close reasons includes the close reason that was assigned to or recommended for closing each respective historical security event of the retrieved set of historical security events, and populating, within the instance of the prompt template that corresponds to the close reason prompt template, the corpus of historical close reasons that correspond to the retrieved set of historical security events.

It shall be recognized that, in one or more embodiments, the close reason prompt may include at least one instruction that instructs one or more language models to propose or predict a close reason for why the security event obtained by S310 is to be closed based on assessing at least the corpus of historical close reasons and a set of predefined close reason protocols defined by the cybersecurity event detection and response service. The set of predefined close reason protocols defined by the cybersecurity event detection and response service, in one or more embodiments, may include predefined close reason classification procedures that describe specific event close reasons to be assigned based on the available evidence, investigative findings, and contextual factors associated with the security event.

For instance, in a non-limiting example, in response to S310 identifying a new security event and S320 retrieving a set of historical security events that share one or more characteristics similar or equivalent to the new security event, S330 may function to search a computer database that stores a corpus of historical close reasons that were previously assigned to or proposed for closing each respective historical security event associated with the retrieved set of historical security events. Accordingly, in such an embodiment, the set of historical security events retrieved by S320 may include a first historical security event and a second historical security event, and in turn, S330 may function to retrieve a first distinct close reason that was assigned to the first historical security event and a second distinct close reason that was assigned to the second historical security event.

It shall be further recognized that, in one or more embodiments, S330 may function to generate the close reason prompt based on a combination of retrieved historical close reasons, predefined close reason classification protocols, and/or contextual attributes (or metadata) of the new security event obtained by S310. The close reason prompt may be structured to instruct one or more language models to analyze the evidence available for the new security event, compare the new security event to the set of historical security events, and identify the most appropriate close reason for the new security event. In other words, the close reason prompt may include the first distinct close reason that was assigned to the first historical security event and the second distinct close reason that was assigned to the second historical security event.

3.40 Providing Metadata Similarity Assessment Prompts and Proposed Event Handling Prompts to One or More Language Models

S340, which includes providing metadata similarity assessment prompts and proposed event handling prompts to one or more language models, may function to automatically provide the plurality of metadata similarity assessment prompts and the plurality of proposed event handling prompts generated by S330 to one or more language models as model input. It shall be recognized that the one or more language models may correspond to any suitable language model including, but not limited to, GPT-3, GPT-3.5, GPT-4, GPT-40, Claude 1, Claude 2, Claude 3, LLAMA-7B, LLAMA-13B, LLAMA-65B, LLaMA-2-7B, LLAMA-2-13B, LLaMA-2-70B, Grok, or any fine-tuned language model.

In one or more embodiments, S340 may use a plurality of language models to process the plurality of metadata similarity assessment prompts and the plurality of proposed event handling prompts generated by S330. In such an embodiment, the plurality of metadata similarity assessment prompts generated by S330 may be provided to a first distinct language model of the plurality of language models and the plurality of proposed event handling prompts generated by S330 may be provided to a second distinct language model of the plurality of language models. In other words, in some embodiments, S340 may function to simultaneously process the plurality of metadata similarity assessment prompts and the plurality of proposed event handling prompts in parallel by distributing them across multiple language models.

Additionally, or alternatively, in one or more embodiments, S340 may function to transmit, over a computer network, a distinct network request for each metadata similarity assessment prompt and each proposed event handling prompt generated by S330. In such an embodiment, each distinct prompt generated by S330 may be transmitted as a separate network or application programming interface request and processed independently by a subject language model. For example, if five metadata similarity assessment prompts and five proposed event handling prompts are generated, S340 may transmit ten distinct network requests, each corresponding to a single prompt.

It shall be recognized that, in one or more embodiments, S340 may be implemented using an asynchronous and parallel processing architecture to enable simultaneous execution of multiple network requests. In such an embodiment, each transmitted network request may be independently processed by a corresponding language model without waiting for the completion of other network requests, thereby reducing overall network request response time.

3.50 Obtaining Metadata Similarity Findings and Proposed Event Handling Actions

S350, which includes obtaining metadata similarity findings and proposed event handling actions, may function to obtain a plurality of metadata similarity findings and a plurality of proposed event handling actions in response to the one or more language models processing the plurality of metadata similarity assessment prompts and the plurality of proposed event handling prompts. A metadata similarity finding, as generally referred to herein, may include one or more pieces of textual content and/or one or more pieces of graphical content that explains the extent of metadata similarity or difference between the security event obtained by S310 and the set of historical security events retrieved by S320. A proposed event handling action, as generally referred to herein, may correspond to a proposed investigative action, proposed remediation action, or a proposed close reason for responding or addressing the security event obtained by S310.

For instance, with continued reference to the above non-limiting example, the sender address of the third-party electronic communication associated with the new security event may be "finance-receipts-noreply@acme.com" and the plurality of historical electronic communications retrieved by S320 may include a first historical electronic communication sent from "billing-receipts-noreply@acme.com" and a second historical electronic communication sent from "payment-receipts-noreply@acme.com." In such a non-limiting example, the system or service implementing method 300 may have generated a first distinct metadata similarity assessment prompt that includes one or more of a first prompt instruction that instructs a language model to perform a domain similarity assessment to identify if a domain pattern exists between the sender address of the third-party electronic communication associated with the new security event and the respective set of sender addresses that correspond to the plurality of historical electronic communications, a second prompt instruction that instructs the language model to perform a username similarity assessment to identify if a username pattern exists between the sender address of the third-party electronic communication associated with the new security event and the set of sender addresses that correspond to the plurality of historical electronic communications, the sender address of the third-party electronic communication associated with the new security event (e.g., "finance-receipts-noreply@acme.com"), the sender address of the first historical electronic communication (e.g., "billing-receipts-noreply@acme.com"), and the sender address of the second historical electronic communication (e.g., "payment-receipts-noreply@acme.com").

Accordingly, in such a non-limiting example, the system or service implementing method 300 may function to provide the first distinct metadata similarity assessment prompt to the language model and, in turn, the language model may generate a metadata similarity finding based on the language model processing the first distinct metadata similarity assessment prompt. The metadata similarity finding outputted by the language model, in such a non-limiting example, may include one or more text strings that describe the extent of similarity or difference between the sender address of the third-party electronic communication associated with the new security event and the sender addresses of the plurality of historical electronic communications. For instance, in such a non-limiting example, the metadata similarity finding outputted by the language model may be "The sender email addresses are semantically similar because they all belong to the same domain, "acme.com". This suggests that they are all associated with the same organization or entity, and that they are likely to be used for similar purposes. The pattern in the username is the same for all three email addresses: "[category]-receipts-noreply". This suggests that these email addresses are all used for the same specific purpose, which is likely to be related to receiving and processing form submissions."

Additionally, with continued reference to the above non-limiting example, the message body of the third-party electronic communication associated with the new security event may be "Hello, Dear! 364 days ago, you registered on our platform for automatic cloud Bitcoin mining (collecting) by linking your devices to our platform by IP address. You were not active in your personal [[Graphical Representation of Dollar Emoji]] account, but the collection of cryptocurrency occurred automatically from your device. Your account: ACCT-93827164; will be blocked after 24 hours. Please, withdraw the remaining funds within 24 hours! Sincerely, Finance Department P/S: Details in your personal account: www.acme-crypto-secure.com/login?ACCT=93827164", the message body of the first historical electronic communication of the plurality of historical electronic communications may be “Hello, Dear! 364 days ago, you registered on our platform for automatic cloud Bitcoin mining (collecting) by linking your devices to our platform by IP address. You were not active in your personal account, but the collection of cryptocurrency occurred automatically from your device. [[Graphical Representation of Dollar Sign Emoji]] Your account: ACCT-2025-187653; will be blocked after 24 hours. Please, withdraw the remaining funds within 24 hours! Sincerely, Finance Department P/S: Details in your personal account.”, and the message body of the second historical electronic communication of the plurality of historical electronic communications retrieved by S320 may be “Hello, Dear! 364 days ago, you registered on our platform for automatic cloud Bitcoin mining (collecting) by linking your devices to our platform by IP address. You were not active in your personal account, but the collection of cryptocurrency occurred automatically from your device. [[Graphical Representation of Cart Emoji]] Your account: ACCT-2023-12345; will be blocked after 24 hours. Please, withdraw the remaining funds within 24 hours! Sincerely, Finance Department P/S: Details in your personal account.” In such a non-limiting example, the system or service implementing method 300 may have generated a second distinct metadata similarity assessment prompt that includes a first instruction that instructs a language model to perform a text similarity assessment to identify if a message body pattern exists between the message body of the third-party electronic communication associated with the new security event and the set of message bodies that correspond to the plurality of historical electronic communications, a second instruction that instructs the language model to perform a message body deviation assessment to identify if a message body deviation exists between the message body of the third-party electronic communication associated with the new security event and the set of message bodies that correspond to the plurality of historical electronic communications, the message body of the third-party electronic communication associated with the new security event, the message body of the first historical electronic communication, and the message body of the second historical electronic communication.

Accordingly, in such a non-limiting example, the system or service implementing method 300 may function to provide the second distinct metadata similarity assessment prompt to the language model and, in turn, the language model may generate a metadata similarity finding based on the language model processing the second distinct metadata similarity assessment prompt. The metadata similarity finding outputted by the language model, in such a non-limiting example, may include one or more text strings that describe the extent of similarity or difference between the message body of the third-party electronic communication associated with the new security event and the message bodies of the plurality of historical electronic communications. For instance, in such a non-limiting example, the metadata similarity finding outputted by the language model may be “The three email text bodies are similar in several ways. Firstly, they all begin with the same salutation, “Hello, Dear!”. Secondly, they all mention that the recipient registered on a platform for automatic cloud Bitcoin mining 364 days ago. Thirdly, they all state that the recipient was not active in their personal account but that the collection of cryptocurrency occurred automatically from their device. Fourthly, they all end with the same sign-off, “Sincerely, Finance Department” and “P/S: Details in your personal account”. However, there is one key difference between the three email text bodies. The first email contains an embedded URL link (e.g., the third-party electronic communication associated with the new security event), while the second and third emails do not. The embedded URL link in the first email (e.g., the third-party electronic communication associated with the new security event) is “www.acme-crypto-secure.com/login?ACCT-93827164”. This link could potentially be malicious, and it is important to be cautious when clicking on links in emails from unknown senders.”

Additionally, with continued reference to the above non-limiting example, the subject line metadata of the third-party electronic communication associated with the new security event may be “[[Graphical Representation of Scroll Emoji]] Your account: ACCT-93827164; will be blocked!”, the subject line metadata of the first historical electronic communication of the plurality of historical electronic communications may be “[[Graphical Representation of Dollar Sign Emoji]] Your account: ACCT-2025-187653; will be blocked!”, and the subject line metadata of the second historical electronic communication of the plurality of historical electronic communications may be “[[Graphical Representation of Link Emoji]] Your account: ACCT-2023-12345; will be blocked!.” In such a non-limiting example, the system or service implementing method 300 may have generated a third distinct metadata similarity assessment prompt that includes a first instruction that instructs a language model to perform a subject similarity assessment to determine if a subject pattern exists between the subject line metadata of the third-party electronic communication associated with the new security event and the corresponding set of subject line metadata that corresponds to the plurality of historical electronic communications, the subject line metadata of the third-party electronic communication associated with the new security event, the subject line metadata of the first historical electronic communication, and the subject line metadata of the second historical electronic communication.

Accordingly, in such a non-limiting example, the system or service implementing method 300 may function to provide the third distinct metadata similarity assessment prompt to the language model and, in turn, the language model may generate a metadata similarity finding based on the language model processing the third distinct metadata similarity assessment prompt. The metadata similarity finding outputted by the language model, in such a non-limiting example, may include one or more text strings that describe the extent of similarity or difference between the subject line metadata of the third-party electronic communication associated with the new security event and the subject line metadata of the plurality of historical electronic communications. In such a non-limiting example, the metadata similarity finding outputted by the language model may be “The subject line metadata of the third-party electronic communication and the historical electronic communications exhibit a high degree of similarity. All three subject lines follow the same structural pattern: ‘[Emoji Representation] Your account: ACCT-[unique identifier]; will be blocked!’, indicating a common subject formatting style. The use of account numbers within the subject line suggests an attempt to create urgency and personalize the message for the recipient. Additionally, while the graphical emoji representation varies between a scroll emoji, a dollar sign emoji, and a link emoji, the overall subject message remains consistent across all electronic communications. This minor variation does not significantly alter the intent of the message, which appears to be a notification about an impending account restriction.”

Additionally, with continued reference to the above non-limiting example, in response to retrieving the plurality of historical electronic communications related or substantially similar to the third-party electronic communication associated with the new security event, the system or service implementing method 300 may function to obtain, from a computer database, a set of historical investigative actions that were previously performed to assist with determining a degree of threat severity for each historical electronic communication of the plurality of historical electronic communications. The set of historical investigative actions, in one or more embodiments, may include investigating traffic to the domain associated with a respective historical electronic communication, querying logs for occurrences of the sender address associated with a respective historical electronic communication to determine if the sender address was previously engaged in suspicious or malicious activity, querying logs for occurrences of the subject line metadata associated with a respective historical electronic communication to determine if similar subject lines have been used in prior phishing attempts or other security threats, querying the digital environment of the subscribing entity for evidence of traffic to the suspicious domain(s), embedded URLs, or attachments mentioned in the email, inspecting embedded URLs and attachments for malicious indicators, and determining the domain age of the sender domain associated with a respective historical electronic communication, or any other suitable investigative action. In such a non-limiting example, the system or service implementing method 300 may have generated an investigative actions prompt that may include one or more of a prompt instruction that instructs a language model to propose one or more investigative actions for the new security event, the plurality of distinct pieces of metadata that corresponds to the third-party electronic communication associated with the new security event, and the set of historical investigative actions that were performed during the investigation of each historical electronic communication of the plurality of historical electronic communications.

Accordingly, in such a non-limiting example, the system or service implementing method 300 may function to provide the investigative actions prompt to the language model and, in turn, the language model may generate one or more proposed event investigation handling actions based on the language model processing the investigative actions prompt. The one or more proposed event investigation handling actions outputted by the language model, in such a non-limiting example, may include one or more text strings that describe recommended investigation actions or tasks for assessing or investigating the new security event based on the plurality of distinct pieces of metadata of the third-party electronic communication associated with the new security event and the set of historical investigative actions that correspond to the plurality of historical electronic communications. For instance, in such a non-limiting example, the one or more proposed event investigation handling actions outputted by the language model for the new security event may be to investigate traffic to "acme-crypto-secure.com" as the domain "acme-crypto-secure.com" was present in an embedded link within the third-party electronic communication of the new security event and/or query security logs to identify a reputation and a pattern of the sender's email address and the subject line that corresponds to third-party electronic communication associated with the new security event.

Additionally, with continued reference to the above non-limiting example, in response to retrieving the plurality of historical electronic communications related or substantially similar to the third-party electronic communication associated with the new security event, the system or service implementing method 300 may function to obtain, from a computer database, a set of historical remediation actions that were previously performed to mitigate or remediate a security threat for each historical electronic communication of the plurality of historical electronic communications. In such a non-limiting example, the system or service implementing method 300 may have generated a remediation actions prompt that may include a prompt instruction that instructs a language model to propose one or more remediation actions for the new security event, the plurality of distinct pieces of metadata that corresponds to the third-party electronic communication associated with the new security event, and/or the set of historical remediation actions that were performed during a threat mitigation or remediation of each historical electronic communication of the plurality of historical electronic communications.

Accordingly, in such a non-limiting example, the system or service implementing method 300 may function to provide the remediation actions prompt to the language model and, in turn, the language model may generate one or more proposed remediation actions based on the language model processing the remediation actions prompt. The one or more proposed remediation actions outputted by the language model, in such a non-limiting example, may include one or more text strings that describe recommended remediation actions for mitigating a security threat that corresponds to the new security event. For instance, in such a non-limiting example, the one or more proposed remediation actions outputted by the language model for the new security event may be to remove the malicious third-party electronic communication from a user's inbox (or a majority of user inboxes) of the subscribing entity that received the third-party electronic communication associated with the new security event, block the sender's email address (e.g., sender address) to prevent the same sender from successfully delivering additional malicious electronic communications to other recipients or users of the subscribing entity, block the malicious domain mentioned in the third-party electronic communication associated with the new security event to prevent users of the subscribing entity from accessing or communicating with the malicious domain, as shown generally by way of example in FIG. 26.

Additionally, with continued reference to the above non-limiting example, in response to retrieving the plurality of historical electronic communications related or substantially similar to the third-party electronic communication associated with the new security event, the system or service implementing method 300 may function to obtain, from a computer database, a set of historical close reasons that were previously assigned to the plurality of historical electronic communications. In such an embodiment, each historical electronic communication (or the corresponding security alert) may have been closed with a metadata tag of "MALICIOUS_NO_IMPACT" indicating that the respective historical electronic communication was identified to be a malicious email but did not result in user engagement or system compromise. In such a non-limiting example, the system or service implementing method 300 may have generated a close reason prompt that may include a prompt instruction that instructs a language model to propose a close reason for the new security event based on the set of historical close reasons.

Accordingly, in such a non-limiting example, the system or service implementing method 300 may function to provide the close reason prompt to the language model, and in turn, the language model may generate a proposed close reason based on the language model processing the close reason prompt. The proposed close reason outputted by the language model, in such a non-limiting example, may include one or more text strings that describe a recommended close reason for the new security event. For instance, in such a non-limiting example, the proposed close reason outputted by the language model for the new security event may be "based on the information provided, the security event should be triaged with a close reason of "MALICIOUS_NO_IMPACT". This is supported by the findings from similar alerts or security events, which indicate that these types of emails are phishing attempts that are designed to trick users into giving up their personal information or clicking on malicious links."

3.60 Generating and Displaying a Graphical User Interface

S360, which includes generating a graphical user interface, may function to generate, via one or more computers, a graphical user interface that includes the security event obtained by S310, the proposed metadata similarity findings generated by S350 for the security event, and the proposed event handling actions generated by S350 for handling the security event. In one or more embodiments, S360 may function to display, on a graphical user interface, the subject security event obtained by S310 in association with the plurality of metadata similarity findings and the plurality of proposed event handling actions generated for the subject security event.

In one or more embodiments, in response to the cybersecurity event detection and response service identifying that a subject security event obtained by S310 is substantially similar to one or more historical security alerts and/or historical security events previously assessed by the cybersecurity event detection and response service, S360 may function to generate, via one or more computers, a graphical user interface that includes the subject security event in association with the plurality of metadata similarity findings and the plurality of proposed event handling actions generated for the subject security event, as shown generally by way of example in FIGS. 22-25.

In one or more embodiments, based on or in response to identifying that a subject security event may be substantially similar to one or more historical security events and/or historical security alerts previously assessed by the cybersecurity event and response service, S360 may function to generate an event similarity user interface element that may be integrally displayed within a security event windowpane that corresponds to the subject security event. The event similarity user interface element may (e.g., visually) emphasize to an analyst, SOC asset or the like that the subject security event is substantially similar to one or more historical security events and/or historical security alerts previously assessed by the cybersecurity event and response service, as shown generally by way of example in FIG. 22.

In one or more embodiments, to emphasize, expose, or bring attention (e.g., analyst focus) to the event similarity user interface element, S360 may function to position the event similarity user interface element proximal or substantially near an upper portion of the security event windowpane, display the event similarity user interface element with a first color intensity and display the security event windowpane with a second color intensity distinct from the first color intensity, and/or display the event similarity user interface element with a first (background) color (e.g., blue) and display the security event windowpane with a second (background) color distinct from the first color (e.g., grey), or the like. It shall be recognized that S360 may function to surface or emphasize the event similarity user interface element via any suitable mechanism including, but not limited, via user interface notifications (e.g., sounds, alarms, etc.), messages, and/or the like.

In one or more embodiments, the event similarity user interface element may include one or more text strings that may include a rationale describing a total quantity of historical security events that was identified to be substantially similar or related to the subject security event. For instance, in a non-limiting example, the one or more text strings of the event similarity user interface element that may be displayed within an exemplarily security event windowpane may be "Ruxie says: I found two (2) similar security events previously closed as TESTING", as shown generally by way of example in FIG. 22.

Additionally, or optionally, in one or more embodiments, the event similarity user interface element may function to display the corresponding collection of historical security events underpinning the total quantity of historical security events identified by the cybersecurity event detection and response service as similar to the subject security event. Furthermore, in some embodiments, the event similarity user interface element may function to include a distinct security event hyperlink for each historical security event underpinning the total quantity of historical security events that was identified by the cybersecurity event detection and response service as similar to the subject security event (e.g., the security event hyperlink, when selected, may function to instantiate a user interface that includes distinct security event data corresponding to the selected security event hyperlink, thus, the selected historical security event), as shown generally by way of example in FIG. 22.

Figure 22:
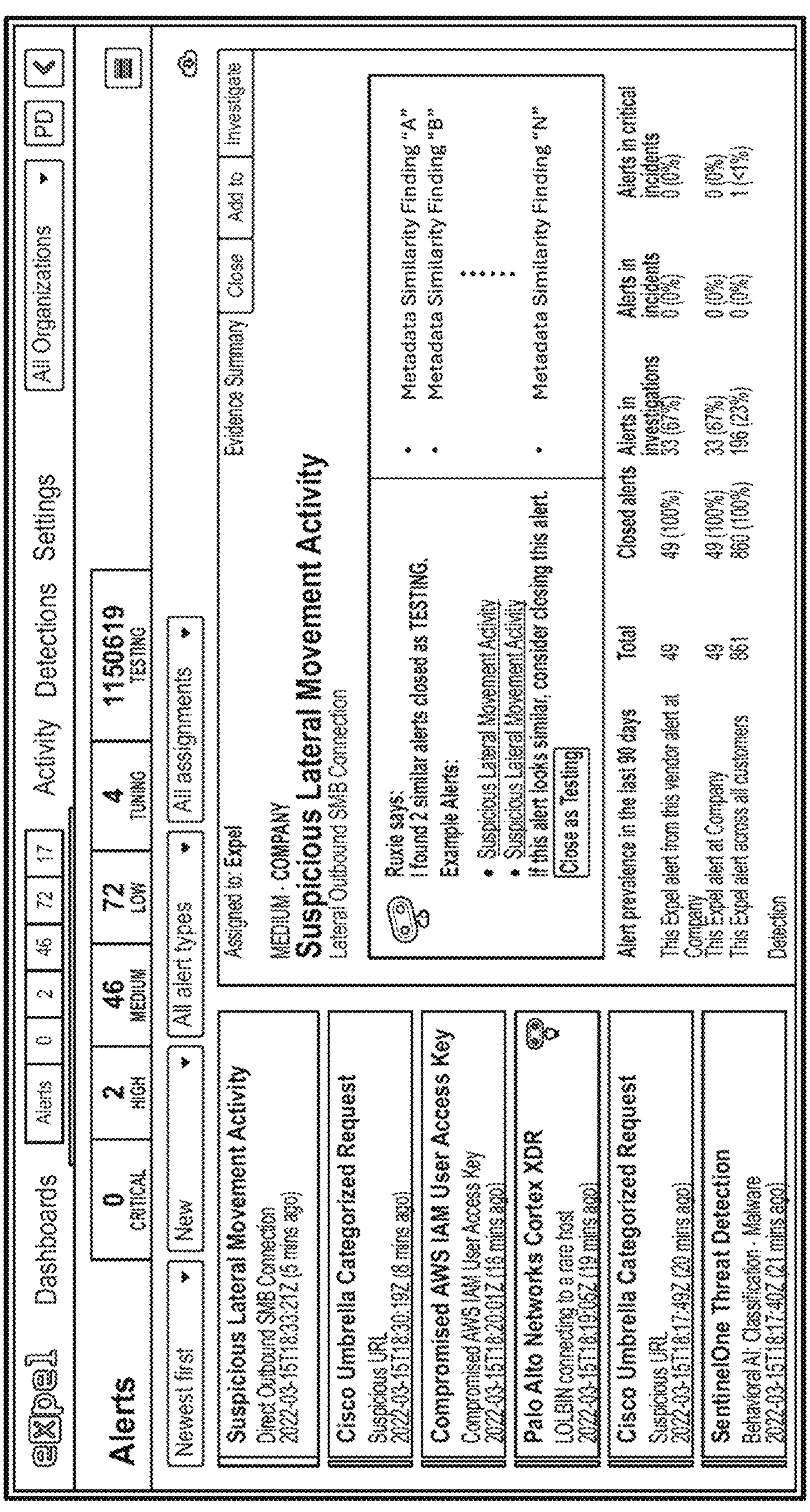

Additionally, or optionally, in one or more embodiments, the event similarity user interface element may include a selectable user interface object, that when selected, may function to perform an event disposal action that corresponds to or aligns with one or more of the previous event handling action(s) associated with historical security events that was previously assessed and identified by the cybersecurity event detection and response service as similar to the subject security event, as shown generally by way of example in FIG. 22.

Figure 23:
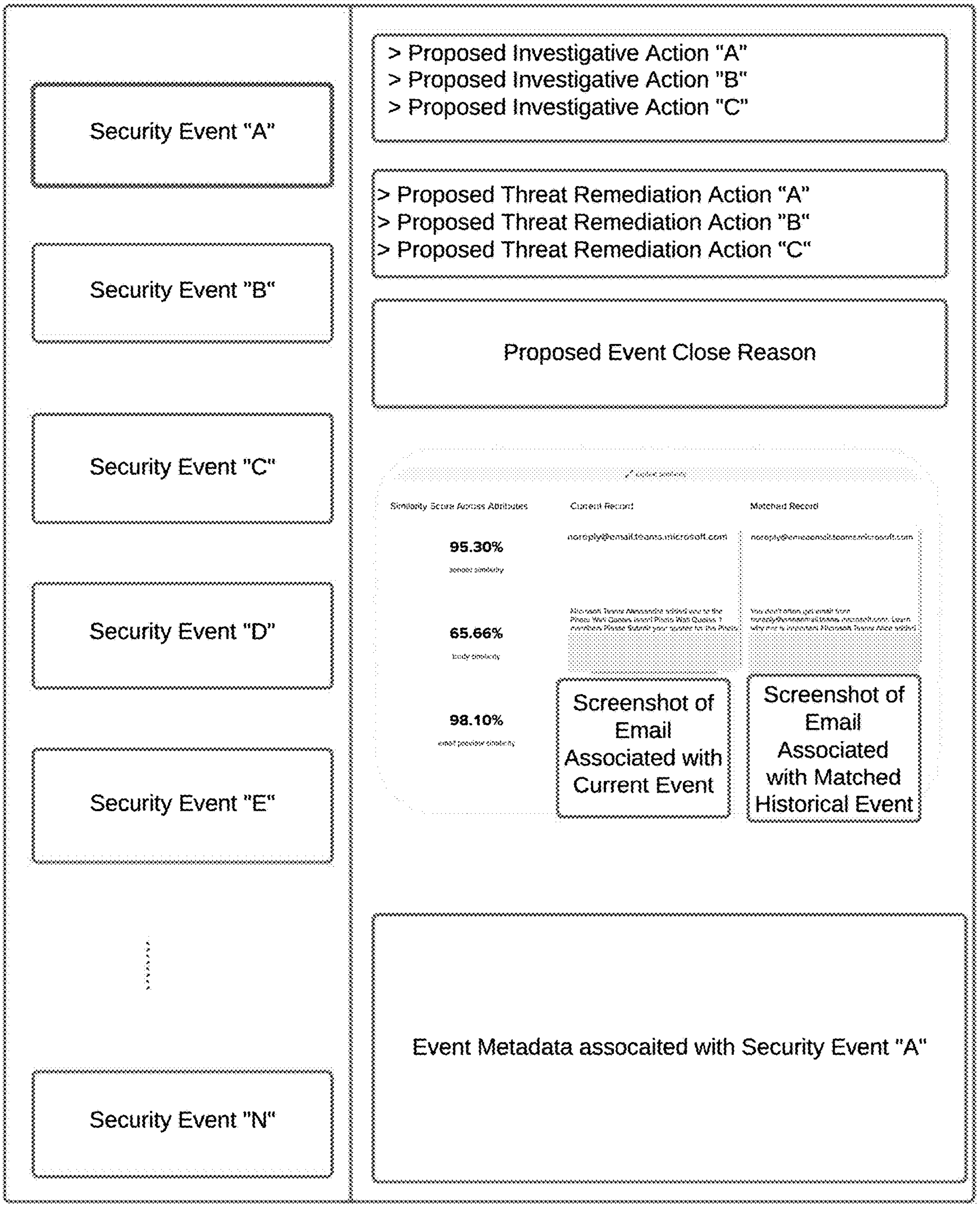

Additionally, or optionally, in one or more embodiments, the event similarity user interface element may further include a plurality of metadata similarity findings generated for the subject security event based on assessing metadata attributes (e.g., metadata values) of the subject security event against corresponding metadata attributes (e.g., metadata values) of the historical security events detected to be related or substantially similar to the subject security event, as shown generally by way of example in FIG. 22 and FIG. 23.

At least one technical advantage of generating the event similarity user interface element for a subject security event may decrease analyst fatigue and triaging time.

In one or more embodiments, based on or in response to identifying that the subject security event is substantially similar to the one or more historical security events and/or historical security alerts previously assessed by the cybersecurity event and response service, S360 may function to generate a remediation actions user interface element that may be integrally displayed within the security event windowpane that corresponds to the subject security event. The remediation actions user interface element, in one or more embodiments, may (e.g., visually) emphasize to an analyst, SOC asset, or the like one or more proposed remediation actions that, when performed, mitigates a security threat associated with the subject security event, as shown generally by way of example in FIG. 24 and FIG. 25.

In one or more embodiments, the remediation actions user interface element may include the one or more proposed remediation actions generated for the subject security event by the language model. In such an embodiment, each distinct remediation action included within the remediation actions user interface element may be selectable by a user and, when selected, may trigger or commence an automated execution of the selected remediation action. For instance, in a non-limiting example, a security analyst may be presented with a list of proposed remediation actions and based on or in response to the system or service implementing method 300 detecting a selection of a remediation action within the list of proposed remediation actions, the system or service implementing method 300 may function to automatically perform the selected remediation action.

It shall be noted that to automatically perform a remediation action, reference is made to U.S. patent application Ser. No. 18/123,137, filed on 17 Mar. 2023, titled SYSTEMS AND METHODS FOR ACCELERATED REMEDIATIONS OF CYBERSECURITY ALERTS AND CYBERSECURITY EVENTS IN A CYBERSECURITY EVENT DETECTION AND RESPONSE PLATFORM, which is incorporated herein in its entirety by this reference.

Additionally, or alternatively, in some embodiments, a metadata similarity user interface object may be automatically generated and displayed within the security event windowpane that corresponds to the subject security event. In such an embodiment, the metadata similarity user interface object may display one or more metadata attributes of the subject security event alongside corresponding metadata attributes of one or more matched historical security event identified to be similar or related to the subject security event. For instance, in a non-limiting example, the metadata similarity user interface object may include a metadata comparison table where each row represents a specific metadata attribute, such as sender address, message body, and a screen shot of the email. Each metadata attribute may be accompanied by a respective metadata similarity score, visually indicating the degree of similarity between the subject security event and the matched historical security event, as shown generally by way of example in FIG. 23.

It shall be recognized that, in one or more embodiments, the sender address similarity score may be computed by comparing the sender address of the subject security event against the sender address of a matched historical security event using a Levenshtein distance algorithm or the like.

It shall be further recognized that, in one or more embodiments, the message body similarity score may be computed by measuring a vector distance between an embedding representation of the message body of the subject security event against an embedding representation of the message body of the matched historical security event.

It shall be further recognized that, in one or more embodiments, the email screen shot similarity score may be computed by comparing pixels of the email screenshot from the subject security event against pixels of the email screenshot from the matched historical security event using any suitable image similarity assessment algorithm.

It shall be further recognized that, in some embodiments, the graphical user interface may be generated in real-time or near real-time in response to S310 obtaining the subject security event. For instance, in a non-limiting example, a time elapsed between the system or service implementing method 300 obtaining the subject security event and generating the graphical user interface for the subject security event that includes the event similarity user interface element generated for the subject security event, the remediation actions user interface element generated for the subject security event, and/or the metadata similarity user interface object comparing the subject security event to the matched historical record may be on the order of milliseconds or on the order of minutes (e.g., less than five (5) minutes, less than three minutes, less than one (1) minute, less than 10000 milliseconds, less than 1000 milliseconds, etc.).

3.70 Executing a Threat Mitigation Action or Event Disposal Action

S370, which includes executing a threat mitigation action or an event disposal action, may function to execute, using one or more computers, a threat mitigation action or an event disposal action for the security event obtained by S310. In one or more embodiments, the threat mitigation action or the event disposal action executed for the security event obtained by S310 may be performed in real-time or near real-time after obtaining the security event.

In one or more embodiments, based on S360 generating and displaying a graphical user interface for a subject security event that includes event data associated with the subject security event, a plurality of proposed event handling actions generated for the subject security event, and a plurality of metadata similarity findings that indicates an extent of metadata similarity between the subject security event and a retrieved set of historical security events related to the subject security event, the system or service implementing method 300 may function to execute, via one or more computers, a threat mitigation action or an event disposal action for the subject security event based on performing an evaluation of the generated graphical user interface.

For instance, in a non-limiting example, S370 may function to execute, via one or more computers, the threat mitigation action or the event disposal action for the subject security event based on an automated operator, a security operations center (SOC) asset, or a combination thereof evaluating the subject security event against the plurality of metadata similarity findings and the plurality of proposed event handling actions displayed on the graphical user interface.

In one or more embodiments, based on the automated operator, the security operations center (SOC) asset, or the combination thereof evaluating the graphical user interface, S370 may function to execute the event disposal action based on detecting an input selecting a selectable user interface object of the graphical user interface, that when selected, performs the event disposal action. In such a non-limiting example, the recommended event disposal reason generated by a language model may be "based on the information provided, the security event should be triaged with a close reason of "MALICIOUS_NO_IMPACT." This is supported by the findings from the retrieved set of historical security events related to the subject security event." Accordingly, in such a non-limiting example, in response to detecting the input selecting the selectable user interface object of the graphical user interface, the system or service implementing method 300 may function to close the subject security event and attribute a close metadata tag of "MALICIOUS_NO_IMPACT" to the subject security event. Closing a security event, as generally referred to herein, may include assigning a final disposition to the security event (e.g., malicious, benign, or the like) after assessing or investigating an impact and/or a threat severity of the security event.

Alternatively, in one or more embodiments, in response to the automated operator, the security operations center (SOC) asset, or the combination thereof evaluating the graphical user interface, the automated operator, the security operations center (SOC) asset, or the combination thereof may function to execute one or more threat mitigation actions for the subject security event. For instance, in a non-limiting example, the graphical user interface that corresponds to the subject security event may function to display a plurality of proposed investigative actions for investigating the subject security event and, in turn, the automated operator, the security operations center (SOC) asset, or the combination thereof may function to perform the plurality of proposed investigative actions to investigate the subject security event. In another non-limiting example, the graphical user interface that corresponds to the subject security event may function to display a plurality of proposed remediation actions for mitigating a security threat associated with the subject security event and, in turn, the automated operator, the security operations center (SOC) asset, or the combination thereof may function to perform the plurality of proposed remediation actions.

In a non-limiting example, the automated operator, the security operations center (SOC) asset, or the combination thereof may function to determine that the third-party electronic communication that corresponds to the subject security event is a malicious electronic communication and, in turn, the system or service implementing method 300 may function to automatically delete, automatically remove, and/or automatically move to a disposal location (e.g., trash), the third-party electronic communication electronic communication (e.g., an email or the like) from a majority of or all electronic messaging accounts (e.g., inboxes) of a subscribing entity that received the third-party electronic communication by automatically constructing and automatically executing one or more threat mitigation application programming interface (API) requests (e.g., compromised asset application programming interface (API) requests or the like). In this way, the cybersecurity event detection and response service may prevent the malicious electronic communication from being accessed or acted upon by other users of the subscribing entity, reducing security risks and potential harm.

Additionally, or alternatively, in another non-limiting example, the automated operator, the security operations center (SOC) asset, or the combination thereof may function to determine that the third-party electronic communication that corresponds to the subject security event is a malicious electronic communication and, in turn, the system or service implementing method 300 may function to automatically block a malicious domain that corresponds to the third-party electronic communication by automatically constructing and automatically executing one or more threat mitigation application programming interface (API) requests (e.g., compromised asset application programming interface (API) requests or the like). In this way, the subscribing entity may be protected from future threats originating from the malicious domain by preventing further malicious electronic communications that correspond to the malicious domain from reaching the subscribing entity.

Additionally, or alternatively, in another non-limiting example, the automated operator, the security operations center (SOC) asset, or the combination thereof may function to determine that the third-party electronic communication that corresponds to the subject security event is a malicious electronic communication and, in turn, the system or service implementing method 300 may function to automatically block an internet protocol address from which the third-party electronic communication was sent by automatically constructing and automatically executing one or more threat mitigation application programming interface (API) requests (e.g., compromised asset application programming interface (API) requests or the like). In this way, the subscribing entity is protected from future threats associated with the malicious internet protocol address domain by preventing further malicious electronic communications that correspond to the malicious internet protocol address from reaching the subscribing entity.

Additionally, or alternatively, in another non-limiting example, the automated operator, the security operations center (SOC) asset, or the combination thereof may function to determine that the third-party electronic communication that corresponds to the subject security event is a malicious electronic communication and, in turn, the system or service implementing method 300 may function to automatically block the sender address that sent the third-party electronic communication by automatically constructing and automatically executing one or more threat mitigation application programming interface (API) requests (e.g., compromised asset application programming interface (API) requests or the like). In this way, the subscribing entity is protected from future threats associated with the malicious sender address by preventing further malicious electronic communications that correspond to the malicious sender address from reaching the subscribing entity.

4. Computer-Implemented Method and Computer Program Product

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein. Furthermore, each method step, process step, or the like described herein may be performed in real-time or near real-time.

As a person skilled in the art will recognize from the previous detailed description and from the figures and claims, modifications and changes can be made to the preferred embodiments of the invention without departing from the scope of this invention defined in the following claims. For example, aspects/operations of methods 200 and 300 may be interchanged, substituted, and/or added between these methods.

I claim:

1. A computer-implemented method for accelerating a threat mitigation or disposal of inbound security events, the computer-implemented method comprising:

obtaining, via one or more computers, a target security event comprising a plurality of distinct pieces of metadata;

retrieving, in real-time via the one or more computers, a set of historical security events related to the target security event in response to searching an n-dimensional embeddings space storing a plurality of embedding values that correspond to a plurality of historical security events;

automatically generating, via the one or more computers, (i) a plurality of metadata similarity assessment prompts and (ii) a plurality of proposed event handling prompts in response to retrieving the set of historical security events, wherein:

each metadata similarity assessment prompt of the plurality of metadata similarity assessment prompts includes a distinct set of metadata assessment instructions for evaluating an extent of metadata similarity between the target security event and the set of historical security events for a distinct metadata type, and each proposed event handling prompt of the plurality of proposed event handling prompts includes a distinct set of event handling instructions for determining one or more event handling actions of a distinct event handling action type for the target security event;

automatically providing the plurality of metadata similarity assessment prompts and the plurality of proposed event handling prompts to one or more language models based on generating the plurality of metadata similarity assessment prompts and the plurality of proposed event handling prompts;

obtaining, from the one or more language models, a plurality of metadata similarity findings and a plurality of proposed event handling actions in response to the one or more language models processing the plurality of metadata similarity assessment prompts and the plurality of proposed event handling prompts;

displaying, on a graphical user interface, the target security event in association with the plurality of metadata similarity findings and the plurality of proposed event handling actions; and executing, via the one or more computers, a threat mitigation action or an event disposal action for the target security event based on evaluating the target security event against the plurality of metadata similarity findings and the plurality of proposed event handling actions displayed on the graphical user interface.

2. The computer-implemented method according to claim 1, wherein:

the target security event is a new security event that has not been previously investigated by a cybersecurity event detection and response service, the target security event involves one or more computing assets or one or more digital assets of a subscriber subscribing to the cybersecurity event detection and response service, and the threat mitigation action or the event disposal action executed for the target security event is performed in real-time or near real-time after obtaining the target security event.

3. The computer-implemented method according to claim 1, wherein:

the plurality of metadata similarity findings and the plurality of proposed event handling actions are simultaneously generated in real-time after obtaining the target security event, the plurality of metadata similarity findings outputted by the one or more language models textually indicates a degree of similarity between the target security event and the set of historical security events across a plurality of distinct metadata types, the plurality of proposed event handling actions outputted by the one or more language models includes one or more proposed investigative actions that should be performed to assess whether the target security event corresponds to a security threat, and the plurality of proposed event handling actions outputted by the one or more language models further includes one or more proposed threat mitigation actions that should be performed to mitigate the security threat when the target security event corresponds to the security threat.

4. The computer-implemented method according to claim 1, wherein:

the graphical user interface includes a selectable user interface object that, when selected, executes the event disposal action.

5. The computer-implemented method according to claim 4, further comprising:

while displaying the graphical user interface:

receiving an input selecting the selectable user interface object, and in response to receiving the input, automatically executing the event disposal action, wherein automatically executing the event disposal action includes closing the target security event.

6. The computer-implemented method according to claim 1, wherein:

the target security event includes a representation of a third-party electronic communication that a subscriber received from an external entity, the plurality of distinct pieces of metadata of the target security event includes a sender address of the third-party electronic communication, a message body of the third-party electronic communication, and subject line metadata of the third-party electronic communication, each historical security event of the set of historical security events includes at least one piece of metadata equivalent or substantially equivalent to a corresponding piece of metadata of the target security event, and the set of historical security events include a plurality of historical electronic communications related to the third-party electronic communication.

7. The computer-implemented method according to claim 6, wherein:

automatically generating the plurality of metadata similarity assessment prompts includes generating a first distinct metadata similarity assessment prompt configured to evaluate the extent of metadata similarity between the target security event and the set of historical security events based on a sender address metadata feature, generating the first distinct metadata similarity assessment prompt includes:

instantiating, via the one or more computers, an instance of a prompt template of a plurality of predefined metadata similarity assessment prompt templates that corresponds to the sender address metadata feature, obtaining, via the one or more computers, the sender address of the third-party electronic communication, obtaining, via the one or more computers, a set of sender addresses that correspond to the plurality of historical electronic communications, and populating, within the instance of the prompt template that corresponds to the sender address metadata feature, the sender address of the third-party electronic communication and the set of sender addresses that correspond to the plurality of historical electronic communications.

8. The computer-implemented method according to claim 7, wherein:

the instance of the prompt template that corresponds to the sender address metadata feature includes at least:

a first instruction that instructs the one or more language models to perform a domain similarity assessment to identify if a domain pattern exists between the sender address of the third-party electronic communication and the set of sender addresses that correspond to the plurality of historical electronic communications, and a second instruction that instructs the one or more language models to perform a username similarity assessment to identify if a username pattern exists between the sender address of the third-party electronic communication and the set of sender addresses that correspond to the plurality of historical electronic communications.

9. The computer-implemented method according to claim 8, wherein:

the one or more language models perform the domain similarity assessment and the username similarity assessment in response to the one or more language models receiving the first distinct metadata similarity assessment prompt, the one or more language models output a textual summary that includes:

the domain pattern identified between the third-party electronic communication and the plurality of historical electronic communications, and the username pattern identified between the third-party electronic communication and the plurality of historical electronic communications, and the graphical user interface further displays the textual summary.

10. The computer-implemented method according to claim 7, wherein:

automatically generating the plurality of metadata similarity assessment prompts includes generating a second distinct metadata similarity assessment prompt configured to evaluate the extent of metadata similarity between the target security event and the set of historical security events based on a message body metadata feature, generating the second distinct metadata similarity assessment prompt includes:

instantiating, via the one or more computers, an instance of a prompt template of the plurality of predefined metadata similarity assessment prompt templates that corresponds to the message body metadata feature, obtaining, via the one or more computers, the message body of the third-party electronic communication, obtaining, via the one or more computers, a set of message bodies that correspond to the plurality of historical electronic communications, and populating, within the instance of the prompt template that corresponds to the message body metadata feature, the message body of the third-party electronic communication and the set of message bodies that correspond to the plurality of historical electronic communications.

11. The computer-implemented method according to claim 10, wherein:

the instance of the prompt template that corresponds to the message body metadata feature includes at least:

a first instruction that instructs the one or more language models to perform a text similarity assessment to identify if a message body pattern exists between the message body of the third-party electronic communication and the set of message bodies that correspond to the plurality of historical electronic communications, and a second instruction that instructs the one or more language models to perform a message body deviation assessment to identify if a message body deviation exists between the message body of the third-party electronic communication and the set of message bodies that correspond to the plurality of historical electronic communications.

12. The computer-implemented method according to claim 11, wherein:

the one or more language models perform the text similarity assessment and the message body deviation assessment in response to the one or more language models receiving the second distinct metadata similarity assessment prompt, the one or more language models output a textual summary that includes:

the message body pattern identified between the third-party electronic communication and the plurality of historical electronic communications, and one or more message body deviations identified between the third-party electronic communication and the plurality of historical electronic communications, and the graphical user interface further displays the textual summary.

13. The computer-implemented method according to claim 10, wherein:

automatically generating the plurality of metadata similarity assessment prompts includes generating a third distinct metadata similarity assessment prompt configured to evaluate the extent of metadata similarity between the target security event and the set of historical security events based on an electronic communication subject feature, generating the third distinct metadata similarity assessment prompt includes:

instantiating, via the one or more computers, an instance of a prompt template of the plurality of predefined metadata similarity assessment prompt templates that corresponds to the electronic communication subject feature, obtaining, via the one or more computers, the subject line metadata of the third-party electronic communication, obtaining, via the one or more computers, a corresponding set of subject line metadata that correspond to the plurality of historical electronic communications, and populating, within the instance of the prompt template that corresponds to the electronic communication subject feature, the subject line metadata of the third-party electronic communication and the corresponding set of subject line metadata that correspond to the plurality of historical electronic communications.

14. The computer-implemented method according to claim 13, wherein:

the instance of the prompt template that corresponds to the electronic communication subject feature includes at least:

a first instruction that instructs the one or more language models to perform a subject similarity assessment to determine if a subject pattern exists between the subject line metadata of the third-party electronic communication and the corresponding set of subject line metadata that correspond to the plurality of historical electronic communications.

15. The computer-implemented method according to claim 14, wherein:

the one or more language models perform the subject similarity assessment in response to the one or more language models receiving the third distinct metadata similarity assessment prompt, and the one or more language models output a textual summary that includes:

the subject pattern identified between the third-party electronic communication and the plurality of historical electronic communications, and the graphical user interface further displays the textual summary.

16. The computer-implemented method according to claim 1, wherein:

automatically generating the plurality of proposed event handling prompts includes generating an investigative actions prompt that instructs the one or more language models to propose one or more investigative actions for the target security event, generating the investigative actions prompt includes:

instantiating, via the one or more computers, an instance of a prompt template of a plurality of predefined event handling prompt templates that corresponds to an investigative actions prompt template, obtaining, via the one or more computers, a corpus of historical investigative actions that corresponds to the set of historical security events, wherein the corpus of historical investigative actions includes each investigation action that was performed during a respective security investigation for each historical security event of the set of historical security events, and populating, within the instance of the prompt template that corresponds to the investigative actions prompt template, the corpus of historical investigative actions that correspond to the set of historical security events.

17. The computer-implemented method according to claim 16, wherein:

the investigative actions prompt includes at least one instruction that instructs the one or more language models to propose the one or more investigative actions for the target security event based on assessing at least the corpus of historical investigative actions and a set of investigation action protocols defined by a cybersecurity event detection and response service, the one or more language models outputs the one or more investigative actions in response to the one or more language models receiving the investigative actions prompt, and the graphical user interface further displays the one or more investigative actions.

18. The computer-implemented method according to claim 17, wherein:

automatically generating the plurality of proposed event handling prompts includes generating a remediation actions prompt that instructs the one or more language models to propose one or more remediation actions for the target security event, generating the remediation actions prompt includes:

instantiating, via the one or more computers, an instance of a prompt template of the plurality of predefined event handling prompt templates that corresponds to a remediation actions prompt template, obtaining, via the one or more computers, a corpus of historical remediations actions that corresponds to the set of historical security events, wherein the corpus of historical remediation actions includes each remediation action that was proposed to mitigate a security threat associated with each respective historical security event of the set of historical security events, and populating, within the instance of the prompt template that corresponds to the remediation actions prompt template, the corpus of historical remediation actions that correspond to the historical security events.

19. The computer-implemented method according to claim 18, wherein:

the instance of the prompt template that corresponds to the remediation actions prompt template includes at least one instruction that instructs the one or more language models to propose the one or more remediation actions for the target security event based on assessing at least the corpus of historical remediation actions and a set of remediation action protocols defined by the cybersecurity event detection and response service, the one or more language models output the one or more remediation actions in response to the one or more language models receiving the remediation actions prompt, and the graphical user interface further displays the one or more remediation actions.

20. A computer-implemented method for accelerating a threat mitigation or disposal of security alerts, the method comprising:

retrieving, in real-time via one or more computers, a set of historical security alerts related to a target security alert in response to searching an n-dimensional embeddings space storing a plurality of embedding values that correspond to a plurality of historical security alerts;

automatically generating, in real-time via the one or more computers, (i) a plurality of metadata similarity assessment prompts and (ii) a plurality of proposed alert handling prompts in response to retrieving the set of historical security alerts, wherein:

each metadata similarity assessment prompt of the plurality of metadata similarity assessment prompts includes a distinct set of metadata assessment instructions for evaluating an extent of metadata similarity between the target security alert and the set of historical security alerts with respect to a single distinct metadata type, and each proposed alert handling prompt of the plurality of proposed alert handling prompts includes a distinct set of alert handling instructions for determining one or more alert handling actions of a distinct alert handling action type for the target security alert;

automatically providing the plurality of metadata similarity assessment prompts and the plurality of proposed alert handling prompts to one or more language models based on generating the plurality of metadata similarity assessment prompts and the plurality of proposed alert handling prompts;

obtaining, from the one or more language models, a plurality of metadata similarity findings and a plurality of proposed alert handling actions in response to the one or more language models processing the plurality of metadata similarity assessment prompts and the plurality of proposed alert handling prompts;

displaying, on a graphical user interface, the target security alert in association with the plurality of metadata similarity findings and the plurality of proposed alert handling actions; and executing, in real-time via the one or more computers, a threat mitigation action or an alert disposal action for the target security alert based on evaluating the target security alert against the plurality of metadata similarity findings and the plurality of proposed alert handling actions.

* * * * *